(12) United States Patent
Olivier

(10) Patent No.: US 7,025,883 B1
(45) Date of Patent: Apr. 11, 2006

(54) AUTOTROFIC SULFUR DENITRATION CHAMBER AND CALCIUM REACTOR

(75) Inventor: Laurent Olivier, Vero Beach, FL (US)

(73) Assignee: OK Technologies, LLC, Greensboro, NC (US)

( * ) Notice: Subject to any disclaimer, the term of this patent is extended or adjusted under 35 U.S.C. 154(b) by 0 days.

(21) Appl. No.: 10/673,634

(22) Filed: Sep. 30, 2003

(51) Int. Cl.
- C02F 3/30 (2006.01)
- C02F 3/32 (2006.01)
- C02F 3/34 (2006.01)
- A01K 63/04 (2006.01)

(52) U.S. Cl. .................. 210/602; 210/612; 210/617; 210/629; 210/630; 210/631; 210/903; 210/905

(58) Field of Classification Search ............. 210/602, 210/612, 615–617, 630, 631, 169, 629, 903, 210/905; 119/260
See application file for complete search history.

(56) References Cited

U.S. PATENT DOCUMENTS

| | | | |
|---|---|---|---|
| 1,157,092 A | 10/1915 | Du Rell | |
| 1,526,179 A | 2/1925 | Parr et al. | |
| 3,271,304 A | 9/1966 | Valdespino et al. | |
| 3,847,375 A | 11/1974 | Kuerten et al. | |
| 4,019,983 A | 4/1977 | Mandt | |
| 4,097,026 A | 6/1978 | Haindl | |
| 4,210,534 A | 7/1980 | Molvar | |
| 4,281,592 A | 8/1981 | Maxson et al. | |
| 4,333,263 A | 6/1982 | Adey | |
| 4,460,471 A * | 7/1984 | Reid | 210/629 |
| 4,537,682 A | 8/1985 | Wong-Chong | |
| 4,620,929 A * | 11/1986 | Hofmann | 210/610 |
| 4,820,052 A | 4/1989 | Krysel | |
| 4,858,519 A | 8/1989 | Meckler | |
| 4,995,980 A | 2/1991 | Jaubert | |
| 5,081,954 A | 1/1992 | Monus | |
| 5,171,090 A | 12/1992 | Wiemers | |
| 5,253,677 A | 10/1993 | Sand | |
| 5,322,222 A | 6/1994 | Lott | |
| 5,348,653 A * | 9/1994 | Rovel | 210/605 |
| 5,403,522 A | 4/1995 | Von Berg | |
| 5,591,341 A | 1/1997 | Jensen | |
| 5,647,983 A | 7/1997 | Limcaco | |
| 5,664,733 A | 9/1997 | Lott | |
| 5,670,046 A * | 9/1997 | Kimmel | 210/602 |
| 5,705,072 A | 1/1998 | Haase | |
| 5,766,454 A | 6/1998 | Cox et al. | |
| 5,775,443 A | 7/1998 | Lott | |
| 5,778,823 A | 7/1998 | Adey et al. | |
| 5,851,398 A | 12/1998 | Adey | |
| 5,857,773 A | 1/1999 | Tammelin | |

(Continued)

FOREIGN PATENT DOCUMENTS

JP 63-267424 11/1988

(Continued)

OTHER PUBLICATIONS

Bulletin No. 491A, Model 46550 Tank Mixing Educators for Improved In-tank Solution Circulation and Agitation, Spraying Systems Co.®, pp. 1-6, 2000.

(Continued)

*Primary Examiner*—Fred G. Prince
(74) *Attorney, Agent, or Firm*—Finnegan, Henderson, Farabow, Garrett & Dunner LLP

(57) ABSTRACT

The present invention describes novel biological methods for efficiently reducing nitrate levels and otherwise conditioning aquarium water and water in similar environments.

60 Claims, 33 Drawing Sheets

U.S. PATENT DOCUMENTS

| | | | |
|---|---|---|---|
| 5,862,829 A | 1/1999 | Sand | |
| 5,863,128 A | 1/1999 | Mazzei | |
| 5,894,995 A | 4/1999 | Mazzei | |
| 5,927,338 A | 7/1999 | Boticki et al. | |
| 5,951,922 A | 9/1999 | Mazzei | |
| 5,961,831 A | 10/1999 | Lee et al. | |
| 5,965,016 A | 10/1999 | Suchowski et al. | |
| 5,976,378 A | 11/1999 | Sumino et al. | |
| 6,123,841 A | 9/2000 | Gotoh | |
| 6,146,531 A | 11/2000 | Matheson | |
| 6,159,364 A | 12/2000 | Hirane | |
| 6,196,269 B1 | 3/2001 | Michael et al. | |
| 6,297,033 B1 | 10/2001 | Van Rijn et al. | |
| 6,331,300 B1 | 12/2001 | Dybas et al. | |
| 6,471,489 B1 | 10/2002 | Hua | |
| 6,523,991 B1 | 2/2003 | Maklad | |
| 6,730,226 B1* | 5/2004 | Takada | 210/630 |
| 2002/0166593 A1 | 11/2002 | Oliver | |
| 2003/0094411 A1 | 5/2003 | Takada | |
| 2004/0035770 A1 | 2/2004 | Edwards et al. | |
| 2004/0178132 A1 | 9/2004 | Nakhla et al. | |
| 2005/0098497 A1* | 5/2005 | Khudenko | 210/620 |

FOREIGN PATENT DOCUMENTS

| | | |
|---|---|---|
| WO | WO/96/04784 | 2/1996 |

OTHER PUBLICATIONS

Alkanlinity Requirements and the Possibility of Simultaneous Heterotrophic Denitrification During Sulfur-utilizing Autotrophic Denitrification, pp. 1-2, 2000. Website Printout, Source: http://www.iwaponline.com/wst/04203/wst042030233.htm.

Anoxygenic Photosynthetic Bacteria, Edited by R. E. Blankenship et al., pp. 1-3. Website Printout, Source: http://photoscience.la.asu.edu/photosyn/books/anoxybk.html, date unknown.

Aquariums, pp. 1-3. Website Printout, Source: http://www.aquazoo.co.uk/page.cfm?type=systems/action=build/stage=2c, date unknown.

Soler, Christophe, "Nitrates Elimination by Autotrophic Denitration on Sulfur," Translated by Nicolas Will, Reefex, date unknown.

Langouet, Marc, "the Autotrophic Denitration on Sulfur—What's the Status?," Translated by Nicolas Will, Reefex, last update: Dec. 1, 1999.

Darbi, A., et al., "Batch Studies on Nitrate Removal from Potable Water," Water SA, vol. 28, No. 3, Jul. 3, 2002, pp. 319-322.

Biogeochemical Cycles, Soil Microbiology, BIOL/CSES 4684, Virginia Polytechnic Institute and State University, pp. 1-5. Website Printout, Source: http://soils1.cses.vt.edu/ch/biol_4684/Cycles/Soxidat.html, date unknown.

Degassers, pp. 1-2. Website Printout, Source: http://www.aquasystems.co.uk/files/degassers/degasser.html, date unknown.

Lampe, D. G., et al., "Evaluation of Sulfur-Based Autotrophic Denitrification," Proceedings of the HSRC/WERC Joint Conference on the Environment, pp. 444-458, Albuquerque, NM, May 21-23, 1996.

Gijs Kuenen, J. et al., The Genera Thiobacillus, Thiomicrospira, and Thiosphaera, (Excerpts from Chapter 138 of "The Prokaryotes," Edited by A. Balows et al., vol. III, 2$^{nd}$ Edition, 1992), pp. 1-6. Website Printout, Source: http://www.spaceship-earth.org/REM/THIOBAC.htm.

MCB 229 Autotrophic Life, MCB 229 Lecture Notes, UConn., pp. 1-6. Website Printout, Source: http://www.sp.uconn.edu/~terry/229sp02/lectures/Lect13.html, Jun. 19, 2002.

The Mineral Aragonite, Website Printout, Source: http://mineral.galleries.com/Minerals/Carbonat/ARAGONIT/ARAGONIT.htm, 1998.

The Mineral CALCITE, Website Printout, Source: http://mineral.galleries.com/minerals/carbonat/calcite/calcite.html, 1998, 1999.

Dolomite, Website Printout, Source: http://mineral.galleries.com/minerals/carbonat/dolomite/dolomite.htm, 1998.

Internal Denitrificator I 600, pp. 1-2. Website Printout, Source: http://www.aquavie.fr/english/produits/i600.htm, 2000.

Sulphur Denitrator on Cornice G300S, pp. 1-2. Website Printout, Source: http://www.aquavie.fr/english/produits/g300s.htm, 2000.

Gallery Denitrificator G 300, pp. 1-2. Website Printout, Source: http://www.aquavie.fr/english/producits/g300.htm, 2000.

External Denitrification F1000, pp. 1-2. Website Printout, Source: http://www.aquavie.fr/english/produits/f1000.htm, 2000.

Sulphur Denitrificator F1000S, pp. 1-2. Website Printout, Source: http://www.aquavie.fr/english/produits/f1000s.html, 2000.

Removal of Nitrate-Nitrogen and Control of Nitrous Oxide by Sulfur Denitrification, pp. 1-4. Website Printout, Source: http://www.env.t.u-tokyo.ac.jp/~kiyo/column-batch-E.html, date unknown.

Saltwater Aquariums, About Air Driven Counter-Current Skimmers, pp. 1-3. Website Printout, Source: http://saltaquarium.about.com/library/weekly/aa101701.htm, date unknown.

Nitrates & How to Control Them, pp. 1-2. Website Printout, Source: http://saltaquarium.about.com/cs/nitratecontrol/a/aa072999.htm, date unknown.

Nitrates & How to Control Them, p. 2—Reduction Methods, Using Mangrove Plants, p. 1. Website Printout, Source: http://saltaquarium.about.com/cs/nitratecontrol/a/aa072999-2.html, date unknown.

Nitrates & How to Control Them, p. 3—Reduction Methods, Using Denitrifying Filters, pp. 1-2. Website Printout, Source: http://saltaquarium.about.com/cs/nitratecontrol/a/aa072999-3.htm, date unknown.

Nitrates & How to Control Them, p. 4—Reduction Methods, Using Denitrator Coils, pp. 1-2. Website Printout, Source: http://saltaquarium.about.com/cs/nitratecontrol/a/aa072999-4.htm, date unknown.

Nitrates & How to Control Them, p. 5—Reduction Methods, A Multiple Step Water Change Procedure, pp. 1-2. Website Printout, Source: http://saltaquarium.about.com/cs/nitratecontrol/a/aa072999-5.htm, date unknown.

Carner, D., Protein Skimmers—Part 1, A Layperson's Guide to Protein Skimming, or How To Get the Gunk Out, What is Protein Skimming and How Does It Work?, pp. 1-2. Website Printout, Source: http://saltaquarium.about.com/cs/proteinskimmers/a/aa052200.htm, date unknown.

Carner, D., Protein Skimmers—Part 1 (Continued), A Layperson's Guide to Protein Skimming, or How To Get the Gunk Out, Co-Current Skimming, pp. 1-2. Website Printout, Source: http://saltaquarium.about.com/cs/proteinskimmers/a/aa052200b.htm, date unknown.

Carner, D., Protein Skimmers—Part 1 (Continued), A Layperson's Guide to Protein Skimming, or How To Get the Gunk Out, Counter-Current Skimming, pp. 1-2. Website Printout, Source: http://saltaquarium.about.com/cs/proteinskimmers/a/aa052200c.htm, date unknown.

Saltwater Aquariums, Protein Skimming—Whate Is It and How Does It Work?, pp. 1-3. Website Printout, Source: http://saltaquarium.about.com/cs/library/weekly1/a/aa111097skim.htm, date unknown.

Ozone Solutions, Inc., Sulfate and Hydrogen Sulfide in Water, pp. 1-3. Website Printout, Source: http://www.ozoneapplications.com/info/sulfur.htm, date unknown.

Sulfate Reducing Bacteria (SRB), pp. 1-2. Website Printout, Source: http://www.corrosion-doctors.org/Microbial/srb.htm, date unknown.

Sulphur Bacteria, pp. 1-3. Website Printout, Source: http://www.reef.edu.au/asp_pages/secb.asp?FormNo=2, date unknown.

Sulfur Denitrification, pp. 1-2. Website Printout, Source: http://www.env.t.u-tokyo.ac.jp/~kiyo/sulfur-E.html, date unknown.

Drawing of 175 Gallon 60° Cone Bottom Poly Tank 32Dx68H, Product #0135-055, American Tank Company, 2002. Website Printout, Source: http://www.watertanks.com/images/documents/0135-055.gif.

Geol 299—Earth System Science Lecture 28, Nov. 12, 1997, pp. 1-4. Website Printout, Source: http://www.sdsmt.edu/online-courses/geology/geol299/lect28.htm.

Delaparte, S., et al., Denitrification Based on Sulfur at the Aquarium of MAAO, Sea Scope, vol. 17, Fall 2000, pp. 1-3. Website Printout, Source: http://216.168.47.67/cis-fishnet/seascope/00SS1711.htm.

Nitrification Denitrification at USFilter, p. 1, Mar. 26, 2004, Website Printout, Source: http://www.usfilter.com/h2o/nitrification_dentrification.htm.

Sequencing Batch Reactor, pp. 1-2, Mar. 26, 2004. Website Printout, Source: http://www.usfilter.com/water/ProductDescription.asp?WID=25&PID=216.

Biological Wastewater Treatment as USFilter, pp. 1-2, Mar. 26, 2004. Website Printout, Source: http://www.usfilter.com/h2o/biological_wastewater_treatment.htm.

Water Aeration at USFilter, pp. 1-2, Mar. 26, 2004. Website Printout, Source: http://www.usfilter.com/h2o/water_aeration.htm.

Groundwater Treatment at USFilter, p. 1, Mar. 26, 2004. Website Printout, Source: http://www.usfilter.com/h2o/groundwater_treatment.html.

Biogeochemical Cycles; Soil Microbiology (BIOL/CSES 4684), pp. 1-2, Mar. 26, 2004. Website Printout, Source: http://soils1.cses.vt.edu/ch/biol_4684/Cycles/cycles.html.

Biogeochemical Cycles; Soil Microbiology (BIOL/CSES 4684), pp. 1-2, Mar. 26, 2004. The Sulfur Cycle. Website Printout, Source: http://soils1.cses.vt.edu/ch//biol_4684/Cycles/Scycle.html.

The Soil Environment; Soil Microbiology (BIOL/CSES 4684), pp. 1-2, Mar. 26, 2004. Website Printout, Source: http://soils1.cses.vt.edu/ch//biol_4684/soils.html.

The Microbes; Soil Microbiology (BIOL/CSES 4684), pp. 1-3, Mar. 26, 2004 Website Printout, Source: http://soils1.cses.vt.edu/ch/biol_4684/Microbes/Microbes.html.

Microbial Applications; Soil Microbiology (BIOL/CSES 4684), p. 1, Mar. 26, 2004. Website Printout, Source: http://soils1.cses.vt.edu/ch/biol_4684/Topics.html.

Engel, A.S., et al., Metabolic and Isotopic Diversity of Chemoautotrophic sulfur-oxidizing bacteria from Lower Kane Cave, Wyoming, p. 1, Mar. 26, 2004 Website Printout, Source: http://www.geo.utexas.edu/chemhydro/Annette/Kane/NSS202_abs2.htm.

Edwards, V.A., et al., Hydrogen Sulfide (H2S)—The Relationship of Bacteria to its Formation, Prevention, and Elmination, pp. 1-2, Mar. 26, 2004. Website Printout, Source: http://www.alken-murray.com/H2SREM2.htm.

Sulfur Compounds Causing Odor and Corrosion, pp. 1-3, Mar. 26, 2004. Website Printout, Source: http://www.alken-murray.com/H2SREM3.htm.

The Nature of Sulfur Compounds and Their Formation, pp. 1-3, Mar. 26, 2004. Website Printout, Source: http://www.alken-murray.com/H2SREM4.htm.

Solving the Hydrogen Sulfide Odor Problem, pp. 1-2, Mar. 26, 2004, Website Printout, Source: http://www.alken-murray.com/H2SREM5.htm.

Bacterial Solutions to Hydrogen Sulfide (H2S) Odors, pp. 1-4, Mar. 26, 2004. Website Printout, Source: http://www.alken-murray.com/H2SREM6.htm.

Edwards, Jr., K.J., The Sulfur Cycle, pp. 1-2, Mar. 26, 2004. Website Printout, Source: http://www.alken-murray.com/H2SREM7.htm.

Hydrogen Sulfide Hazards in Municipal and Industrial Accounts, pp. 1-3, Mar. 26, 2004. Website Printout, Source: http://www.alken-murray.com/H2SREM8.htm.

Toxicity of Hydrogen Sulfide Gas, pp. 1-2, Mar. 26, 2004. Website Printout, Source: http://www.alken-murray.com/H2SREM9.htm.

Hydrogen Sulfide Treatise References, pp. 1-2, Mar. 26, 2004. Website Printout, Source: http://www.alken-murray.com/H2Sref.htm.

Nitrates Elimination by Autotrophic Denitration on Sulfur, pp. 1-2, Mar. 26, 2004. Website Printout, Source: http://mars.reefkeepers.net/USHomePage/USArticles/Soler/DenitratorSoufre.html.

Chromatiaceae, pp. 1-2, Mar. 26, 2004. Website Printout, Source: http://www.sciencenet.com.au/frames/profiles/negative/families/chromati/family.htm.

Treating $H_2S$ Wells With Centaur® HSL Catalytic Carbon, pp. 1-2, Mar. 26, 2004. Website Printout, Source: http://www.tfn.net/DEnvironmental/centaur.html.

McClinton, L., Hog Farm Converts Manure to Electricity, National Hog Farmer, Sep. 15, 2003m pp. 1-3. Website Printout, Source: http://nationalhogfarmer.com/magazinearticle.asp?magazinearticleid+182996&magazine_articleid. . .

"Effluent to Asset," Nutrient Management Technologies Ltd., 49 pages, Mar. 17, 2004. Website Printout, Source: http://www.nutientmtl.com.

Biofiltration Media, p. 1, Feb. 28, 2002. Website Printout, Source: http://www.w-m-t.com/biofilt.asp.

Aragonite Sand vs. Crushed Coral, pp. 1-2, Jul. 28, 2003. Website Printout, Source: http://www.geocites.com/CapeCanaveral/Hangar/6279/LetterAragoniteVsCrushedCoral.h . . .

Green Sulfur Bacteria, Soil Microbiology (BIOL/CSES 4684), pp. 1-3, Mar. 26, 2004. Website Printout, Source: http://soils1.cses.vt.edu/ch/biol_4684/Microbes/greensul.html.

Burnette, R., Purple Sulfur Bacteria, Soil Microbiology (BIOL/CSES 4684), pp. 1-3, Mar. 26, 2004. Website Printout, Source: http://soils1.cses.vt.edu/ch/biol_4684/Microbes/purprnb.html.

Wentzel, E., Thiobacillus, Soil Microbiology (BIOL/CSES 4684), pp. 1-4, Mar. 26, 2004. Website Printout, Source: http://soils1.cses.vt.edu/ch/biol_4684/Microbes/Thibacillus.html.

Lichtenfels, M., Thermococcus, Soil Microbiology (BIOL/CSES 4684), pp. 1-4, Mar. 26, 2004. Website Printout, Source: http://soils1.cses.vt.edu/ch/biol_4684/Microbes/thermococcus.html.

Biogeochemical Cycles, Soil Microbiology (BIOL/CSES 4684), Sulfur Oxidation, pp. 1-5, Nov. 23, 2004. Website Printout, Source: http://soil1.cses.vt.edu/ch/biol_4684/Cycles/Soxidat.html.

CPL Carbon Link, The Active Force in Carbon, Activated Carbon from CPL Carbon Link: Activated Carbon Properties, pp. 1-2. Website Printout, Source: http://www.activated-carbon.com/1-3.html, date unknown.

Chemviron Carbon, What is Activated Carbon?, pp. 1-2. Website Printout, Source: http://www.chemvironcarbon.com/carbon/definition/whatis.htm.

Chemviron Carbon, Adsorption, pp. 1-3. Website Printout, Source: http://www.chemvironcarbon.com/carbon/definition/adsorption.htm, 2002.

Activated Carbon in the Aquarium, pp. 1-3, 2002.

Ultralife Neutralizer' Automatic Denitrator, pp. 1-2. Website Printout, Source: http://www.ultralifedirect.com/denitrators.htm, date unknown.

WMT MBB, Moving Bed BioFilter, p. 1, date unknown.

Mazzei Injector Corporation, Mazzei AirJection® System, pp. 1-2, Jul. 21, 2003. Website Printout, Source: http://www.mazzei.net/industrial/wastewater_aeration.htm.

Mazzei Injector Corporation, Mazzei® Injectors, pp. 1-2, Nov. 23, 2004. Website Printout, Source: http://www.mazzei.net/industrial/index.htm.

Mazzei Injector Corporation, Mixing Eductors, pp. 1-2, Jul. 21, 2003. Website Printout, Source: http://www.mazzei.net/industrial/Tmixer.htm.

Mazzei Injector Corporation, Ozone Contacting, p. 1, Jul. 21, 2003. Website Printout, Source: http://www.mazzei.net/inductrial/ozone.htm.

Vortex Ventures, Radial Eductor II, pp. 1-4, date unknown.

TeeJet® Eductor Nozzle, p. 78, date unknown.

TM, TurboMix™ Plastic Mixing Nozzles, p. 106, date unknown.

* cited by examiner

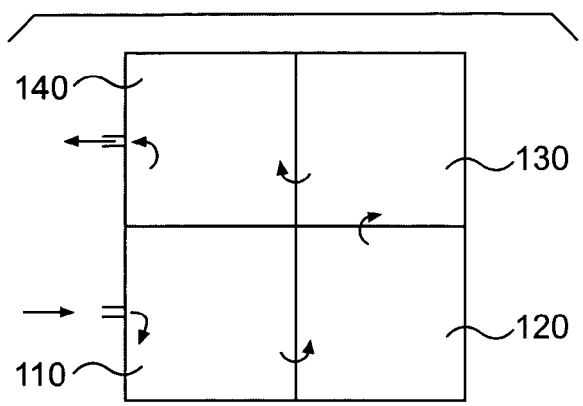
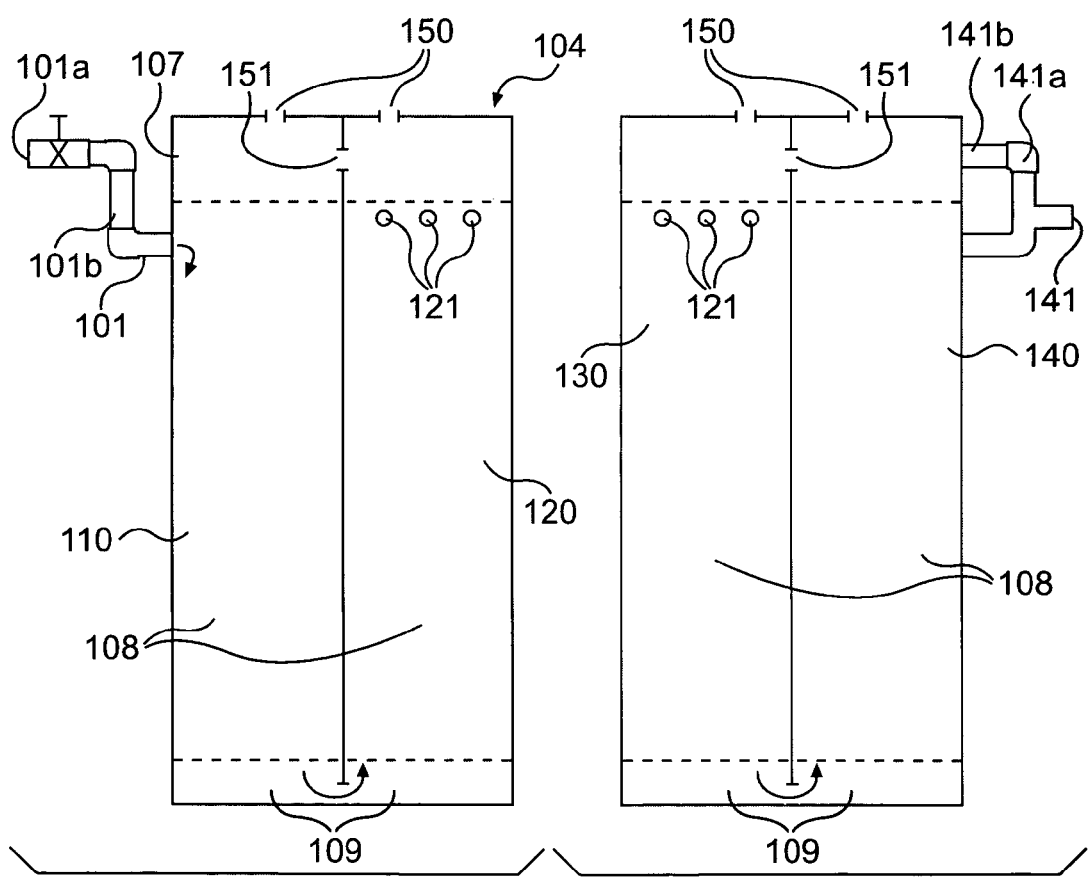
FIG. 8a
FIG. 8b
FIG. 8c

AUTOTROFIC SULFUR DENITRATION CHAMBER AND CALCIUM REACTOR

FIELD OF THE INVENTION

The present invention relates to apparati and methods for conditioning water in aquariums and similar environments for holding fish, invertebrates, and other aquatic creatures, including coral. More specifically the invention relates to denitration reactor systems and methods for removing nitrates and otherwise conditioning water for aquatic purposes in fresh water, brackish water and salt water applications.

BACKGROUND

The accumulation of nitrates is a major problem in both salt and fresh water aquariums and similar aquatic environments. Nitrates build up rapidly in these environments due to fish waste and the regular addition of food, which contains nitrogenous compounds. At high enough concentrations, nitrates are noxious to aquatic life. To address this problem, often polluted water from aquariums is replaced with new water frequently in order to maintain a healthy aquarium. The dumping of nitrate polluted water into the environment furthers the nitrate pollution of water supplies worldwide. This water changing is time consuming and may also be expensive to both aquatic hobbyists and commercial aquariums alike, especially if the aquarium is a salt water aquarium that is not in close proximity to the ocean, or other sources of unpolluted aquarium water.

Various methods, other than water changes, are known in the art for removing nitrates from aquariums. One common method is the use of protein skimmers to eliminate nitrogenous compounds before they are transformed into nitrates. Protein skimmers are constructed in a tube or tower having a collection cup at the top. These skimmers work by injecting massive amounts of very fine air bubbles into the tube. The rising air bubbles act as a lift in the tube, allowing the undesirable nitrogenous compounds to attach to the bubbles and rise to the surface, where they are captured in the collection cup and disposed of.

Another method involves reducing nitrates using bacteria. Examples of such systems are described in U.S. Pat. No. 4,995,980, to Jaubert; an article entitled "Nitrates Elimination by Autotrophic Denitration on Sulfur," by Christophe Soler; and an article by Marck Langouet, entitled, "The Autotrophic Denitration on Sulfur What's the Status?."

SUMMARY OF THE INVENTION

It is an object of the present invention to provide improved methods and systems for conditioning water in aquariums and similar environments.

The present invention includes novel biological systems and methods for efficiently reducing nitrate levels and otherwise conditioning aquarium water and water in similar environments. The methods and systems of the present invention maintain a healthy and efficient aerobic bacteria culture, reduce ammonia in the water to nitrite and nitrite to nitrate in an aerobic process, reduce oxygen in the water and generate $CO_2$ before the water is treated by anaerobic bacterial, maintain a healthy and efficient anaerobic bacteria culture, insure that a sufficient food supply is maintained for the bacteria culture, efficiently reduce nitrates to acceptable levels, control the pH to within safe levels, add healthy minerals to the water, and reduce odors caused by the production of hydrogen sulfide gas formed in the autotrophic denitration process. The systems of the present invention are relatively light in weight relative to the size of the aquarium or similar closed environment of water, are easy to use, need little maintenance, and are unlikely to clog or overflow.

One embodiment of the invention is directed to a process for conditioning aquarium water or other closed environments for aquatic life. The process comprises flowing water through a first chamber containing a first media supporting aerobic bacteria and then flowing the water through a second chamber containing a second media comprising sulfur that supports an anaerobic bacteria that will reduce nitrates to nitrogen gas through a biological process. Preferably, the aerobic bacteria are capable of reacting with ammonia and nitrites in the water, to generate nitrates, while also generating carbon dioxide and significantly decreasing the level of oxygen in the water to a minimum level. Preferably, the anaerobic bacteria are capable of being supported by the sulfur substrate even at times when the water being treated contains little or no nitrates. One such type of bacteria is *Thiobacilus denitrificans*, although other bacteria may be used as discussed below. The denitration process achieved by these bacteria reduces nitrate concentrations in the water, while at the same time decreasing the pH of the water. Preferably, the water is then flowed through at least one chamber to increase the pH of the water. By means of example only, the chamber might contain a calcium source. As water flows through a calcium chamber, the calcium source reacts with hydrogen ions in the water to increase the pH of the water. Preferably, the water flows from the sulfur chamber through multiple chambers having different water treatment characteristics. In one embodiment, several chambers have different calcium sources.

In salt water applications, especially ones having live coral, the use of multiple chambers with different calcium sources is highly preferred. These chambers in the preferred embodiment include dolomite, then aragonite, and then calcite, or other forms of calcium that respectively have the qualities and characteristics of these preferred forms of calcium. The water may then be flowed through one or more additional chambers or devices for degassing the water, removing additional contaminants, as well as adding oxygen to the water, before the water is returned to the aquarium.

Another embodiment of the invention is directed to a biological system for conditioning water in an enclosed environment for aquatic life. The system comprises a first chamber containing a first media capable of supporting aerobic bacteria. A second chamber is connected to the first chamber by a first pathway through which the aquarium water flows. The second chamber contains a second media, preferably sulfur, that is capable of supporting anaerobic bacteria, such as *Thiobacilus denitrificans* bacteria. A third chamber, which contains a first calcium source, may be connected to the second chamber by a second pathway through which the aquarium water flows. Additionally, a fourth chamber, containing a second calcium source, may be connected to the third chamber by a third pathway through which the aquarium water flows. In a preferred embodiment, a fifth chamber may be added for containing a third source of calcium. Preferably, the system includes one or more additional chambers or devices for degassing the water before the water is returned to the aquarium.

As explained below, the methods and apparati of the present invention may be used alone, or in connection with other filtration systems, and may be applied to large and small aquariums, to provide clean and healthy water to aquatic life, in an efficient and economic way that does not harm the environment. The disclosed methods and apparati can also be used, in whole or in part, in other applications where toxic nitrates must be removed from water and the water must be efficiently and economically treated. For example, the denitration and treatment processes of the present invention can be applied to aquatic farms, livestock farms, sewage treatment, the purification of drinking water, industrial waste water treatment, and similar applications where nitrates are generated in the water supply and must be controlled, along with other aspects of the water.

These and other embodiments of the invention will be discussed more fully in the detailed description of the embodiments.

BRIEF DESCRIPTION OF THE DRAWINGS

The accompanying drawings, which are incorporated in and constitute a part of this specification, illustrate exemplary embodiments of the invention and, together with the written description, serve to explain the principles of the invention.

In the drawings:

FIGS. 8a to 8c are diagrammatic representations of top and side views of arrangements of the various chambers of the biological system, according to an embodiment of the present invention.

DETAILED DESCRIPTION OF THE INVENTION

In the following description, reference is made to the accompanying drawings, in which is shown by way of illustration specific exemplary embodiments in which the invention may be practiced. These embodiments are described in sufficient detail to enable those skilled in the art to practice the invention, and it is to be understood that other embodiments may be utilized and that changes may be made without departing from the scope of the present invention. The following description is, therefore, not to be taken in a limited sense. Wherever possible, the same reference numbers are used throughout the drawings to refer to the same or like parts.

The methods and systems of the present invention can be applied to different types of aquarium and similar environments for aquatic life, in both fresh water and salt water applications. The systems and methods of the present invention can be designed to control the quality of water supporting fish, as well as coral and other aquatic life, in a variety of different aquariums and similar environments, ranging from relatively small household aquariums to aquariums of millions of gallons, or more. While the broadest principles of the invention are applicable to many, if not all, of these potential applications, preferred methods and systems are disclosed for specific applications, or ranges of applications.

The physical characteristics of the systems of the present invention can vary considerably, while still practicing the present invention. Examples of some, but by no means all, of the potential embodiments of the present invention are shown in FIGS. 2 through 28b.

Figure 1:
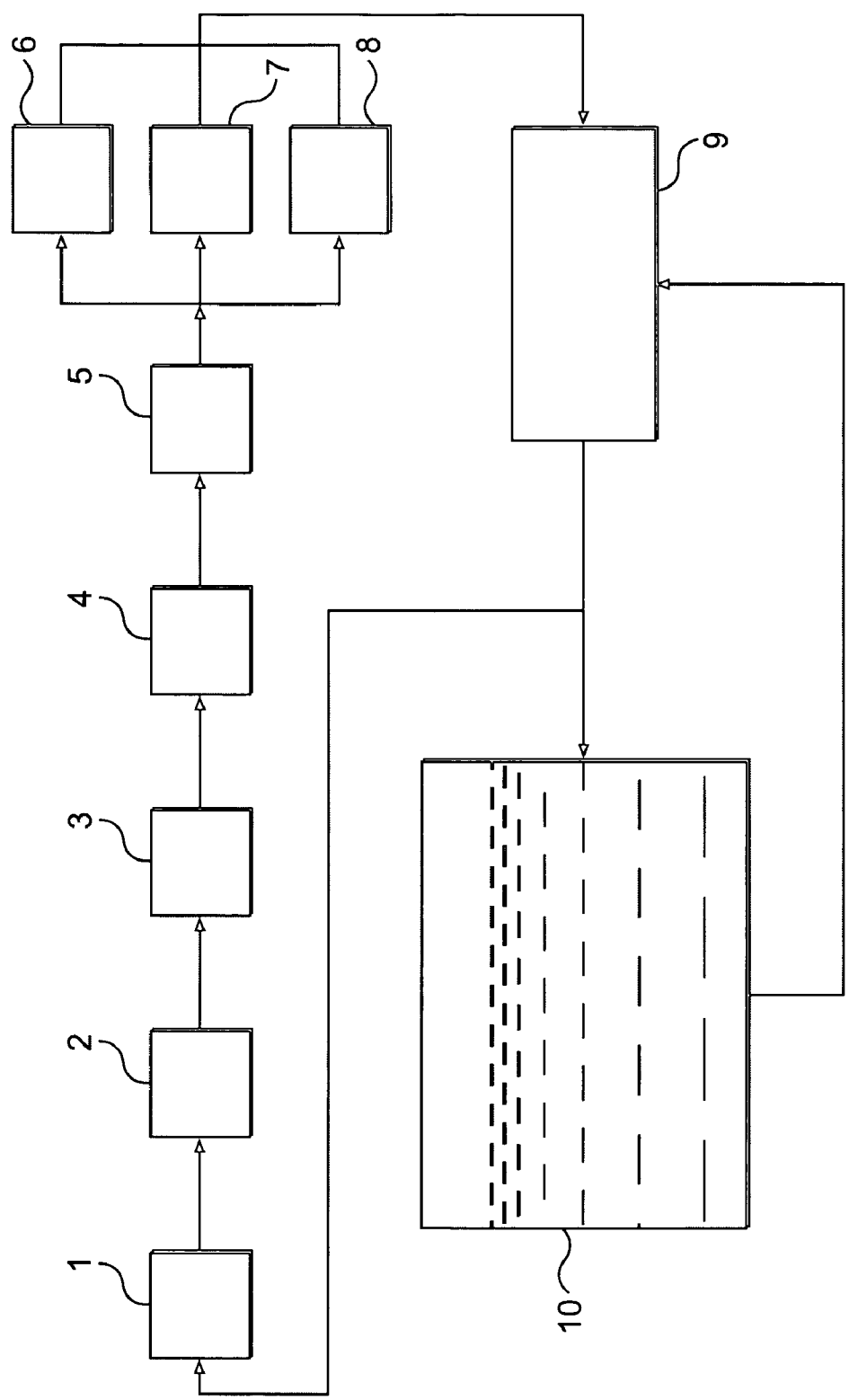
FIG. 1 is a process flow diagram representing the flow of the various process steps which may be used for conditioning water, according to the present invention.

FIG. 1 is a process flow diagram illustrating various process steps 1 to 8 of the present invention, which will now be used to describe the process of the present invention in general terms. All of the process steps shown in FIG. 1 are not required for every embodiment of the invention. Rather, the process steps utilized may be chosen as desired to meet the requirements of the aquarium, or other aquatic system, for which the process is employed. Examples of preferred embodiments of the invention will also be provided.

Referring to FIG. 1, the process of the invention may comprise a filtration step 1, in which the water to be treated passes through a filter, followed by an aerobic bacteria processing step 2, and an anaerobic bacteria processing step 3. Additional process steps may include steps for adding desirable nutrients to the water, adjusting pH, reducing undesirable gases, adding oxygen to the water, or any other step which is desirable for further conditioning of the water. For example, in steps 4 and 5, the water being processed is flowed over two separate chambers to add calcium and increase pH. In one embodiment, the water flows over two separate calcium mixtures. Step 6 represents a degassing process wherein the water is flowed through a degassing chamber which, among other things, removes undesirable gases and compounds from the water. Alternatively, or in addition to degassing step 6, a process step 7 may be used for reducing hydrogen sulfide gas from aquarium water by flowing the water through an activated carbon chamber. Still another alternative process is represented by step 8, in which water is flowed through a chamber, termed "the oxytower," which contains algae and/or bacteria in order to remove certain undesirable contaminants, increase pH and add oxygen to the water. Each of these steps is not necessary for each potential application to a particular aquarium or problem.

The process steps shown in FIG. 1 may each be performed in separate chambers. Alternatively, two or more of the process steps may be performed in a single chamber or a chamber or housing having multiple sections devoted to each of the process steps performed therein. Examples of systems for carrying out the processes of the present invention will be provided in the form of preferred embodiments discussed herein.

The process steps of FIG. 1 are associated with each other so that water to be treated flows from the aquarium 10, or other closed environment, through one chamber to another and then returns to the aquarium. The system in which the process steps of FIG. 1 occur will at times be referred to herein as the Nitrafix system.

The water to be treated may flow directly from the aquarium to the Nitrafix system, and then return to the aquarium. Alternatively, the aquatic system may include a sump 9, as shown in FIG. 1. Such sumps are known in the aquarium art for collecting, filtering and otherwise treating aquarium water outside of the aquarium tank. Water flows from the aquarium tank to the sump and then returns to the aquarium tank. All or a portion of the water flowing from the sump may be diverted to the Nitrafix system for processing before the water is returned to the aquarium tank. After processing by the Nitrafix system, the water may be returned either to the sump, as shown in FIG. 1, or directly to the aquarium tank.

Generally, the flow rate through the sump is approximately three times the volume of the aquarium per hour, as is conventionally known. The amount of water flowed through the denitration system of the present invention is significantly less. For example, it has been found that the water applied to the denitration chamber according to the present invention, on the other hand, can be about 1% of the volume of the aquarium, per hour and perform well. The particular flow rate for a specific application can be varied and optimized, through routine testing. A flow rate ranging from about 1% to about 10% of the volume of the aquarium per hour is believed to be optimum for most applications, although about 1% to about 3% may be more preferable for aquarium applications.

The means for forcing the water through the Nitrafix system may be any means known in the art, such as use of an air pump, air stone or mechanical pumping device. A gravity feed, such as where the water is siphoned from the aquarium tank to the Nitrafix system may also be used, as is known in the art.

A more in-depth discussion of each of the process steps of FIG. 1 will now be provided. Step 1 of the process is an optional filtering step by which particulates or other solid matter is removed from the water to be treated. The water to be treated may contain various types of solid mater, such as fish waste, sand, and algae. Removing this solid matter from the water not only provides for a cleaner, more attractive aquarium, but also helps to prevent clogging of the Nitrafix system. This filtration may be accomplished by using a mechanical filter, such as a screen, or cartridge filter. Other filters known in the art may also be used. In order to prevent clogging of the Nitrafix, it is preferred that the filter remove particulates which are 50 microns or larger.

Step 2 of the process, shown in FIG. 1, uses aerobic bacteria processing to treat the water. The water to be treated is flowed through a chamber which contains a support media that preferably has a large surface area on which the aerobic bacteria may colonize. Examples of such media include sand, plastic particles, and similar media. The aerobic bacteria exist and thrive in the aquarium water and will colonize on the media within the chamber as the system is operated. The type of aerobic bacteria utilized in step 2 may include, for example, *nitrosomonas* and *nitrobacter* bacteria. These naturally occurring bacteria break down ammonia and nitrites in the aquarium water and form nitrates. In the process of breaking down the ammonia and nitrites, the aerobic bacteria produce $CO_2$ and reduce the levels of dissolved oxygen in the water. Preferably, the chamber housing the aerobic bacteria, as well as the media in the chamber, are sized so that most, if not all, oxygen in the water is removed, as the water flows through the chamber. While this chamber preferably breaks down ammonia and nitrites, the chamber could also be designed to use other chemical or mechanical agents that take all or most of the oxygen out of the water, before it flows through the next chamber, and still be effective in reducing nitrates from the water.

The total average dissolved oxygen content in water in aquariums with normal loading and feeding is approximately 5 ppm. Of course, the average level of dissolved oxygen for each aquarium may be greater or less than 5 ppm, depending on the fish load and feed supply to the aquarium. It is preferable that the process of step 2 substantially reduce the dissolved oxygen content of the water leaving the aerobic bacteria processing chamber, as compared with the level of dissolved oxygen in the water entering the chamber, in an amount sufficient to significantly increase the nitrate reduction in chamber 2 over what it would have been if the step 2 process had not been employed. Thus, it is preferable that the total dissolved oxygen content be reduced to, for example, less than 5 ppm, and more preferably, to less than 2 ppm, and still more preferably to about 1.64 ppm or less.

Following the aerobic process of step 2, an anaerobic processing step 3 is next employed to autotrophically reduce the concentrations of nitrates in the water by a process known as sulfur denitration. In the preferred embodiment, sulfur denitration utilizes sulfur oxidizing bacteria such as *Thiobacillus denitrificans*. Under aerobic conditions, these bacteria will use oxygen to oxidize sulfur. However, when insufficient oxygen is present, the bacteria use nitrate to oxidize sulfur to sulfate. Thus, the reduction of oxygen in step 2 permits nitrates existing in the water to be efficiently utilized by the bacteria in an anaerobic type process. In this manner, the concentration of nitrates in the water is reduced in the step 3 process.

In addition to reducing nitrates, the bacteria in the denitration chamber may also reduce other undesirable nitrogen compounds, such as nitrites. The denitration process also decreases the pH of the water. It should also be noted that for the first few days of operation from startup, the denitration chamber may produce nitrite. However, the amount of nitrite produced will thereafter decrease and the chamber will preferably begin to help reduce nitrite levels.

The aerobic process of step 2 helps to insure that the oxygen concentration is sufficiently decreased, while the nitrate concentration is sufficiently increased, in order to maintain an efficient anaerobic sulfur denitration process. Consequently, less support media for the anaerobic bacteria is needed to remove the desired amount of nitrates than if the aerobic process was not used. This allows for a smaller, and significantly lighter weight, denitration chamber for the step 3 process, since the sulfur media used in the chamber can be relatively heavy. Additionally, the reduction in the level of dissolved oxygen in the chamber may help to prevent the proliferation of certain undesirable sulfate reducing bacteria, such as *Beggiatoa Alba*. *Beggiatoa Alba* are known to be filamentous, creating a thick, slimy coating on the sulfur media, which could cause the chamber containing the sulfur media to clog.

The aerobic bacteria process of step 2 should preferably occur inline with, and in close proximity to, the denitration step 3, so as to prevent reoxygenation of the water before it enters the denitration chamber.

The applicant believes that it is also possible that carbon dioxide produced by the aerobic bacteria in step 2 allows the bacteria in the denitration chamber to remove nitrates more efficiently. However, it is not intended that the above described mechanisms of the bacteria processes limit the full scope of the invention as defined by the claims.

The denitration step 3 utilizes a media that supports the anaerobic bacteria that break down nitrates in the water. Preferably the media will support the anaerobic bacteria even when there are low concentrations of nitrates in the water. In a preferred embodiment, the media is sulfur and the bacteria is *Thiobacilus denitrificans*. As discussed above, under the proper conditions where oxygen levels are low enough, these bacteria carry out anaerobic respiration, reducing nitrates while oxidizing elemental and/or reduced sulfur to sulfate. For example, the dissolved oxygen content of the water entering the denitration chamber is preferably between 0 to 2 ppm. Other conditions, such as the temperature and the pH of the water should also be maintained at healthy levels for the bacteria. For example, if *Thiobacillus denitrificans* are employed, the water in the chamber should preferably have a temperature ranging from 25 to 30 degrees Celsius and a pH ranging from about 6 to about 8, although the bacteria may function outside of these ranges. Other bacteria which reduce nitrate while oxidizing sulfur may also be used in place of or in addition to *Thiobacilus denitrificans*. Examples of such bacteria which may be acceptable for use in the present invention include *Thiobacillus versutus, Thiobacillus thyasiris, Thiosphaera pantotropha, Paracoccus denitrificans*, and *Thiomicrospira denitrificans*. The scope of the invention includes the application of any anaerobic bacteria that can survive in a media within a chamber and efficiently and effectively perform the denitration process of the present invention on a flow of water having nitrates that must be removed.

The structure enclosing or creating the denitration chamber is preferably opaque so that little or no light is in the chamber. This is because the anaerobic bacteria do not like light. If placed in a lighted environment, the bacteria will move toward the center of the chamber where the environment is darker. This would thereby decrease the efficiency of the bacteria in eliminating or reducing nitrates from the water.

The level of nitrate in the water at the outlet of the denitration chamber may depend on the amount of nitrate in the inlet flow to the denitration, the flow rate of water through the denitration chamber, and contact time of the water with the sulfur media. Under optimum conditions, the denitration chamber may reduce substantially all of the nitrates. For example, Nitrate levels at the outlet may range from about 0 ppm to about 20 ppm, and more preferably from about 0 ppm to about 10 ppm, and still more preferably from about 0 to 5 ppm.

The pH of the water will be reduced during the denitration process. Consequently, the pH of the aquarium water leaving the denitration chamber 120 may range from about 4 to about 8, and more preferably from about 5 to about 7. Such lower ranges may not be healthy for some types of fish. The pH of the water leaving the denitration chamber may be adjusted by, for example, adjusting the flow rate of the water through the chamber. Another way to adjust the pH to desirable levels is to add calcium to the water. The calcium is beneficial to many sea organisms, such as corals, that use the calcium to form their skeletons and/or shells. Furthermore, the bacteria used in the aerobic and anaerobic processes of the Nitrafix are more effective if the pH is kept within a healthy range for the particular bacteria being used, such as, for example, a pH of 6 to 9. Therefore, in closed systems, where the water is continually recirculated through the Nitrafix system, using calcium to maintain the proper pH can help to make the process more effective.

In order to adjust the pH of the water to the desired range, as well as to add calcium to the water, the process of FIG. 1 includes steps 4 and 5, in which the water leaving the denitration chamber is flowed over multiple calcium sources. Different calcium sources, which have different solubilities, are preferably used to control not only the amount and type of calcium which is dissolved in the water, but also to increase the life of the calcium media in the system before new calcium media must be added. Acceptable sources of calcium include dolomite, aragonite, calcite, crushed coral, as well as other known sources. These sources of calcium include other minerals and trace elements, such as magnesium and strontium, which can also be beneficial to aquatic life. As the water flows through the calcium sources, the calcium sources dissolve to add beneficial amounts of the calcium and other elements to the water, in addition to increasing the pH of the water. While FIG. 1 shows the calcium being added in two steps, the calcium may be added in a single step, or in three or more steps.

Adding the calcium in multiple steps has the benefit of allowing the calcium source to be arranged to give long life with a minimum amount of clogging. For example, the calcium source may be arranged so that the water coming from the denitration chamber contacts the least soluble calcium sources before the other more soluble calcium sources. This will result in increased life of the calcium media in the system because the acidity of the water is reduced when it contacts the less soluble calcium sources, so that the water having a reduced acid content will dissolve the more soluble calcium media at a slower rate. Furthermore, very fine media, such as calcite sand, can create clogging problems within the calcium chambers. Clogging may be prevented by utilizing a large media, such as crushed coral, in the same chamber as the calcite sand. Specific examples of how the calcium should be arranged to provide for long life and reduced clogging will be provided in the preferred embodiments.

In certain applications, no calcium may be added by omitting steps 4 and 5 altogether. In such applications, the pH of the water is preferably raised by other means before it is resupplied to the aquarium.

A degassing step 6 may also be added to the process. The degassing step may be performed in a degassing chamber in which the water is degassed and re-oxygenated before returning to the aquarium tank. The degassing step provides the advantages of reducing odorous gases, such as hydrogen sulfide gas, and other undesirable contaminants, which may be emitted from the biological processes occurring within the chambers. Degassing can also be useful for raising the pH of the water by reducing carbon dioxide levels.

For example, in one embodiment a conventional protein skimming step may be added to the process of FIG. 1, which removes undesirable compounds, such as nitrogenous and other organic compounds, raises the pH, and adds oxygen to the water. Other systems for degassing, which are known in the art, may also be used for step 6, including a dripping system, such as a degassing tower, compressed air through stone, and the Venturi system.

Figure 16:
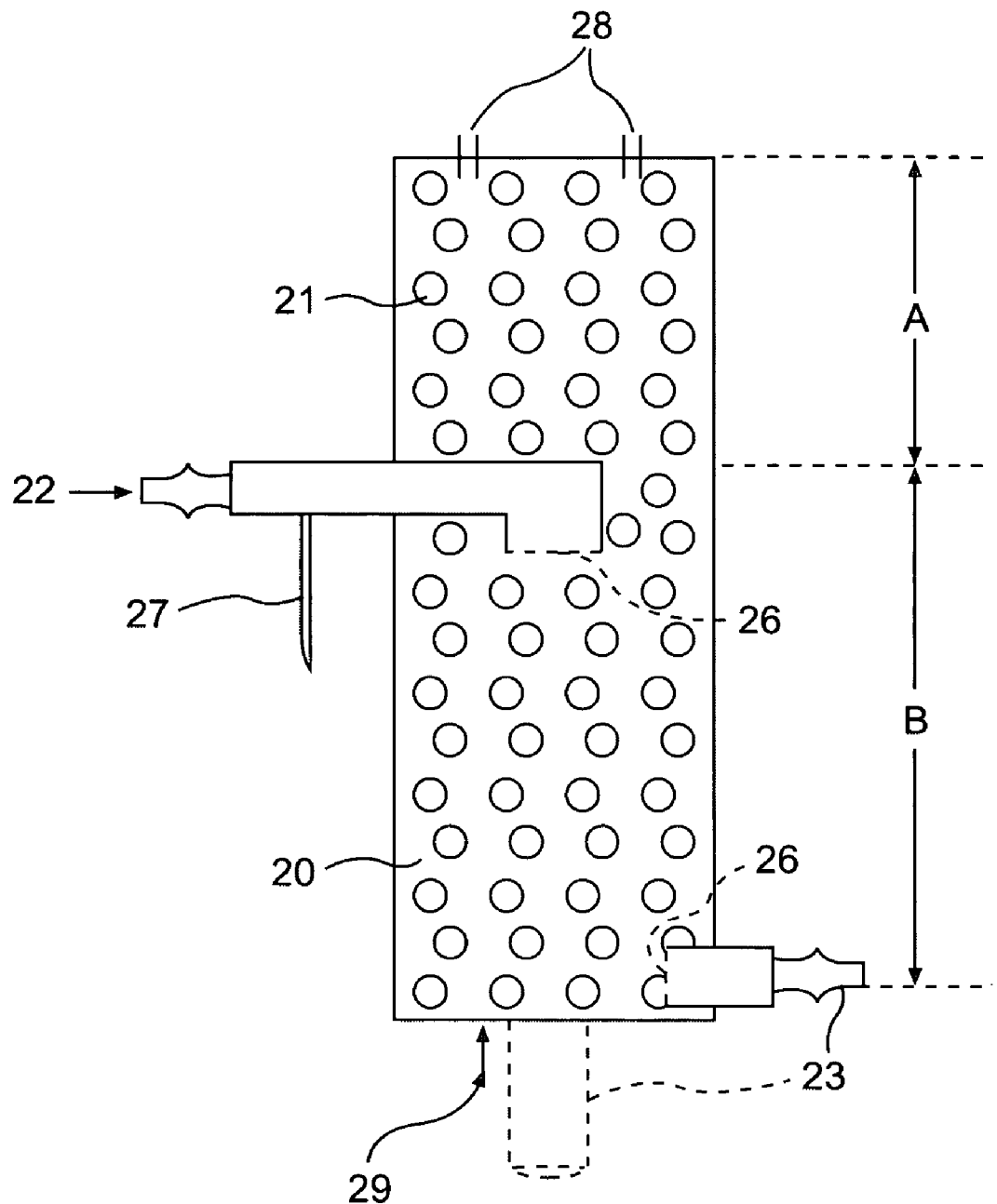
FIG. 16 is a diagrammatic representation of an activated carbon chamber, according to an embodiment of the present invention.

Another optional process step utilizes an activated carbon chamber, as illustrated in FIG. 16. The chamber 16 may be added to the system for reducing levels of hydrogen sulfide gas. When the Nitrafix system is running at the desired flow rate, it produces relatively little, if any, hydrogen sulfide. However, when the flow through the Nitrafix system is stopped for a period of time, or if the flow is too low to provide sufficient nitrate to the bacteria in the denitration chamber, certain types of sulfur reducing bacteria will begin to reduce sulfate to hydrogen sulfide. If large enough amounts of hydrogen sulfide gases are produced, this can be lethal to aquatic life, such as fish. In order to reduce the amount of hydrogen sulfide generated by the Nitrafix system during these down times to acceptable levels, an activated carbon chamber 20, as illustrated in FIG. 16, may be employed. Such a chamber may also reduce other gases that are generated through the process of the present invention.

In one preferred embodiment, chamber 20 is filled with activated carbon 21. The chamber 20 comprises an inlet 22 for allowing water to flow into the chamber, which is located a distance "A" from the top of the chamber, and an outlet 23 located near the bottom of the chamber. Water entering chamber 20 flows down through wet zone "B" of the activated carbon chamber, which acts to degas and adsorb contaminants, including hydrogen sulfide gas in the water. Gas emissions, including hydrogen sulfide gas, flow up through dry zone "A" of the activated carbon chamber and out through vents 28. The hydrogen sulfide gas is adsorbed by the activated carbon in the dry zone, thus reducing the "rotten egg" smell which is characteristic of hydrogen sulfide gas. Screens 26 located at the mouths of inlet 22 and outlet 23 help prevent the chamber from becoming clogged.

Preferably, chamber 20 is employed in the process after the denitration step and before the water is returned to the aquarium tank. For example, chamber 20 may be employed directly at the outlet of the denitration chamber, or after the calcium chamber or chambers of the Nitrafix system. Alternatively, chamber 20 may sit in the sump. For example, the chamber may be fastened to the edge of the sump by attachment 27. As shown in FIG. 16, the outlet 23 may be placed on the bottom surface 29 of chamber 20, rather than on the side surface, as indicated by the dotted lines. Preferably, chamber 20 should be placed at an elevation which is above the water level in the sump so that the water from chamber 20 may run down into the sump.

Activated carbon, or any other media known in the art which would allow removal of the hydrogen sulfide gas, could be used in chamber 20. Examples of preferred types of activated carbon for use in the present invention are those made from wood or coconut shells. In one embodiment the activated carbon is Granula Activated Carbon (GAC). The activated carbon granules are preferably small in order to provide a high surface. For example, the activated carbon may have an average granule size of from ¼ to ⅛ inches or smaller.

Alternatively, the activated carbon system may include multiple chambers. For example, a first wet carbon chamber through which the water being treated flows may be utilized for removing contaminants, such as hydrogen sulfide gas, from the water. A second dry carbon chamber located above the water level could be used to remove undesirable gaseous emissions. Media other than activated carbon may be used in these systems, as long as the media provides the desired adsorption of the contaminants to be removed.

Yet another novel processing step 8, which may be added to the Nitrafix process, involves the use of algae and bacteria to break down and/or remove unwanted contaminants in the water. This process, which is performed in a chamber called "the oxytower," will add oxygen, raise the pH, remove phosphates, sulfates and remaining nitrates from the water. A detailed discussion of the oxytower is provided below in the description of the preferred embodiments.

Still another processing step, not shown in FIG. 1, may be added to the process of FIG. 1 for reducing sulfate and/or hydrogen sulfide concentrations in aquarium water. This process step utilizes a desulfator, which will be described below in the description of the preferred embodiments. The process for reducing sulfates may potentially be carried out anywhere in the process. For example, the process may be carried out directly after the denitration step 3, or after the calcium step 5.

While FIG. 1 indicates that any one of process steps 6, 7 and 8 may be used to treat the water, in other embodiments a combination of these steps may be added to the process in order to achieve the desired water quality. For example, both an activated carbon chamber and a protein skimmer may be used. In addition, in some applications the water leaving the denitration chamber 2 can flow directly to an oxytower or degassing tower and then to the aquarium.

The materials for constructing the systems of the present invention described in this application, including the chambers and connecting pipes for these systems, are preferably chosen to be safe and non-toxic to aquatic life and are corrosion resistant. Examples of such materials include plastics, such as PVC, polyethylene, polypropylene, methacrylic or acrylic plastic, or fiber glass reinforced plastic (FRP), or metals, such as stainless steel.

PREFERRED EMBODIMENTS

Certain preferred embodiments will now be described. These embodiments are not to be taken in a limiting sense, but as illustrations of the various concepts of the present invention.

Figure 2:
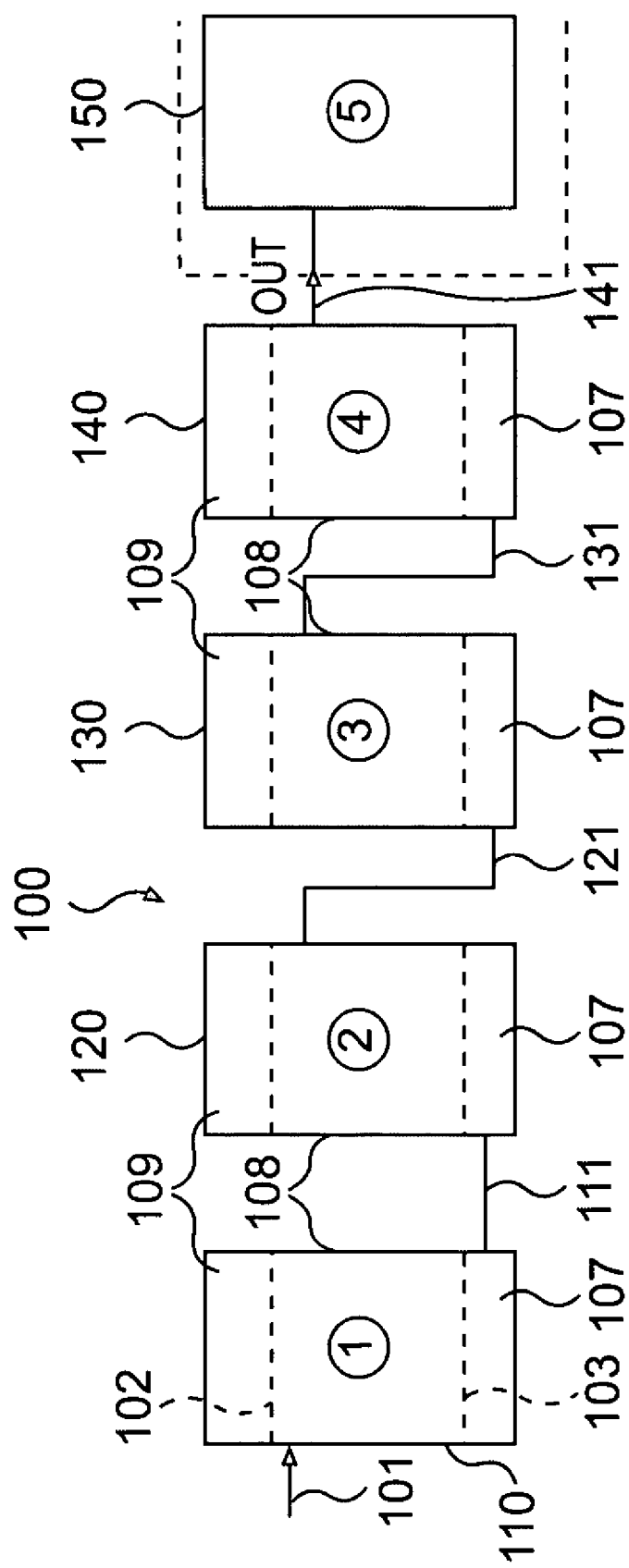
FIG. 2 is a diagrammatic representation of one system for conditioning water for aquatic life, according to the present invention.

FIG. 2 provides a diagrammatic representation of one embodiment of the Nitrafix system for conditioning aquarium water, according to the present invention. The Nitrafix system 100, as illustrated in FIG. 2, comprises an aerobic bacteria chamber 110, a denitration chamber 120, containing anaerobic bacteria, and two chambers, 130 and 140, which contain calcium sources. The system may also comprise an additional chamber 150, which is used as a degassing chamber.

A detailed description of chambers 110, 120, 130, and 140 of system 100 will now be provided with respect to FIGS. 3, 4, 5, and 6, respectively. As shown in FIGS. 3, 4, 5 and 6, each of the chambers is divided into three separate sections by perforated plates 102 and 103. The top section 109 of each chamber may be filled with activated carbon, which is useful for absorbing or removing odorous gases which may be emitted from the biological processes occurring within the chambers, such as the hydrogen sulfide gas emitted from the denitration chamber 120. Section 108 of each chamber is where the active processes of the system 100 occur within each chamber. For example, section 108 is filled with a media which supports the aerobic and anaerobic bacteria of chambers 110 and 120, respectively, and the calcium sources of chambers 130 and 140. The bottom section 107 of each of the chambers is an empty zone, which allows for improved circulation and dispersion of the water through the media in section 108.

Figure 3:
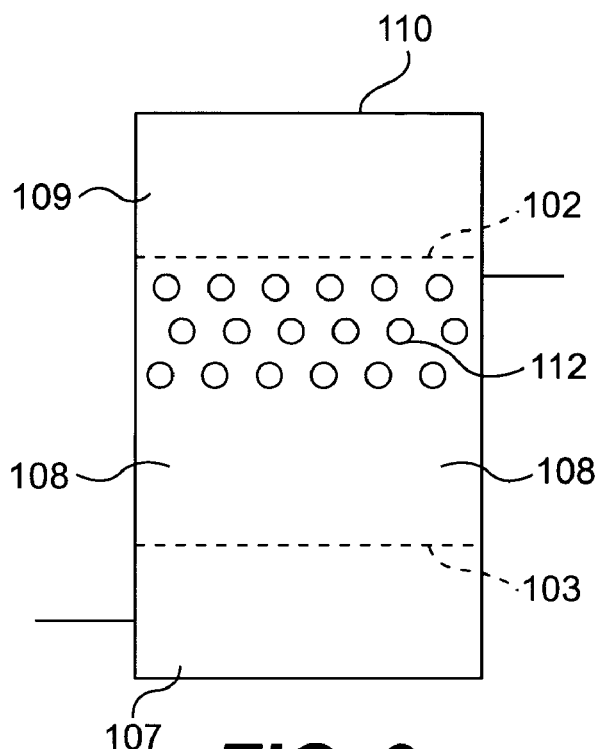
FIG. 3 is a diagrammatic representation of a chamber containing floating media capable of supporting aerobic bacteria, according to an embodiment of the present invention.

FIG. 3 illustrates one example of the aerobic bacteria chamber 110 of system 100. Section 108 of chamber 110 may be partially or completely filled with a support media 112, which acts as a substrate for the aerobic bacteria. The aerobic bacteria already exist in the water of the aquarium and will readily colonize on the substrate. The media 112 may be any type of media that can support colonization of aerobic bacteria. While a media having any practical size and shape may be used, media having a high surface area is preferred. For example, sand and other media having relatively high surface areas may be used. One preferred form of support media is plastic, which may be in the form of small spheres or tubes, although any shape known in the art may be used. The plastic media is lightweight and may float in the aquarium water. It does not clog easily, and provides a large surface area for bacterial colonization. One example of such a plastic media is known as biofilm. Examples of biofilm which may be used include Kaldnes or Bee-Cell, both of which are manufactured by Water Management Technologies, Inc. Other media like Bio-Chem stars from RENA may also be used.

Figure 4:
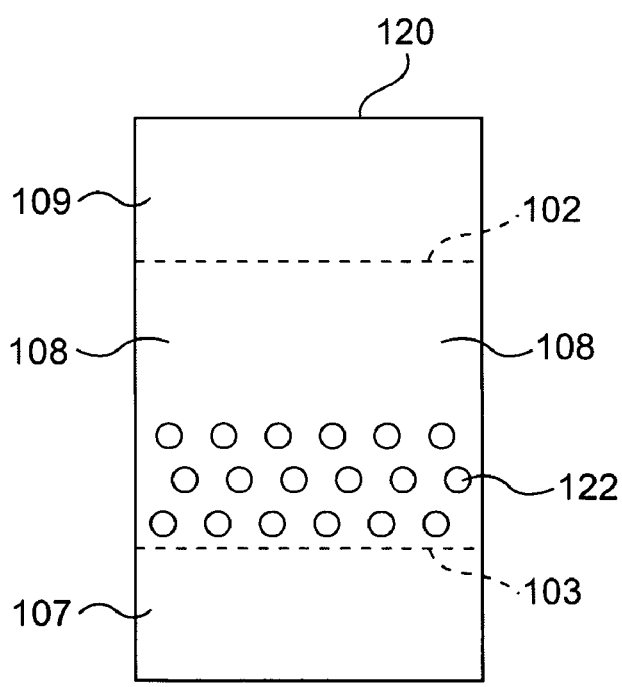
FIG. 4 is a diagrammatic representation of a denitration chamber containing sulfur media capable of supporting anaerobic bacteria, according to an embodiment of the present invention.

FIG. 4 illustrates one example of denitration chamber 120, according to an embodiment of the invention. Section 108 of the denitration chamber 120 may be filled partially or completely with a media 122 comprising sulfur, which supports the bacteria used in the anaerobic process. Preferably most or all of the chamber is filled with sulfur, so that the chamber will have a long life. Preferably, the sulfur should have a size and shape which maximize surface area, so that more anaerobic bacteria can live in a given space. In one preferred embodiment, the media may comprise 90% or more sulfur by weight, and more preferably 99% to 100% sulfur by weight. Thus sulfur preferably has a granular or pastille shape with a diameter of 3 to 5 mm, although any size and shape known in the art may be used. This media preferably has a relatively long life in order to avoid having to frequently replace the media. For example, some media known in the art may have a life time of up to 20 years or more.

The chamber, and thus the amount of sulfur and anaerobic bacteria that can be held by the chamber, preferably is sized and shaped to contain sufficient anaerobic bacteria to reduce the nitrates in the water to safe levels, over an extended period of time, preferably for at least 1 to 10 years. The walls of the chamber are preferably opaque. The degree of reduction of nitrates in the water depends on a number of variables, including the flow rate of water through the chamber, the surface area of the supported media, the level of nitrates in the water before processing with the Nitrafix, and the total volume of water to be treated.

Figure 5:
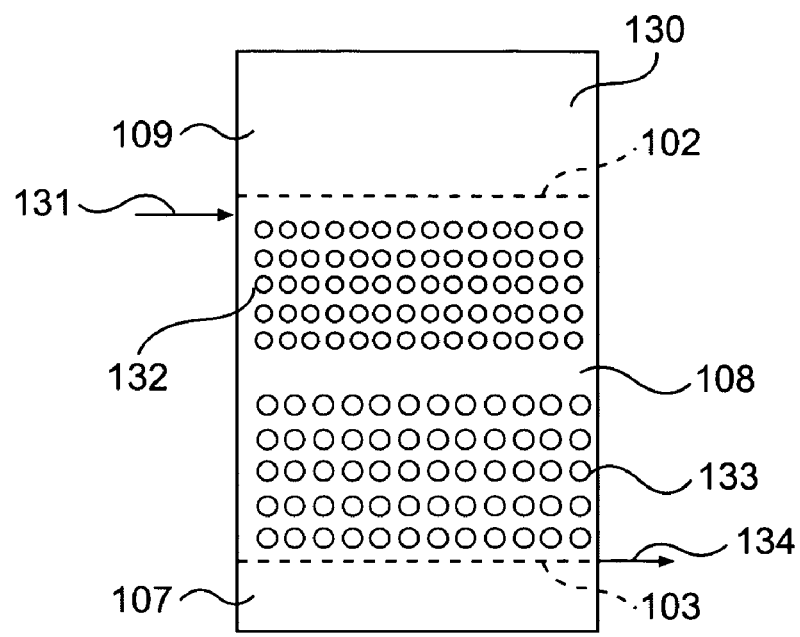
FIGS. 5 and 6 are diagrammatic representations of chambers of the biological system which contain arrangements of media comprising calcium, according to certain embodiments of the present invention.
Figure 6:
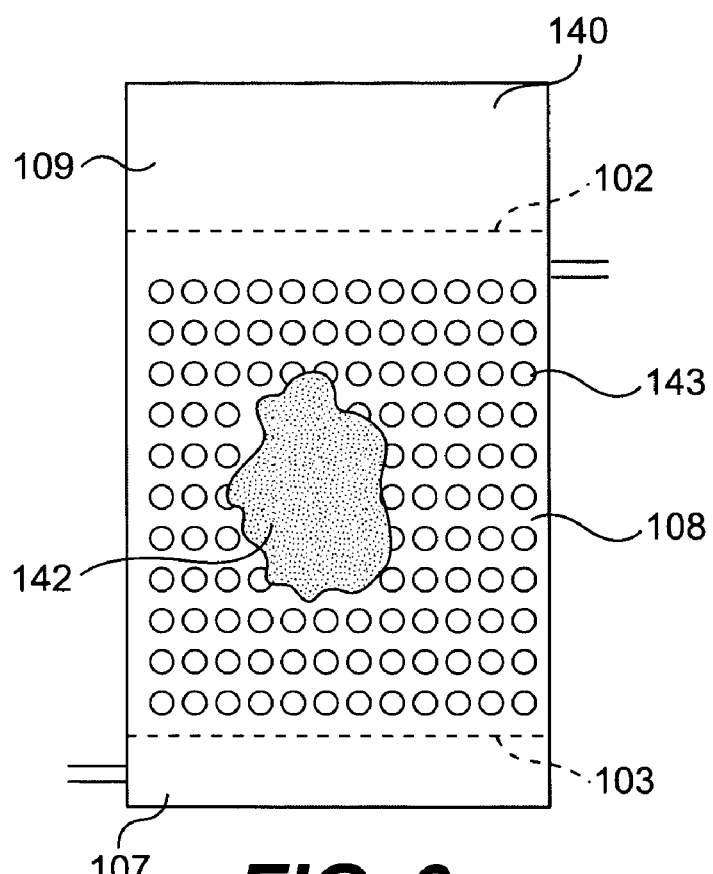

Referring to FIGS. 5 and 6, section 108 of calcium reaction chambers 130 and 140 may be filled partially or completely with a media comprising calcium. Preferably, multiple sources of calcium may be used. As discussed above, examples of calcium media which may be used include crushed coral, carbonate minerals such as dolomite ($CaMg(CO_3)_2$), and forms of $CaCO_3$, such as aragonite and calcite. For example, the media may be in a gravel form having an average diameter of 3 to 5 mm.

As shown in FIG. 5, the portion of section 108 which is nearest to the inlet 131 preferably is filled with dolomite 132, while the portion nearest to the outlet 134 is filled with aragonite media 133. Water from the denitration chamber first flows through the dolomite media, which has a rate of solubilization that is slower than that of aragonite. As the water flows over the dolomite, the pH of the water is raised (i.e., the acidity of the water is decreased). The water having decreased acidity then flows through the faster solubilizing aragonite media, which results in the aragonite media being dissolved more slowly than if it had been dissolved in the more acidic water entering chamber 130. In this manner the longevity of the media in the calcium chamber is increased and a desirable mineral content for the water is achieved.

FIG. 6 illustrates one example of an arrangement of calcium media which may be used in reaction chamber 140. Section 108 of chamber 140 is filled with calcite 142, which is surrounded by crushed coral 143. In one embodiment, the calcite media may be in the form of sand, which is contained in a water permeable bag. This arrangement has the benefit of preventing clogs in the chamber, since the water can easily circulate through the crushed coral surrounding the calcite. The calcite is beneficial for aquariums containing coral, algae, and invertebrate, which use calcite to make their skeletons and/or shells. In an alternative embodiment (not shown) for chamber 140, a calcium media fills the lower portion of section 108, while activated carbon is placed in the top portion of section 108. The activated carbon in section 109 remains dry, while water flows through the activated carbon in section 108. In this embodiment, hydrogen sulfide gas is removed from the water by the activated carbon in section 108, while the activated carbon in section 109 reduces hydrogen sulfide gas emissions, similarly as described above with respect to the activated carbon chamber of FIG. 16. The volume of activated carbon in section 108 may be approximately equal to the volume of dry activated carbon in section 109, although the amounts in either section may be optimized to provide the desired contact time between the activated carbon and either the water in section 108 or the emissions in section 109, in order to obtain the desired benefits of the activated carbon.

In general applications, sulfur used in the denitration chambers may have a useful life within the range of 20 years, while the calcium when placed in the preferred embodiment may have a life of about 1 to 5 years. In general, media having longer life times is preferable in order to increase the time period between media replacements. In larger applications, at least certain components and materials, such as sulfur, calcium, and other media, etc. need to be periodically replaced or cleaned.

As discussed above, a degassing chamber 150 may be added to the biological system 100, as illustrated in FIG. 2. While the degassing chamber 150 may be used for smaller aquariums, it is more often used for larger aquariums. Any conventional degassing systems, such as those discussed above, may be used as the degassing chamber 150. Additionally, the activated carbon chamber of FIG. 16 or the oxytower of FIG. 18, may also be used in place of degassing chamber 150.

Water may be forced through the chambers using any workable arrangement. In one embodiment, as can be seen from the flow arrangements of FIG. 2, water flow through aerobic chamber 110 is from top to bottom, while the direction of flow in chambers 120, 130 and 140 is from bottom to top. A flow rate from the bottom to the top in all, or at least chambers 120, 130, and 140, is preferred because such a flow helps prevent clogs in these chambers and allow gases formed in the chambers to better escape through the tops of the chambers. The chamber covers preferably are perforated so as to allow the gases to escape. Regarding degassing chamber 150, the flow through the chamber may be from top to bottom, as shown in FIG. 2.

The chambers of the biological system 100 may have any workable shape, such as a cylindrical or box shape. The size of the chambers may also vary according to the requirements of the aquarium.

Figure 14:
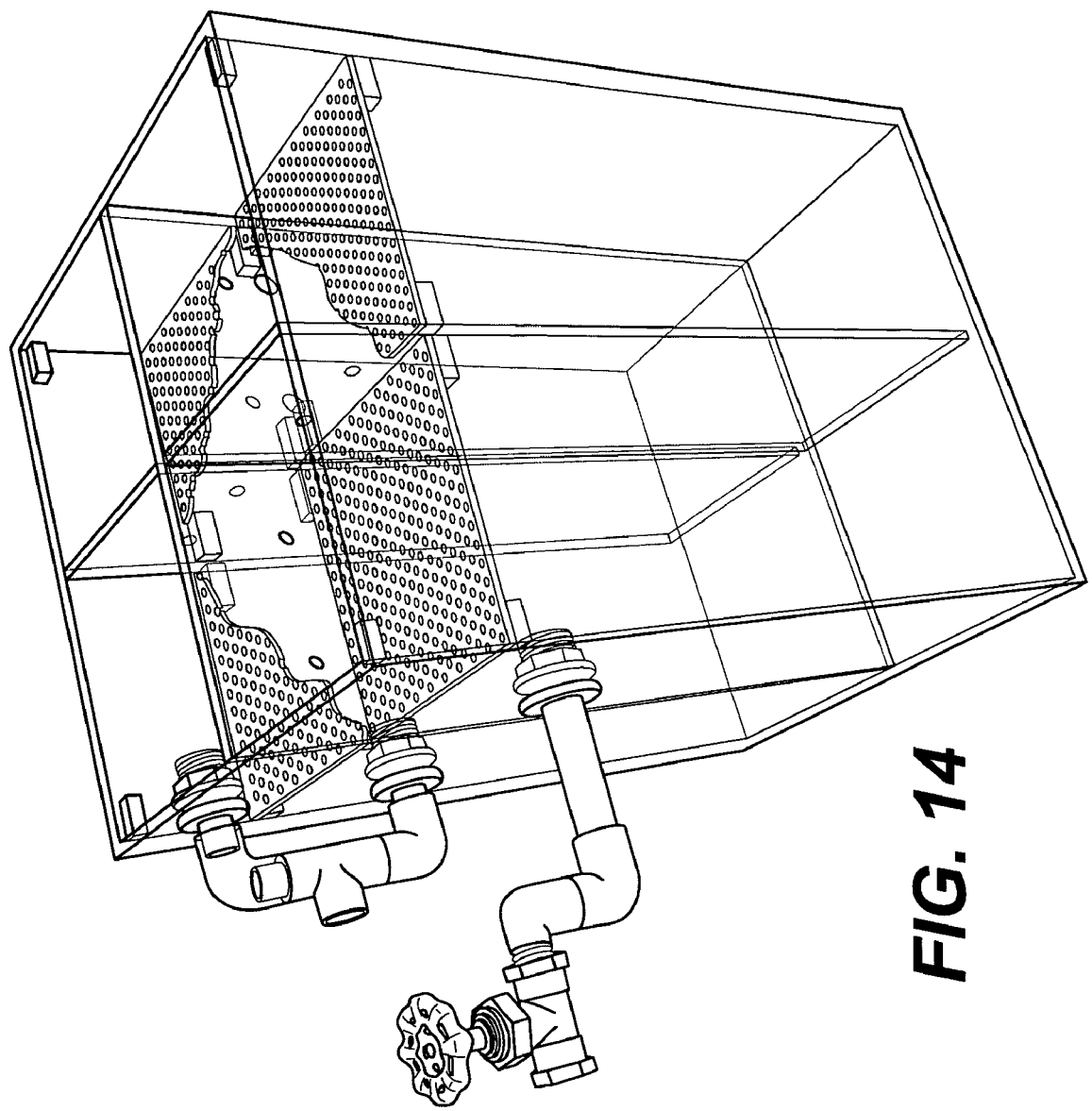
FIG. 14 is a three dimensional view of the biological system of FIG. 8, according to the present invention.

Another preferred embodiment of the present invention is illustrated in FIGS. 8a to 8c. A three dimensional view of this system is shown in FIG. 14. This embodiment is similar to that of system 100, illustrated in FIG. 2, except that it has been modified so that all of the chambers are contained within a single integral unit to provide for a compact system design. Further, in the illustrated embodiment, all of the chambers have the same shape and size, but respective chambers can be sized differently, as circumstances require. All of the chambers of the FIG. 8 embodiment may fit into a single cubic shaped container, as illustrated in FIG. 14.

FIG. 8a illustrates a top view of an embodiment of a system wherein aerobic chamber 110, denitration chamber 120, and calcium chambers 130 and 140 are each arranged within a single container. As shown in FIG. 8b, water flows into the system through inlet 101, which comprises a gate valve 101a, which allows for control of the flow rate of water through the system. Other types of valves, such as a needle valve, may also be used. Inlet 101 also includes a clear section of conduit 101b, which allows visual inspection of the water flow in order that clogging may be detected. Both inlet 101 and outlet 141 may comprise, for example, PVC pipe which is ½ inch in diameter.

The water flowing into the system flows down through aerobic chamber 110 and enters near the bottom of chamber 120 through an opening in section 109. The water then flows up through the sulfur media in section 108 of denitration chamber 120. The water exits chamber 120 near the top of section 108 and flows straight across into the top of section 108 of chamber 130 through openings 121 in the chamber wall, so that the water flows from top to bottom in calcium chamber 130. This flow arrangement allows for a more compact design than the flow arrangement illustrated in FIG. 2, in which the water in chamber 130 flows from bottom to top.

The water flowing from calcium chamber 130 enters the second calcium chamber 140 near the bottom of section 109, flows up through the media of section 108, and exits the system through outlet 141. Outlet 141 also comprises an overflow elbow 141b with a clear section of conduit 141a, which allows for visual inspection to determine if the system is overflowing. Multiple openings, as illustrated by openings 121 in FIGS. 8b and 8c, may also be used to allow water to flow between chambers 110 and 120 and chambers 130 and 140. Vents 150 may be placed in the coverings 104 of the chambers to allow gases produced in the chambers to escape from the system. Vents 151 may also be placed between adjacent chambers which allows gas flow between the upper sections 107 of each chamber containing activated carbon.

A section of tubing may be used to connect a vent (not shown) with one of the vents 150 in order to equalize the pressure between the inlet and the Nitrafix chambers. This helps to ensure that the level of water in the clear plastic tube 101b accurately reflects the level of water in the Nitrafix. When water is flowing through the Nitrafix system properly, the level of water in the clear tube 101b should be at about the same level as the outlet 141. If the level of water in tube 101b is lower than the outlet 141, an air bubble may be formed in the outlet tube, or the system may be clogged. If the water is flowing through the clear elbow 141a above the outlet on the outlet side, then the system is overflowing.

As discussed above, section 108 of each of the chambers 110, 120, 130 and 140 of the embodiment of FIG. 8 may respectively contain the same media as described above for chambers 110, 120, 130 and 140 of the embodiment illustrated in FIGS. 2 to 6.

However, in another preferred embodiment, the upper portion of section 108 of chamber 140 of the FIG. 8 embodiment may be filled with activated carbon, while the lower portion of section 108 may be filled with calcium, such as the crushed coral and calcite sand arrangement illustrated in FIG. 6a. The volume of activated carbon in section 108 may be approximately equal to the volume of dry activated carbon in section 109, although the amounts in either section may be optimized to provide the desired contact time between the activated carbon and either the water in section 108 or the emissions in section 109, in order to obtain the desired benefits of the activated carbon. In this manner, the benefits of running the water through the activated carbon, such as degassing, may be realized, while still allowing the system of FIG. 8 to remain compact. Sections 107 of the chambers in the FIG. 8 embodiment may also contain dry activated carbon and sections 109 may remain empty, as described above for the embodiment illustrated in FIGS. 2 to 6.

The container for the Nitrafix of FIG. 8 may be made of any appropriate material known in the art. In one embodiment, the material is ¼ inch plastic. Other materials, such as PVC, polyethylene, polypropylene, methacrylic or acrylic plastic, or fiber glass reinforced plastic (FRP), or stainless steel. Since the anaerobic bacteria are more efficient at removing nitrates in a dark environment, the container preferably is opaque, so as not to let light through. For example, the container may be a black acrylic plastic.

The size of the FIG. 8 embodiment may be adjusted as appropriate for treating any size aquarium. For example, aquariums of up to 5000 gallons or more may be treated. For example, an embodiment of FIG. 8, known as the N-500, having a width of 14 inches, a depth of 14 inches, and a height of 20 inches, may be used to treat aquariums holding approximately 10 to 500 gallons.

Figure 7:
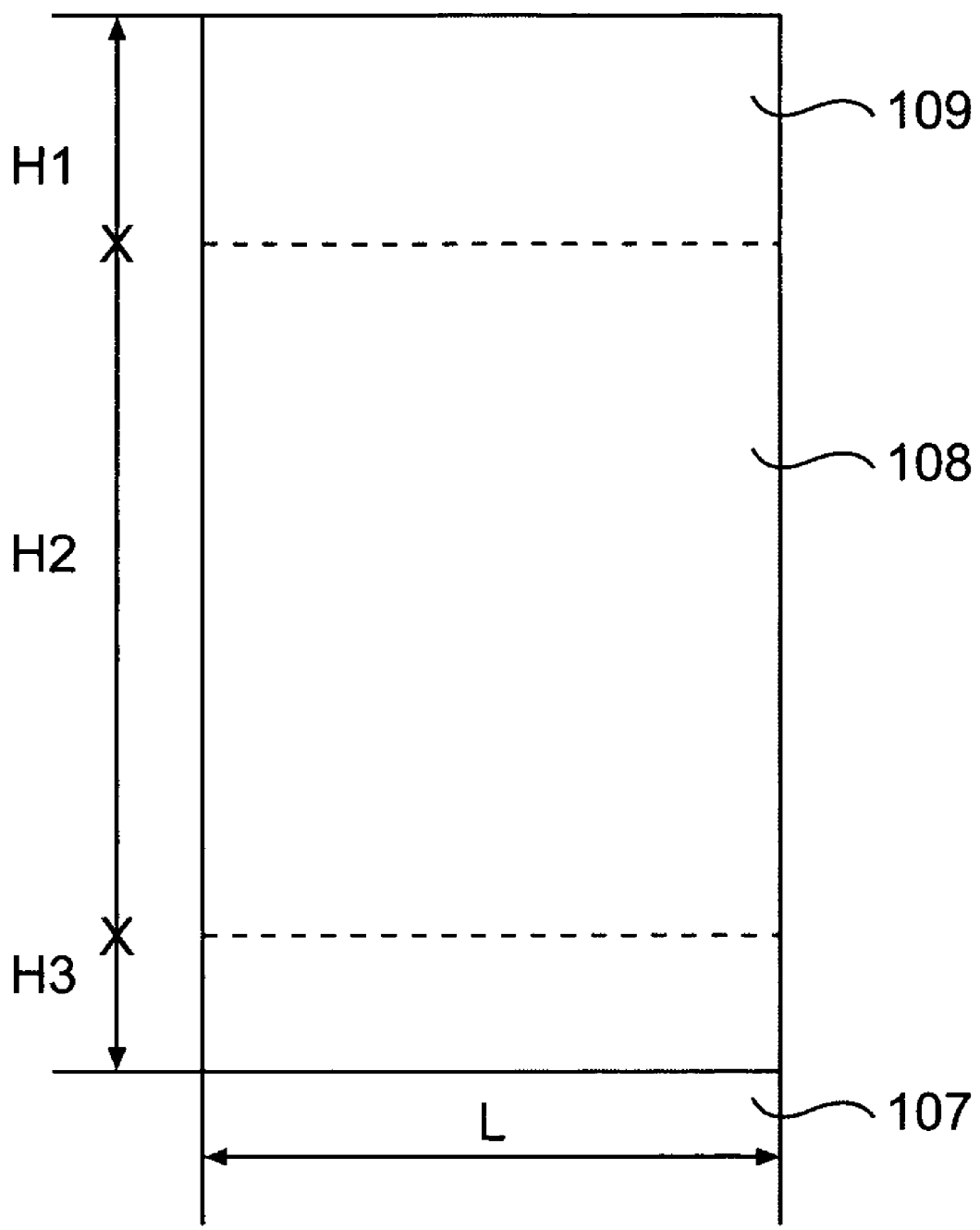
FIG. 7 is a diagrammatic representation illustrating certain dimensions of one chamber of the biological system, according to an embodiment of the present invention.

The ratio of chamber height to chamber volume may be adjusted in order to control the amount of time the water maintains contact with a given volume of media within each chamber, as well as the volume (and thus the surface area) of media within the chamber. A longer contact time and/or a greater surface area of the media within the chamber can allow for more efficient processing for any given volume of media and/or a faster processing time for a given flow rate of water through the chamber. Referring now to FIG. 7, the height H2 of section 108 of the chamber may be chosen to be 3 to 5 times L, where L is the diameter of the chamber for a cylindrical chamber, or the width of the chamber for a cubic or box shaped chamber. The heights, H1 and H3 of sections 109 and 107, respectively, can be any height. In one embodiment, H1 and H3 are each chosen to have a height of at least ⅛ the height of H2.

The specifications for the systems of the present invention, such as the dimensions of the chambers, the volume of media to be used, and the flow rate through the system, will depend on certain parameters. These parameters may include, for example, the starting pH and nitrate level of the aquarium to be treated, the fish load and amount of feed added to the aquarium, as well as the desired pH and nitrate levels for the aquarium. Given the necessary parameters, the optimum specifications for each of the systems of the present invention, as described herein, can be determined through experiments and testing, as a particular device or system is being developed under the principles of the invention, to apply to a particular applications.

In order to help determine the optimum specifications when designing a Nitrafix system, the following formulae may be used for calculating the flow rate through the system, volume of media in each of the chambers of the system, and the time for treating 99.99% of water in a recirculating system.

The desired flow rate can be determined according to the formula I, $$F = V_t/A \tag{I}$$

where

F is flow rate in gallons per hour, $V_t$ is the volume of water (in gallons) in the aquarium to be treated per hour, and A is an experimentally determined coefficient having a value which depends on a number of variables, including the nitrate level of the water, the quality of the filtration, and the volume of water to be treated. The greater the nitrate level, the greater the value for A. The value of A may range, for example, from 30 to 200. To simplify the calculations and avoid experimentation, a value of 100 may be used for aquariums having a volume of water of under 10,000 gallons, although the value for A may be determined experimentally if greater precision is desired. Generally speaking, larger systems may have values lower than 100, such as from 20 to 50, although the exact value for these larger systems will generally be determined experimentally.

The volume of media in section 108 of each of the chambers may be calculated according to formula II, $$V_m = V_t/N \tag{II}$$

where $V_m$ is volume of media in the chambers $V_t$ is volume of water in the aquarium to be treated N is an experimentally determined coefficient having a value of from 100 to 500, depending on the volume of water to be treated ($V_t$) and the amount of food added to the tank, or TAN. For a typical fish tank up to 10,000 gallons, N may be chosen to be 200. The value for N may increase for larger aquariums or for aquariums with fewer fish. The value for N may decrease for aquariums with large numbers of fish.

In one example, nitrates are calculated to be reduced in saltwater by approximately 100 ppm in one cycle using a pastille shaped sulfur media having a surface area of 11.36 cm²/g, and a volume of media calculated using a value of N=400, which was randomly chosen for the purpose of this example.

The formula for determining the time it would take to treat 99.99% of the water in a recirculating system (i.e., the length of time per cycle) is determined by $$T = 9.2 V_t/F_o$$

where

T is the amount of time per cycle (in hours), $V_t$ is the volume to be treated in gallons, and $F_o$ is the flow through the sulfur in gal/hour.

Before the water being treated by the embodiment of FIG. 8 is returned to the aquarium tank, it is preferable to add oxygen to the water, especially for large aquariums of, for example, 10,000 gallons or more. A degassing chamber, such as a protein skimmer or other conventional degassing chamber, may be used to accomplish this. One example of a novel protein skimmer which may be used will be discussed below in the description of FIGS. 20 to 22. Additionally, the oxytower, as discussed above, may also be used to add oxygen to the water.

Figure 15:
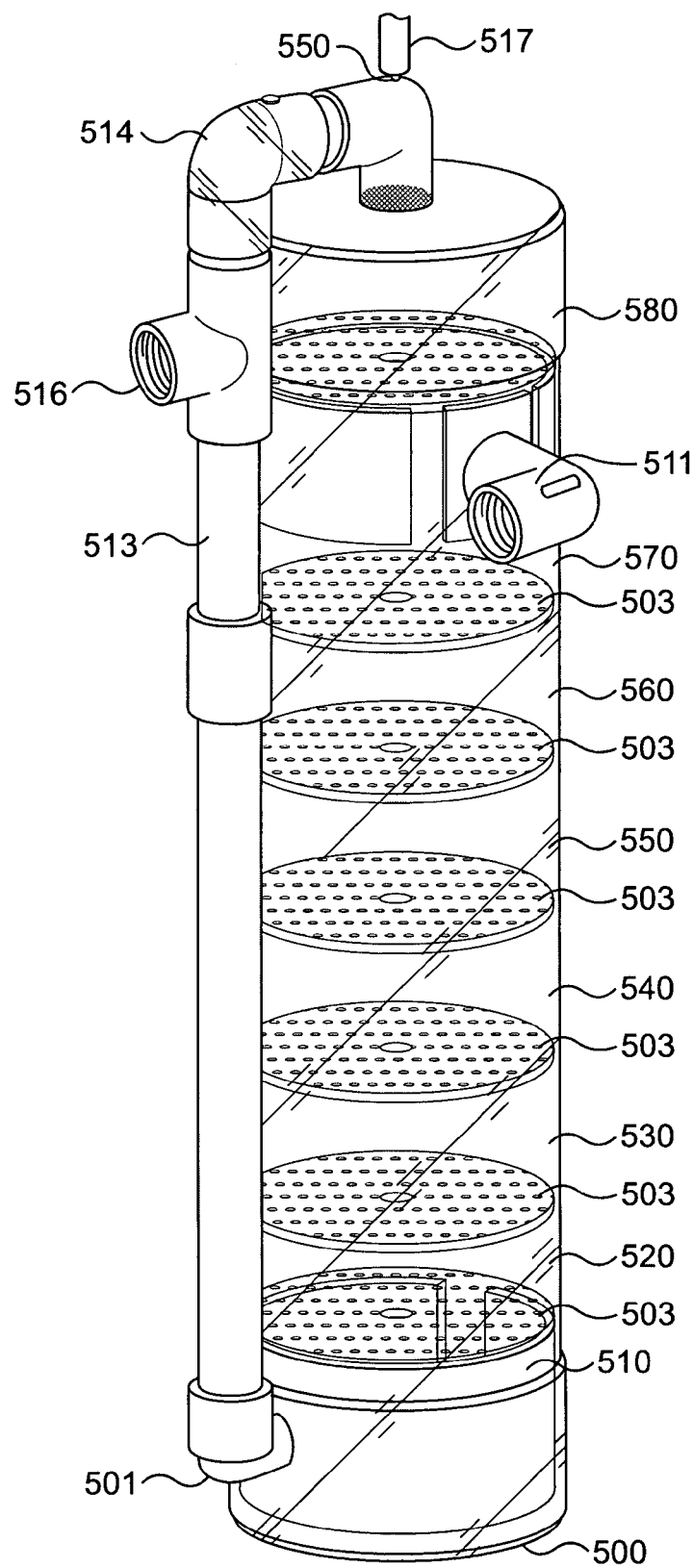
FIG. 15 is a three dimensional view of a biological system comprising multiple sections arranged in a single cylindrical chamber, according to another embodiment of the present invention.

Another preferred embodiment is illustrated in FIG. 15, which shows a system comprising multiple sections arranged vertically through a single chamber 500. The sections are separated by perforated plates 503. Section 510 is an empty space through which water entering the chamber can flow. Section 520 contains a media capable of supporting aerobic bacteria, such as the aerobic bacteria previously described herein. Section 530 contains sulfur media capable of supporting anaerobic bacteria, such as the anaerobic bacteria previously described. Sections 540 and 550 both contain calcium media. The calcium media in section 540, which is the calcium chamber nearest the inlet, contains a relatively less soluble media compared to the calcium media contained in section 550. Both sections 560 and 580 preferably contain activated carbon media, which traps undesirable contaminants, such as hydrogen sulfide gases, which may be produced during the process. Section 570 is left empty to allow for easy flow of water out of the system 500.

Water flows through inlet 516 down pipe 513 and through pipe 501, up through system 500 and exits through pipe 511. Exhaust gases generated during the process can exit system 500 through exhaust vent 550. Tubing 517, extending up from exhaust vent 550, may optionally be used to raise the level to which the water must rise before overflowing out of the system. A portion of clear pipe may optionally be used to allow for visual inspection of the system. For example, clear pipe section 513 and/or clear pipe section 514, as illustrated in FIG. 15, may be used to connect the inlet pipe 501 and the exhaust pipe 550 to either end of a T pipe junction 516. Generally, any type of clear pipe may be used. For example, glass or clear plastic, such as clear PVC, may be used for the clear pipe sections. The upward flow of water through system 500 helps to prevent clogging.

The dimensions of the chamber 500 can vary according to the requirements of the aquarium. The chamber 500 may have, for example, a cylindrical shape. In one embodiment, chamber 500 is a PVC pipe having a diameter of approximately 4 inches and a length of approximately 20 inches, with each section having the following approximate lengths:

Empty space, section 510—1.5 inches
Media for aerobic bacteria, section 520—2.5 inches
Sulfur media, section 530—4 inches
Hard calcium media, section 540—3 inches
Soft calcium media, section 550—3 inches
Activated carbon media, section 560—2.5 inches
Empty space, section 570—1.5 inches
Activated carbon, section 580—2 inches.

The total weight of this 20 inch embodiment is approximately 12 pounds. It can be used for an aquarium having a volume of up to about 120 gallons of water. In certain applications, this embodiment can be a disposable unit that can be thrown away. In other applications, the media in the system can be replaced as needed. The diameter and length of the chamber and the lengths of the sections 510 to 580 could be increased or decreased, as desired, in order to treat larger or smaller aquariums.

Figure 12A:
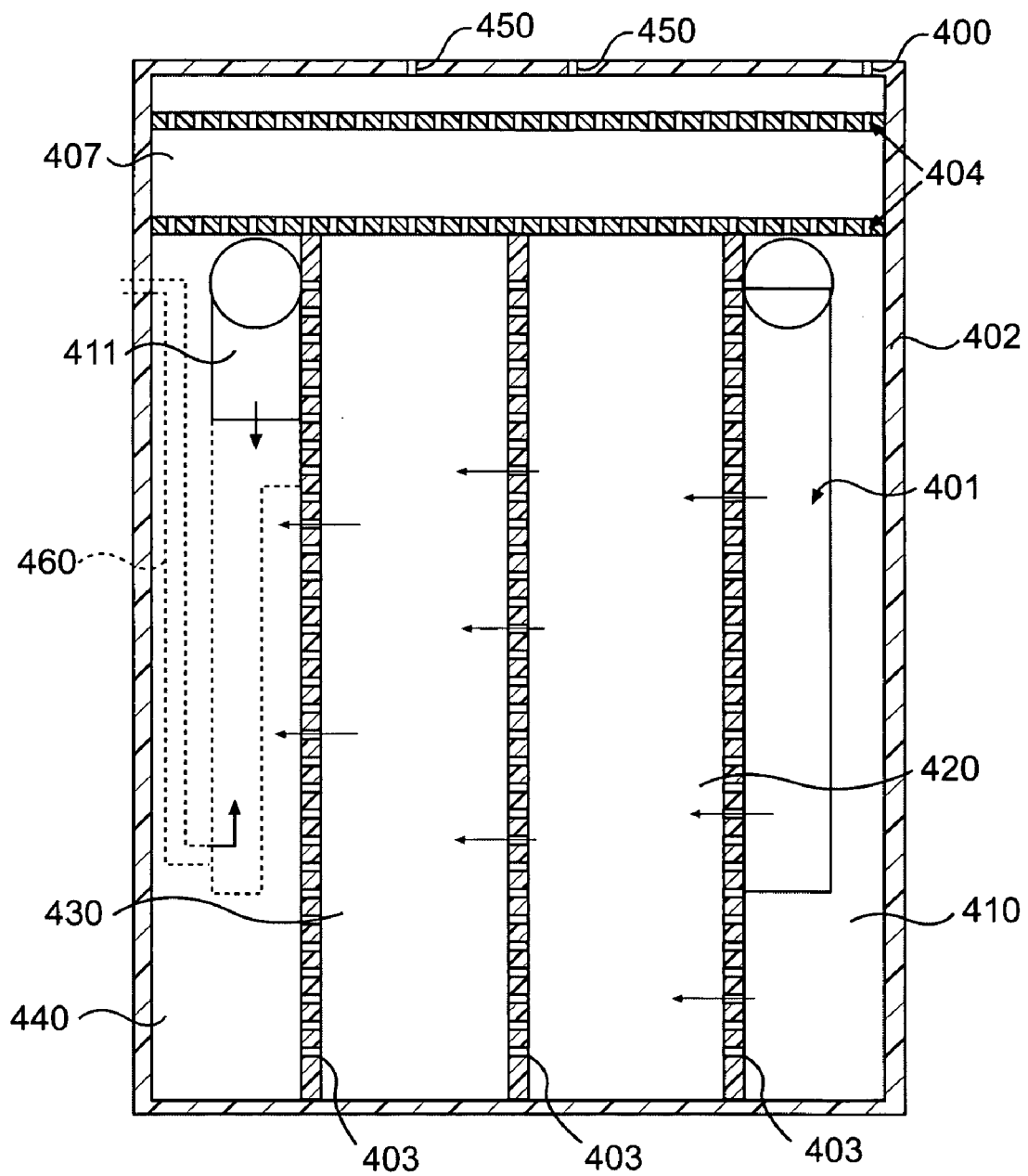
FIG. 12a is a diagrammatic representation of a further embodiment of the biological system having a chamber containing sulfur and a chamber containing calcium, according to the present invention.

FIG. 12a illustrates another embodiment of the present invention. As shown in FIG. 12a, the system comprises a biological system 400 comprising an outside container 402 divided into various chambers or cartridges, as illustrated by perforated walls 403. The outside container may be made of a plastic material, such as acrylic, for example. The material may be opaque, such as black colored plastic. The chambers containing the media may also be made of plastic, such as polyethylene or polypropylene.

Figure 13:
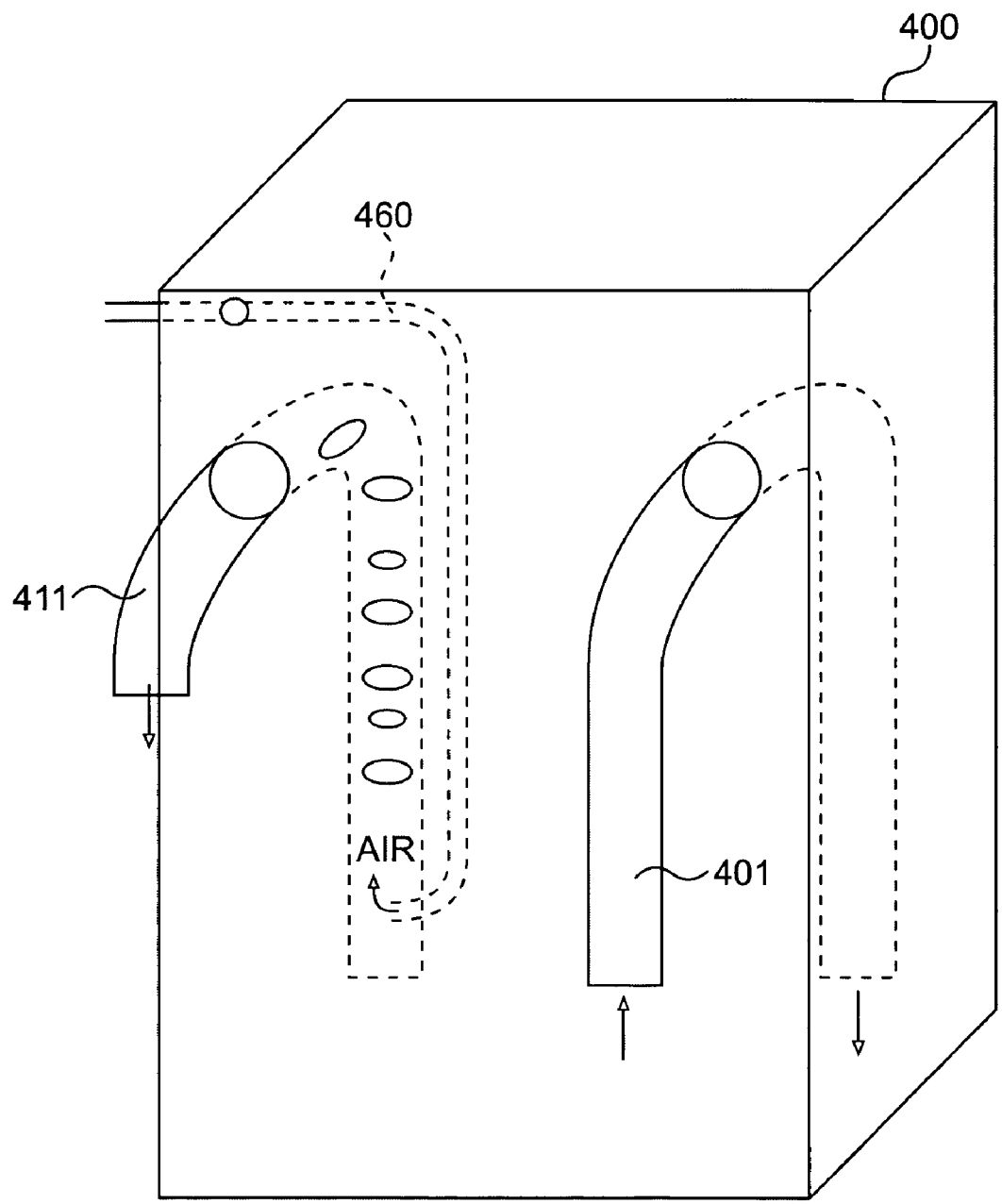
FIG. 13 is an additional diagrammatic representation of the biological system of FIG. 12, which shows an outside view of the system, including details of the air pumping system in relation to the inlet and outlets pipes.

System 400 is generally for use with smaller aquariums, such as those having 5 to 50 gallon tanks. However, it may be used for larger systems, as well. It is designed to hang on the aquarium tank wall, having both an inlet 401 and an outlet 411, which can extend over the tank wall and down into the aquarium, as shown in FIG. 13. For residential aquariums, a system according to this embodiment could be configured in a disposable unit that can be purchased in a closed configuration with all of the elements and components in the unit. Such disposable units may have a life in the range of about 1 to 2 years, for example, depending on the life of the media used therein.

The denitration chamber 420 is filled with a sulfur media, such as any of the sulfur media previously described above. Calcium chamber 430 is filled with one or more calcium sources, such as any of the calcium sources described above.

In a preferred embodiment, chamber 430 is filled with a mixture of aragonite, dolomite and calcite. Alternatively, the chamber may be filled with only one or two of these sources of calcium, rather than all three. The denitration chamber 420 and calcium chamber 430 function to remove nitrates, add calcium and control pH, similar to the denitration chamber and calcium chambers of the above described embodiments.

Both chambers 410 and 440 may remain substantially empty, except for the flow of aquarium water. Water flows into chamber 410 through inlet 401. Water then flows from chamber to chamber through perforated walls 403, first flowing through denitration chamber 420, calcium chamber 430, and then into chamber 440. In order to force water through the system, air is pumped through air hose 460 into outlet conduit 411, which extends down into chamber 440. The air bubbles rising up through outlet conduit 411 force water up and out of the system. Other systems known in the art for moving water through system 400 may be used instead of the air pump, such as, a minni-pump, for example.

Chamber 407 is filled with activated carbon, which acts to remove hydrogen sulfide gas odors produced in the denitration chamber. Gases emitted from the system can rise through the perforated plates 404 and leave the system through vents 450.

Figure 12B:
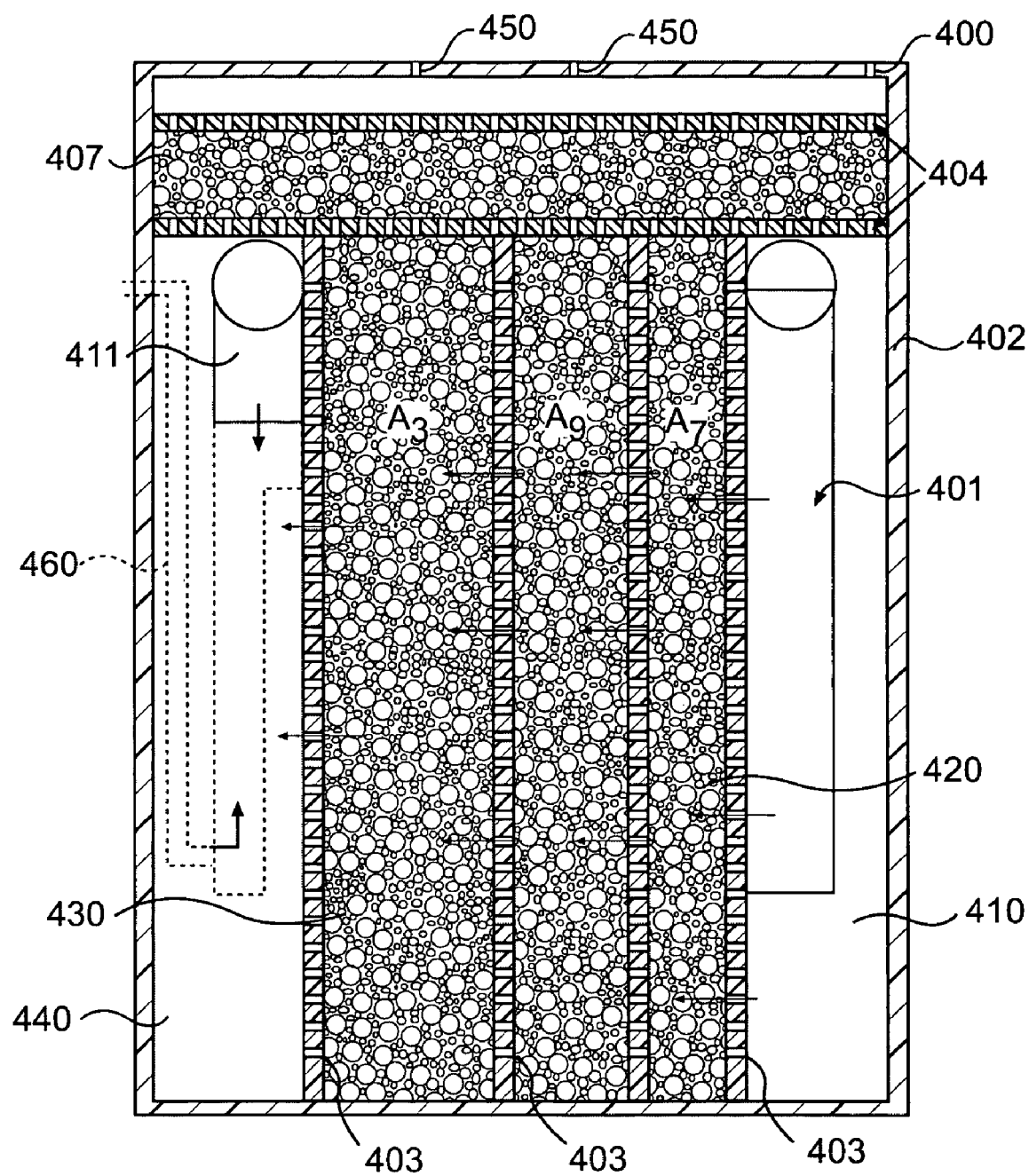
FIG. 12b is a diagrammatic representation of a further embodiment of the biological system similar to the embodiment of FIG. 12a, but having an additional chamber containing a media for aerobic bacteria.

Another embodiment is shown in FIG. 12b. This embodiment is similar to the embodiment described above for FIG. 12a, except that a chamber 415, which is filled with a media for supporting aerobic bacteria, is added between chambers 410 and 420. The media in chamber 415 may be any media capable of supporting aerobic bacteria, such as, for example, crushed coral or biofilm. This purpose of chamber 415 is to remove oxygen and reduce ammonia to nitrite and nitrite to nitrate, similar as described above with respect to the aerobic chamber 110 for the embodiment of FIGS. 2 and 8.

Another embodiment of the present invention is the application of the invention to large fresh and salt water aquariums having a volume of, for example, 10,000 gallons or more. As with the other Nitrafix systems disclosed herein, this embodiment of the invention could be applied to both fresh and salt water aquariums, as well as brackish water aquariums, and makes it possible to create a working salt water aquarium in an inland location that does not have another available source to replace all or part of the salt water in the aquarium, as is done under standard systems for large salt water aquariums. Such a system is shown generally in FIG. 17.

Figure 17:
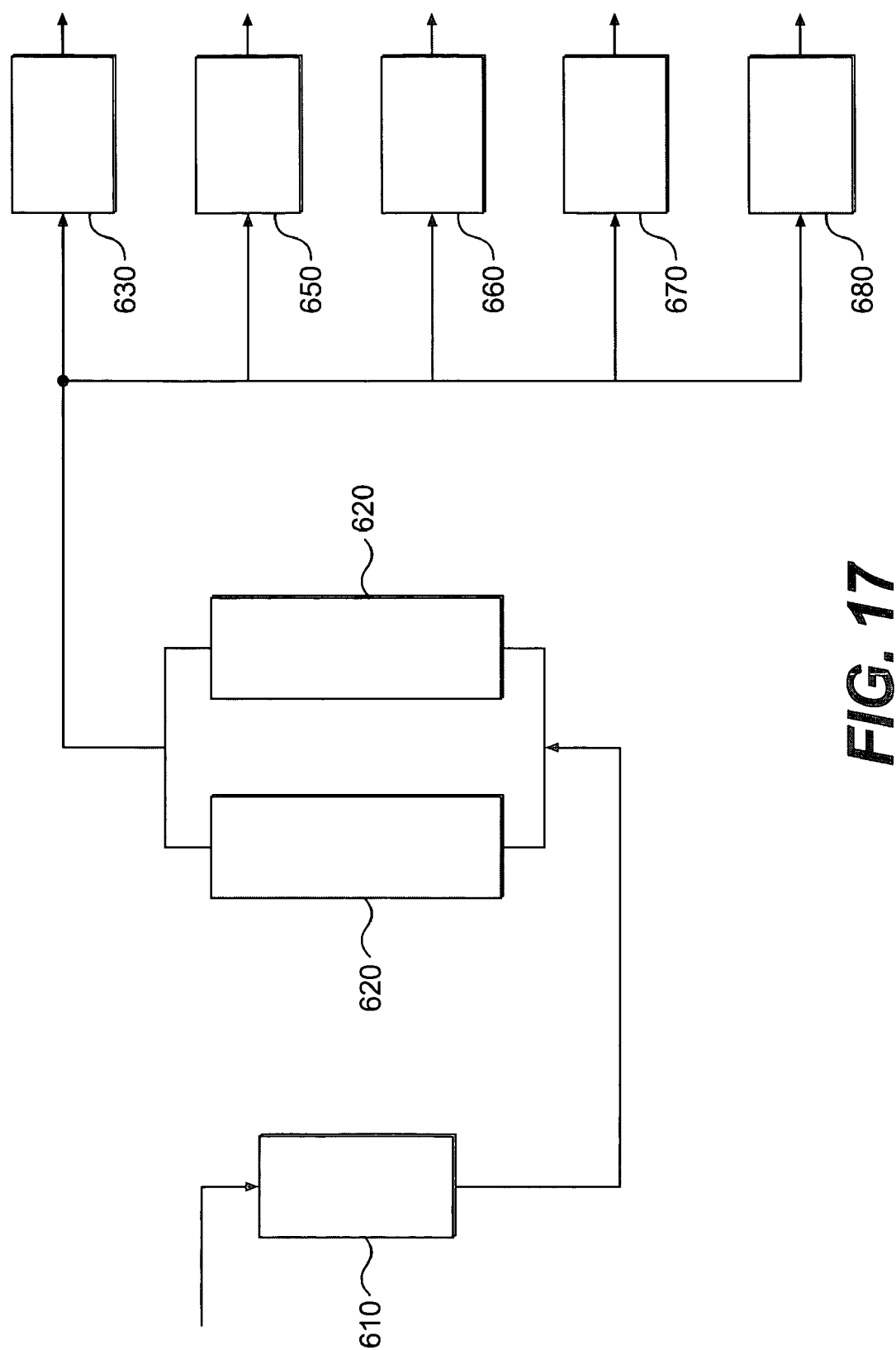
FIG. 17 is a diagrammatic representation of a system for conditioning water for large aquariums, according to an embodiment of the present invention.

As shown in FIG. 17, water from the aquarium is first supplied to a chamber 610 that supports the colonization of aerobic bacteria that reduce ammonia and nitrites in the water and increase concentrations of nitrates. For example, a sand filter or a floating bed reactor filter, both of which are well known in the art, may be used as chamber 610. Examples of specific sand and floating bed filters which may be used include a bead filter, from aquaculture systems technologies, and sand filters from Jacuzzi. These filters would both filter out unwanted material from the water and also support the aerobic process of reducing ammonia and nitrites in the water while increasing nitrates and at the same time increasing $CO_2$ concentrations and reducing or eliminating dissolved oxygen in the water. As previously explained, the aerobic bacteria chamber will increase efficiency of the denitration process by the anaerobic bacteria and reduce the amount of bacteria and sulfur needed in the second chamber.

Figure 24:
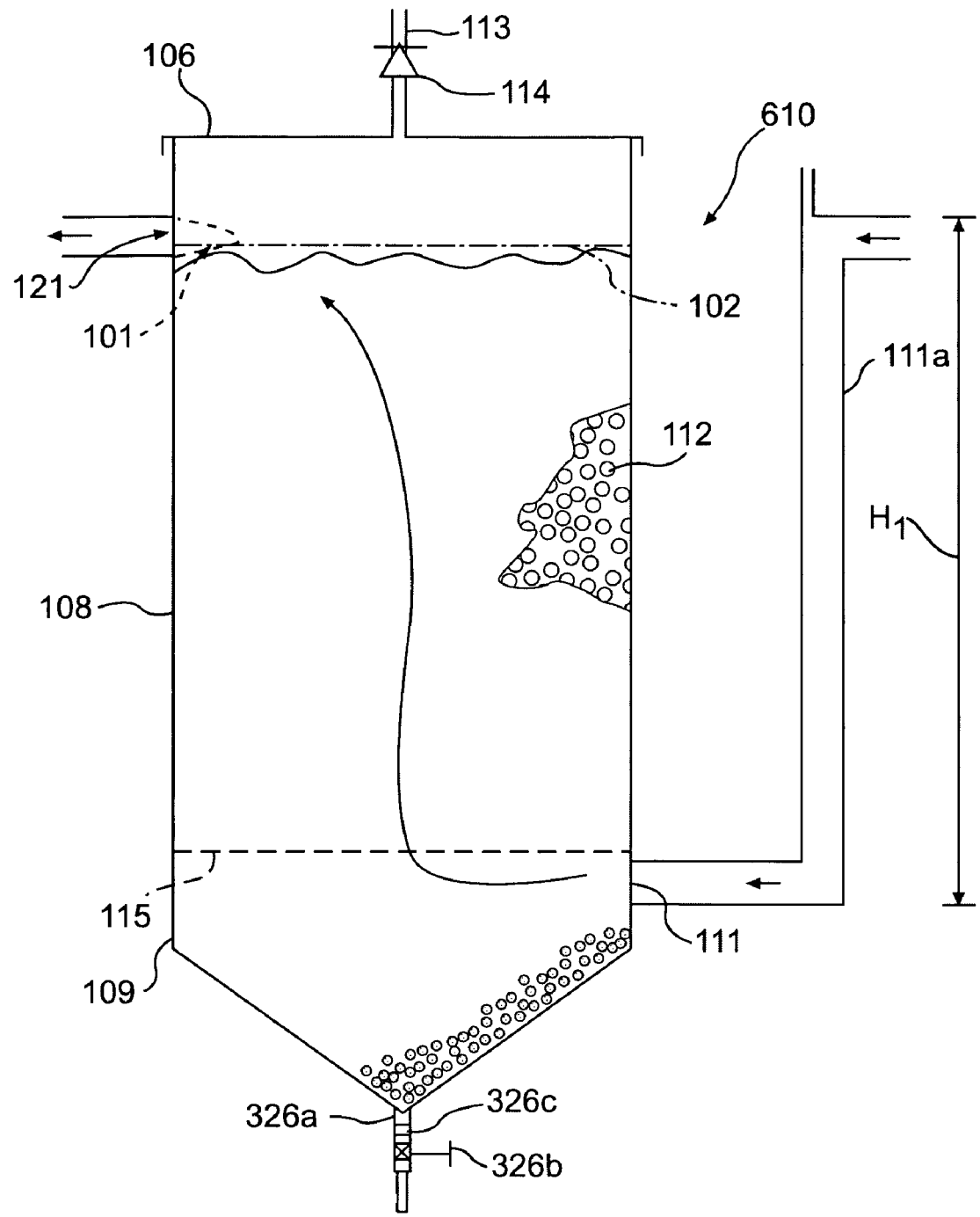
FIG. 24 illustrates an aerobic chamber, according to an embodiment of the present invention.

One embodiment of a novel aerobic chamber which may be used in the system of FIG. 17 will now be described with reference to FIG. 24. Chamber 610 comprises a tank 108. The lower portion of tank 108 preferably has a tapered shape to collect sediment which settles to the bottom, although it may have a flat bottom. A drain 326a and valve 326b can be included in the bottom of 610, to allow sediment to be periodically removed. If desired, a clear section of pipe 326c may be employed to allow visual inspection of the drain so that sediment buildup may be monitored. A lid 106 may be used to cover the tank 108. Chamber 610 should be relatively air tight, so that the level of oxygen in the water may effectively be reduced by the aerobic bacteria. A vent 113 having a check valve 114 may be used to vent gases from the chamber, but will preferably not allow substantial amounts of outside air into the chamber.

The chamber has an inlet 111 and an outlet 121 through which water can enter and exit the chamber. A screen 101 may be placed over the outlet and inlet to avoid clogging and contain the media within the chamber. The height H1 of the inlet pipe 111a will control the level of water in chamber 610.

Section 108 of chamber 610 may be partially or completely filled with support media 112, which acts as a substrate for the aerobic bacteria. The aerobic bacteria already exist in the water of the aquarium and will readily colonize on the media. The media 112 may be any type of media that can support colonization of aerobic bacteria. While a media having any practical size and shape may be used, media having a high surface area is preferred. For example, sand, crushed coral and other media having relatively high surface areas may be used. One preferred form of support media is plastic, which may be in the form of small spheres or tubes, although any shape known in the art may be used. The plastic media is lightweight and may float in the aquarium water. It does not clog easily, and provides a large surface area for bacterial colonization. One example of such a plastic media is known as biofilm. One particular type of biofilm is manufactured by Water Management Technologies, Inc. under the name of Kaldnes or Bee-Cell. Other media like Bio-Chem stars from RENA may also be used. If media 112 does not float, a perforated plate or screen 115 may be employed to hold the media above the cone shaped bottom, to allow a space for sediment to settle in the tank.

As shown in FIG. 17, the system preferably includes a plurality of anaerobic denitration chambers 620 which are placed in parallel flow with each other. Alternatively, the chambers may be placed in series, where water flows from one denitration chamber to the next. Each chamber might, for example, be a cylindrical chamber having a diameter ranging from about 6 inches to about 10 feet and height ranging from about 8 to about 20 feet. The chamber may be sized so that it can be readily positioned in the basement of the aquarium facility, or at some other acceptable location. These chambers can be placed in different locations relative to the aquarium, even including locations significantly remote from the aquarium itself. As the application previously explained, anaerobic bacteria within the chambers reduce nitrate concentrations.

Preferably the denitration chambers either include a degassing material, or provides an outlet for allowing exhaust gases produced during the denitration process to flow to a separate chamber containing degassing material, in order to eliminate the odor from noxious gases, such as hydrogen sulfide, which may be produced during the denitration process. The degassing material may be, for example, activated carbon.

Figure 9:
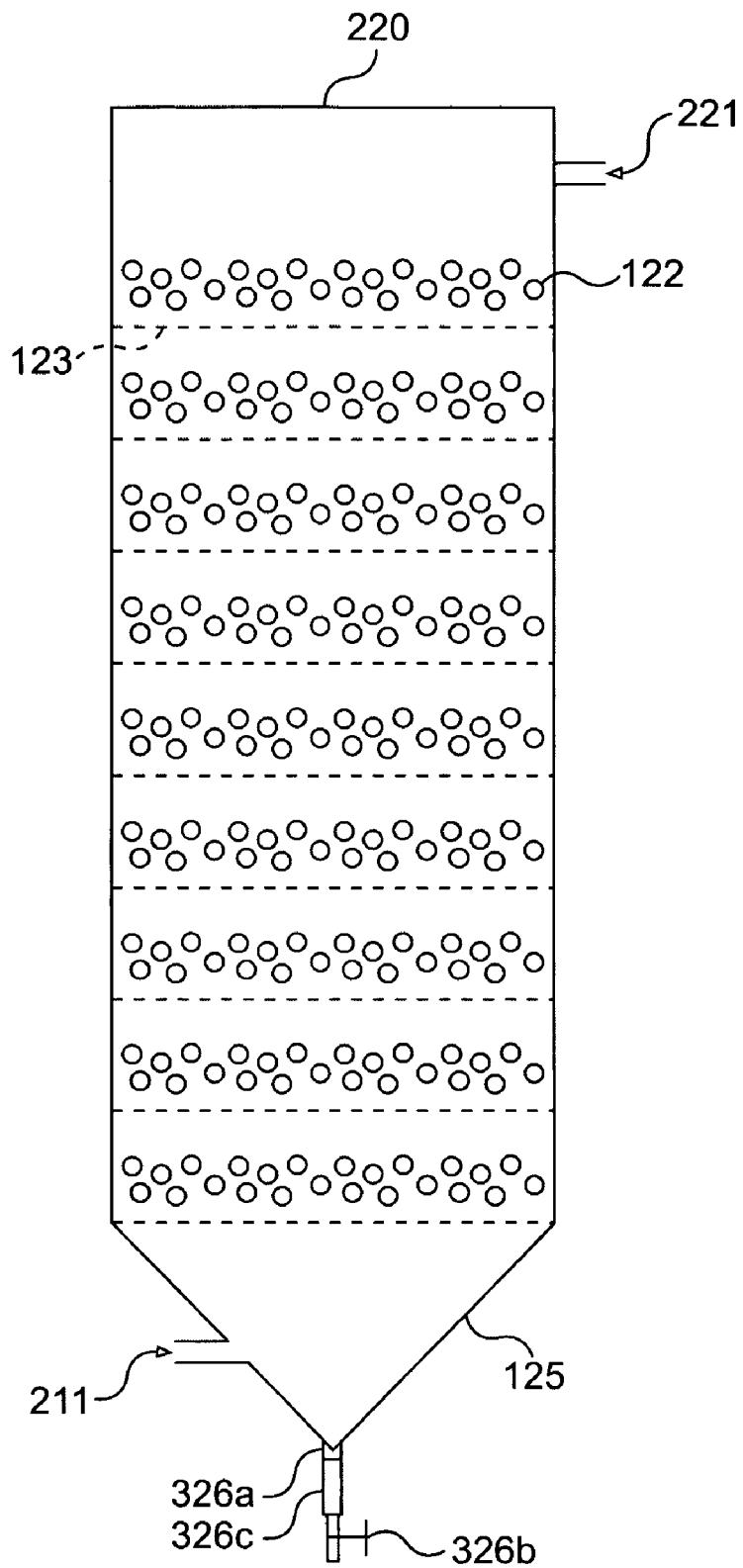
FIG. 9 is a diagrammatic representation of denitration chambers containing sulfur media capable of supporting anaerobic bacteria, according to an embodiment of the present invention.
Figure 11:
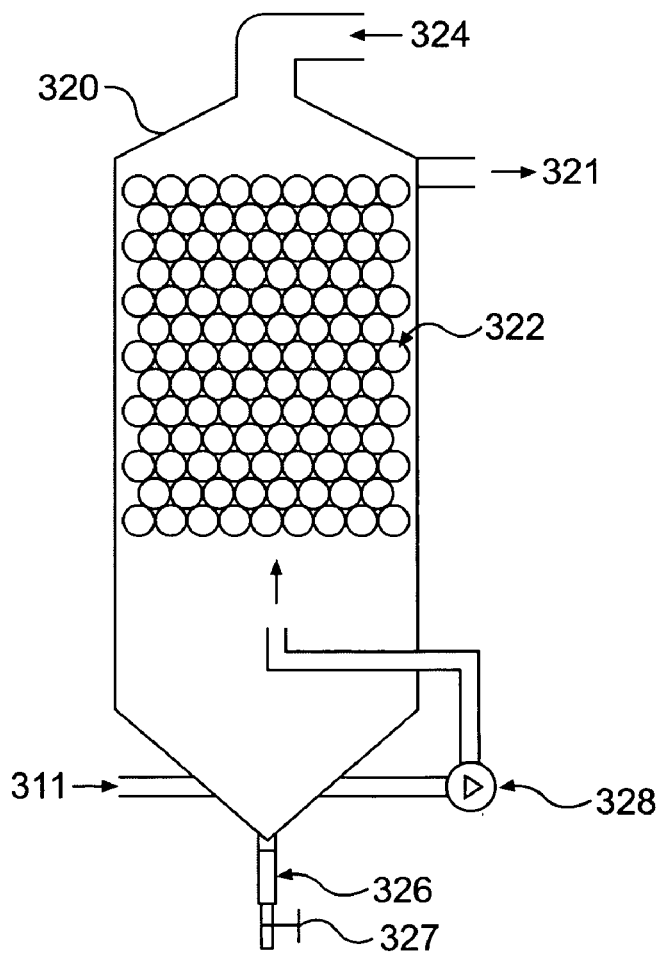
FIG. 11 is a diagrammatic representation of denitration chambers containing sulfur media capable of supporting anaerobic bacteria, according to an embodiment of the present invention.

Examples of denitration chambers that may be used for large aquariums are illustrated in FIGS. 9 and 11 and will now be described. Where large amounts of sulfur media are used to treat the aquarium water, the sulfur may crush itself by its own weight in the lower parts of the chamber and cause clogging. In order to avoid clogging, as well as to increase the efficiency of the biological system, a denitration chamber 220 according to an embodiment illustrated in FIG. 9 may be used. As shown in FIG. 9, the sulfur media 122 is placed on shelves 223 within the chamber. The shelves are perforated in order to allow water to flow through the chamber. The chamber bottom 225 has a tapered shape to collect sediment. A drain 326a and valve 326b can be included in the bottom of chamber 120, to allow sediment to be periodically removed. If desired, a clear section of pipe 326c may be employed to allow visual inspection of the drain so that sediment buildup may be monitored. The chamber has an inlet 211 and an outlet 221 through which water can enter and exit the chamber.

Figure 10:
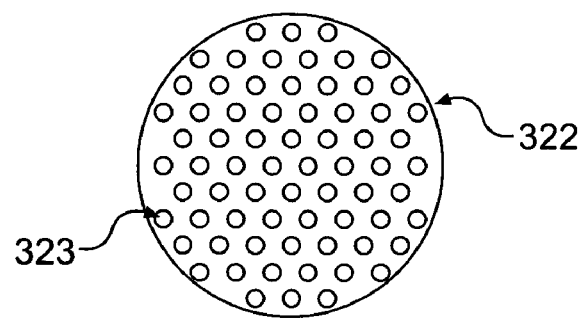
FIG. 10 is a diagrammatic representation of sulfur containing media capable of supporting anaerobic bacteria, according to an embodiment of the present invention.

FIG. 11 illustrates another denitration chamber embodiment, which utilizes floating balls comprising sulfur. FIG. 10 shows a floating ball 322 comprising sulfur, according to one embodiment of the present invention. The balls have a density that is less than that of water, and therefore float in the water. The balls may be hollow plastic or Styrofoam balls which are filled with a mix of sulfur media and plastic or Styrofoam media. Holes 323 in the balls allow water to flow into and out of the balls and contact the sulfur media contained therein. The balls and the media contained in the balls may be any workable size or shape. For example, the balls may have a diameter of 1½ to 3 inches with ⅛ to 5/32 inch diameter holes drilled therein. The media within the balls may have a diameter of, for example, ⅛ inch to ¼ inch.

The floating balls comprising sulfur are placed in a chamber, such as chamber 320 illustrated in FIG. 11, for example. The chamber shown in FIG. 11 is a cylinder having a conical shaped bottom 325, in order to collect sediment. Clear tubing 326 may be placed at the tip of the chamber bottom 325 in order to allow for visual observation of sediment which may be collected. Valve 327 allows the sediment to be drained from the chamber bottom when necessary. Chamber 320 may be made of, for example, PVC, polyethylene, polypropylene, methacrylic or acrylic plastic, fiber glass reinforced plastic (FRP), or stainless steel. An inlet 311 may be placed near the bottom of the chamber and outlet 321 near the top, so that the aquarium water flows up though the sulfur containing media and exits the chamber through outlet 321. A gas outlet 324 is placed in the top of chamber 320 to allow gases produced in the chamber to escape. The exhaust gases may then be flowed through activated carbon, in order to remove hydrogen sulfide gas, before being released into the atmosphere.

Chamber 320 is filled with the floating sulfur media. For example, ½ to ¾ of the volume of the tank may be filled with the floating sulfur balls 322. A backwash pump 328, which pumps water out of the chamber and then returns it to the chamber through a conduit having an outlet in close proximity to the floating balls, may be used to wash the balls. Alternatively, an injector (not shown) may be used to inject carbon dioxide gas into the chamber to wash the balls. Washing the balls may help to remove any particulate matter that can build up on or between the balls. Such build up can undesirably reduce the flow of water through the holes in the balls, as well as through the chamber itself. Additionally, the backwash pump or injector may increase contact time between the sulfur surface area of the balls and the water being treated by increasing the circulation of balls inside the chamber. Additionally, the motion of the balls caused by the backwash pump or injector may help gases that form inside the balls during the process to be discharged, which allows more water to enter the balls, thus increasing contact time of the sulfur with the water.

After denitration occurs in the system disclosed in FIG. 17, water can then be directed to flow through one or more calcium chambers 630 or other chambers or systems to increase the pH of the water and add appropriate minerals for the health of sea life and coral within the aquarium.

Figure 25:
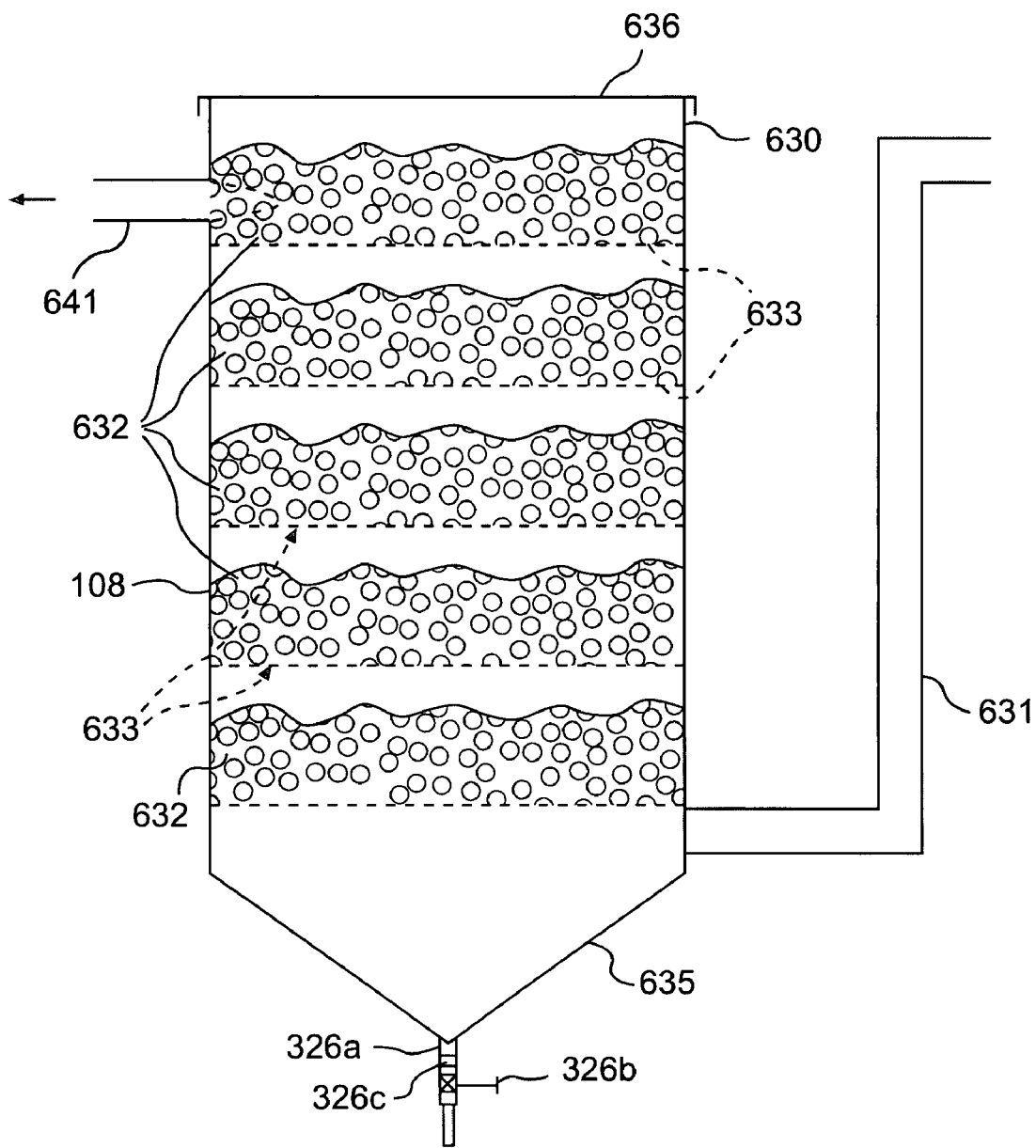
FIG. 25 illustrates a calcium chamber, according to an embodiment of the present invention.

One example of a calcium chamber which may be used for large aquariums is shown in FIG. 25. Where large amounts of calcium media are used to treat the aquarium water, the calcium may crush itself by its own weight in the lower parts of the chamber and cause clogging. In order to avoid clogging, as well as to increase the efficiency of the system, a calcium chamber 630 according to an embodiment illustrated in FIG. 25 may be used. As shown in FIG. 25, the calcium media 632 is placed on shelves 633 within the chamber. Various sources of calcium may be used, such as aragonite, calcite and dolomite, as described above in connection with the other embodiments of the Nitrafix. If multiple sources of calcium are used, it may be preferable to place the harder to dissolve calcium on the bottom shelves and the more easily dissolved calcium on the upper shelves, in order to extend the life of the calcium media. The size of the media may be any practical size known in the art. For example, the size may range from 3 to 10 mm in diameter.

The shelves are perforated in order to allow water to flow through the chamber. The chamber bottom 635 preferably has a tapered shape to collect sediment and small particles of calcium which fall through the perforations in shelves 633, although it may have a flat bottom. A drain 326a and valve 326b can be included in the bottom of chamber 630, to allow sediment and calcium to be periodically removed. If desired, a clear section of pipe 326c may be employed to allow visual inspection of the drain so that sediment buildup may be monitored. The chamber has an inlet 631 and an outlet 641 through which water can enter and exit the chamber. A lid 636 may be used to cover the chamber.

Other systems may also be used for large aquariums. For example, water from the denitration chambers can be directed to one or more of the following systems, in addition to or in place of a calcium chamber or chambers: a protein skimmer 650, a degassing tower 660, an oxytower 670, and a desulfator 680. While protein skimmer 650, degassing tower 660, oxytower 670, and desulfator 680, are being described here in connection with the embodiment of FIG. 17 for use with large aquariums, they are also contemplated for use with aquariums of any size, including home aquariums of 50 gallons or less.

Figure 20A:
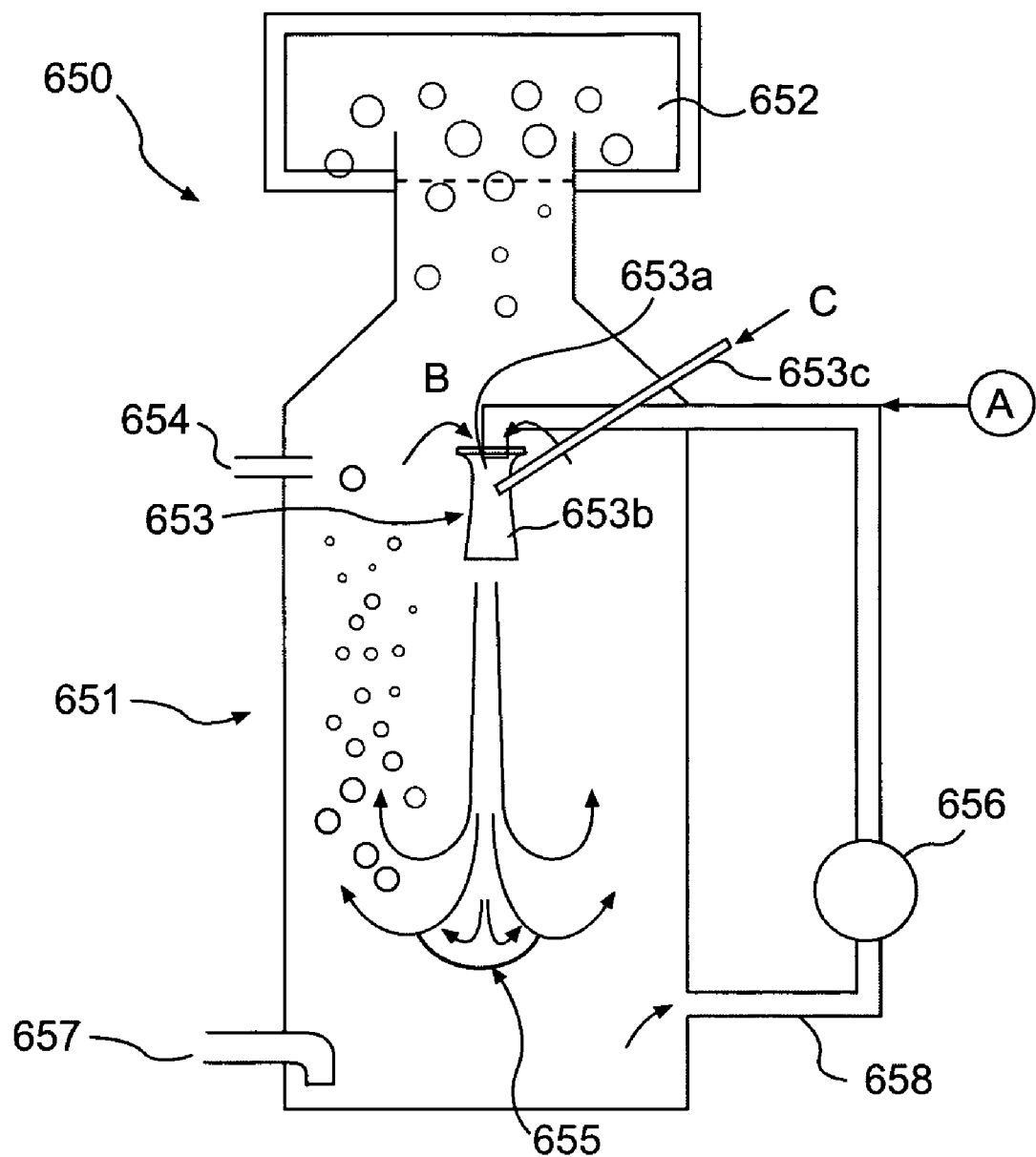
FIGS. 20a to 20c are diagrammatic representations illustrating various protein skimmer embodiments, according to the present invention.

A novel protein skimmer will now be described in connection with FIGS. 20a to 20c. The purpose of the protein skimmer is to remove contaminants, such as undesirable organic matter, otherwise known as dissolved organic compounds (DOC), from the water, as well as to increase the oxygen level of the water. Protein skimmer 650, as shown in FIG. 20a, includes a mixing chamber 651, a collecting cup 652, a mixing eductor 653, and a bowl shaped cup 655. The protein skimmer of FIG. 20a is preferably used for salt water applications where the water has a specific gravity greater than about 1.020, although it may also be used for fresh water applications.

Figure 21A:
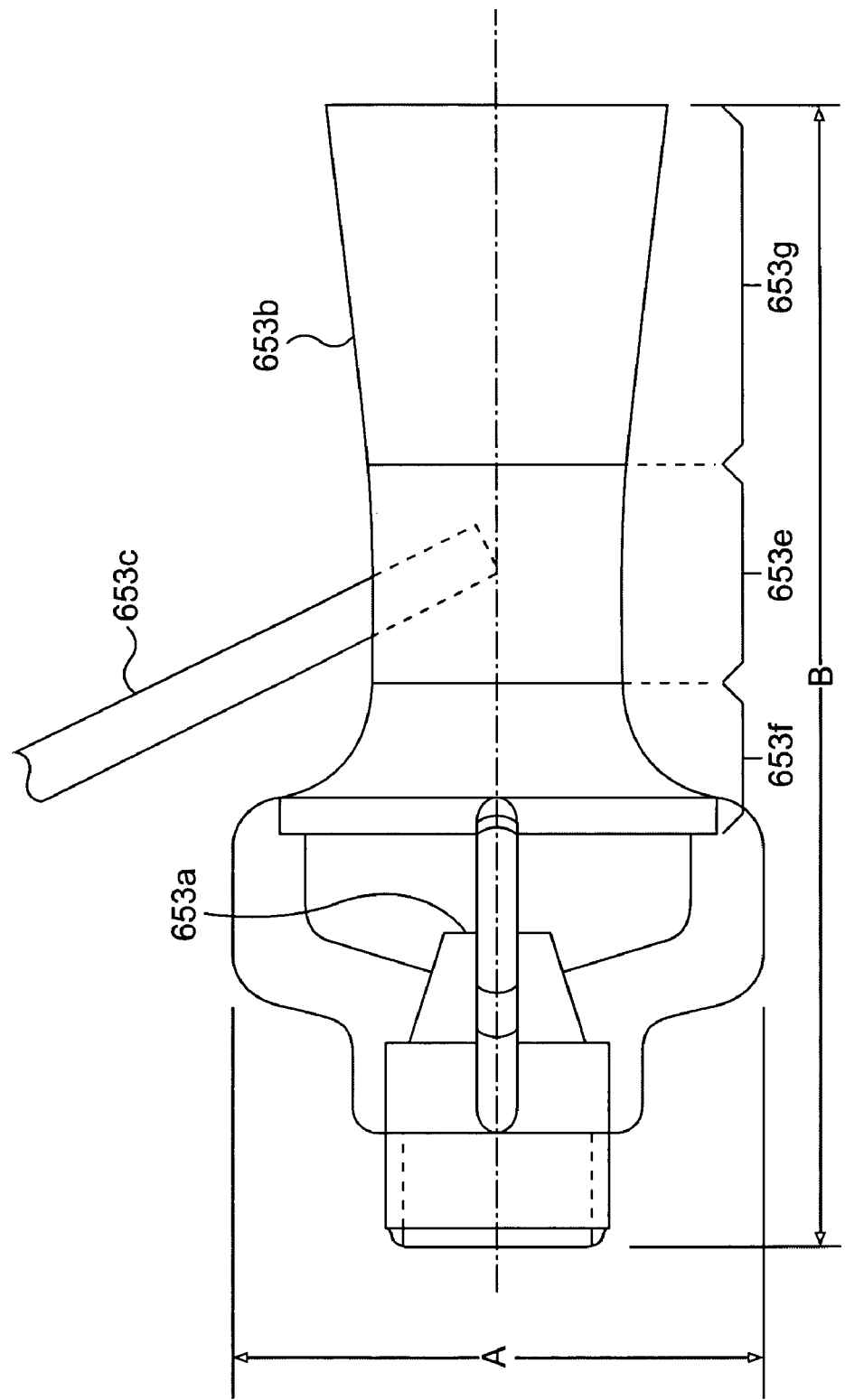
FIGS. 21a to 21c are diagrammatic representations illustrating an eductor for mixing fluids, according to an embodiment of the present invention.

Water flows into mixing chamber 651, which remains substantially filled with water during processing, through inlet 654. The water in the mixing chamber is circulated using pump 656, which draws water from the chamber 651 through pipe 658 and forces the water through eductor inlet channel 653a. Alternatively, the water going to eductor inlet channel 653a could be supplied from a source outside chamber 651, such as from the sump or the aquarium itself. Water passing through the eductor mixing channel 653b is mixed with an oxygen containing gas, such as air, oxygen gas, ozone, ionized gas, or a mixture thereof. Using a gas comprising ozone will make the system more efficient and reduce or eliminate sulfate. The oxygenated stream of water, having bubbles comprised of the oxygen containing gas, flows out of the eductor and down into chamber 651 against concave surface 655. Concave surface 655, which may have cup or bowl shape, then redirects the stream of water and bubbles upward into the mixing chamber. As the bubbles rise in the chamber, undesirable contaminants attach to the bubbles and rise to the surface, where they are captured in the collecting cup 652 and disposed of. The eductor 653 allows for a relatively large amount of gas to be mixed into a liquid using a relatively small amount of power. An enlarged view of eductor 653 is shown in FIG. 21a. The mixing channel 653b comprises a flared inlet region 653f and a flared outlet region 653g, which are connected by a generally cylindrical shaped neck region 653e.

Figure 21B:
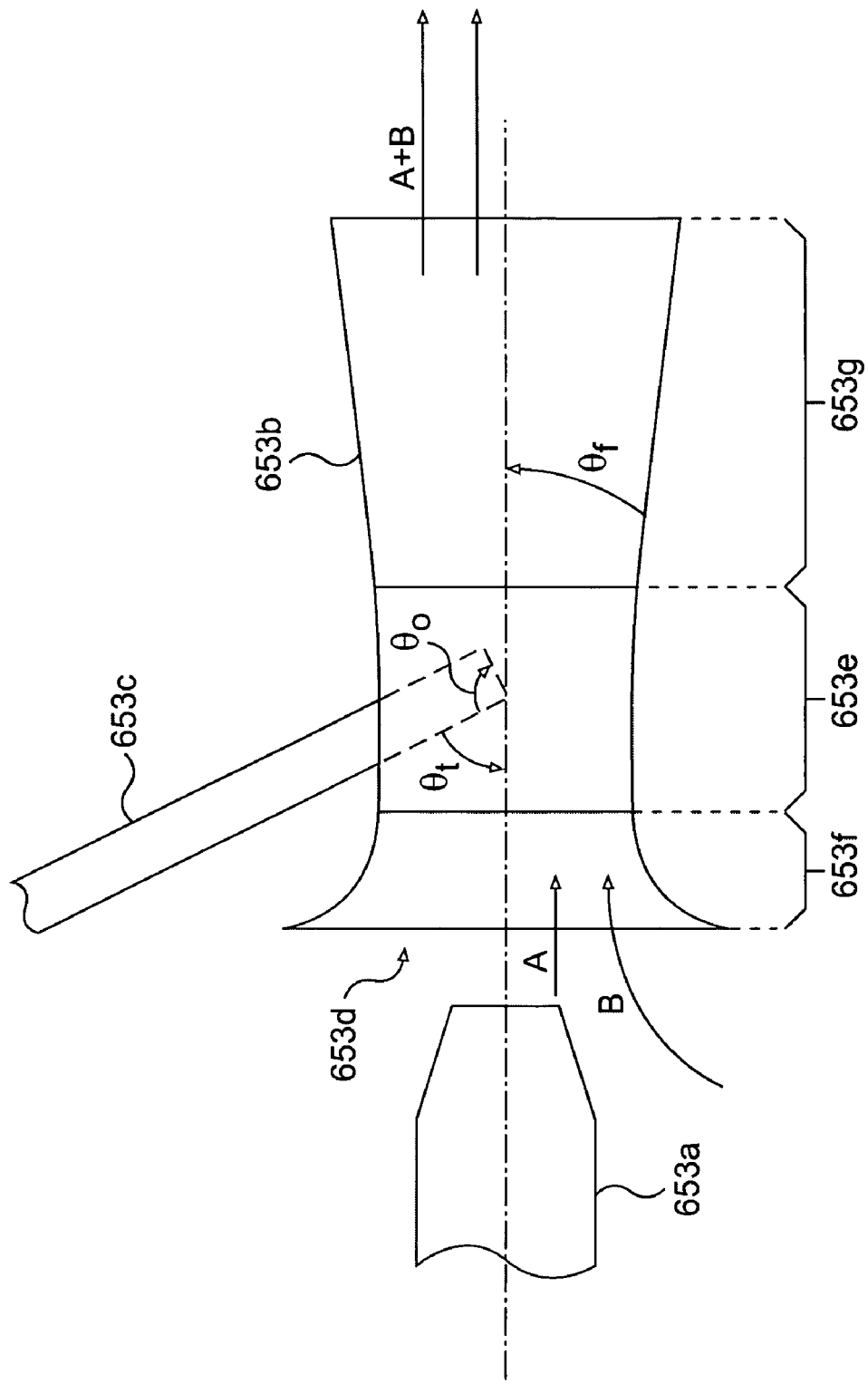

The inlet channel 653a of the eductor, which may be, for example, a nozzle, is located near the flared inlet of the mixing channel 653b, so that a central longitudinal axis of the inlet channel 653a is aligned along the central longitudinal axis of the mixing channel 653b, in a manner which allows water from the chamber 651 to be entrained through the opening 653d between the outside of the inlet channel and the inside of the flared inlet region of the mixing channel. To be efficient, the stream of water from inlet 653a preferably entrains a relatively large amount of water from chamber 651 as it flows into mixing channel 653b, so that the flow of water through the channel 653b is significantly greater than the flow from inlet 653a. For example, as illustrated in FIG. 21b, the flowrate "B" of water entrained may be 3 to 6 times greater, and is preferably 4 times greater, than the flowrate "A" from inlet 653a. The flowrate of water exiting the eductor is thus "A"+"B." In this manner, the use of the eductor in the protein skimmer allows for a relatively large volume of water to be mixed with gas utilizing a relatively small amount of power.

Additionally, the use of the eductor will increase the contact time between the gas bubbles and the liquid by providing improved mixing of the bubbles with the water, which may allow the skimmer of the present invention to be smaller and more efficient than conventional protein skimmers.

As shown in FIG. 21b, the tubing 653c is positioned in the flow of water through channel 653b at an angle $\theta_t$ from the central longitudinal axis of channel 653b. Adjusting the angle $\theta_t$ has been found to provide for improved entrainment and mixing of the gas with the water. While the angle $\theta_t$ may range, for example, from 0 to 90°, $\theta_t$ preferably ranges from 30 to 60°, and is more preferably about 45°. The angle of the tube opening $\theta_o$, as illustrated in FIG. 21b, may also be adjusted to provide for improved entrainment. For example, the angle $\theta_o$ may be adjusted from 90° to 135°. The tubing extends into the flow path of the mixing chamber, preferably so that the outlet of tubing 653c is preferably located at or near the central longitudinal axis of the mixing channel 653b. The diameter of the tubing may be adjusted to allow more or less gas into the mixing channel, without undesirably interfering with the flow through the channel. For example, the tubing may have a diameter ranging from ⅛ inch to 1 inch. The water flowing past the tubing 653c creates a suction, thus causing the fluid in tubing 653*c* to be sucked from the tubing and into the mixing channel 653*b*.

Figure 21C:
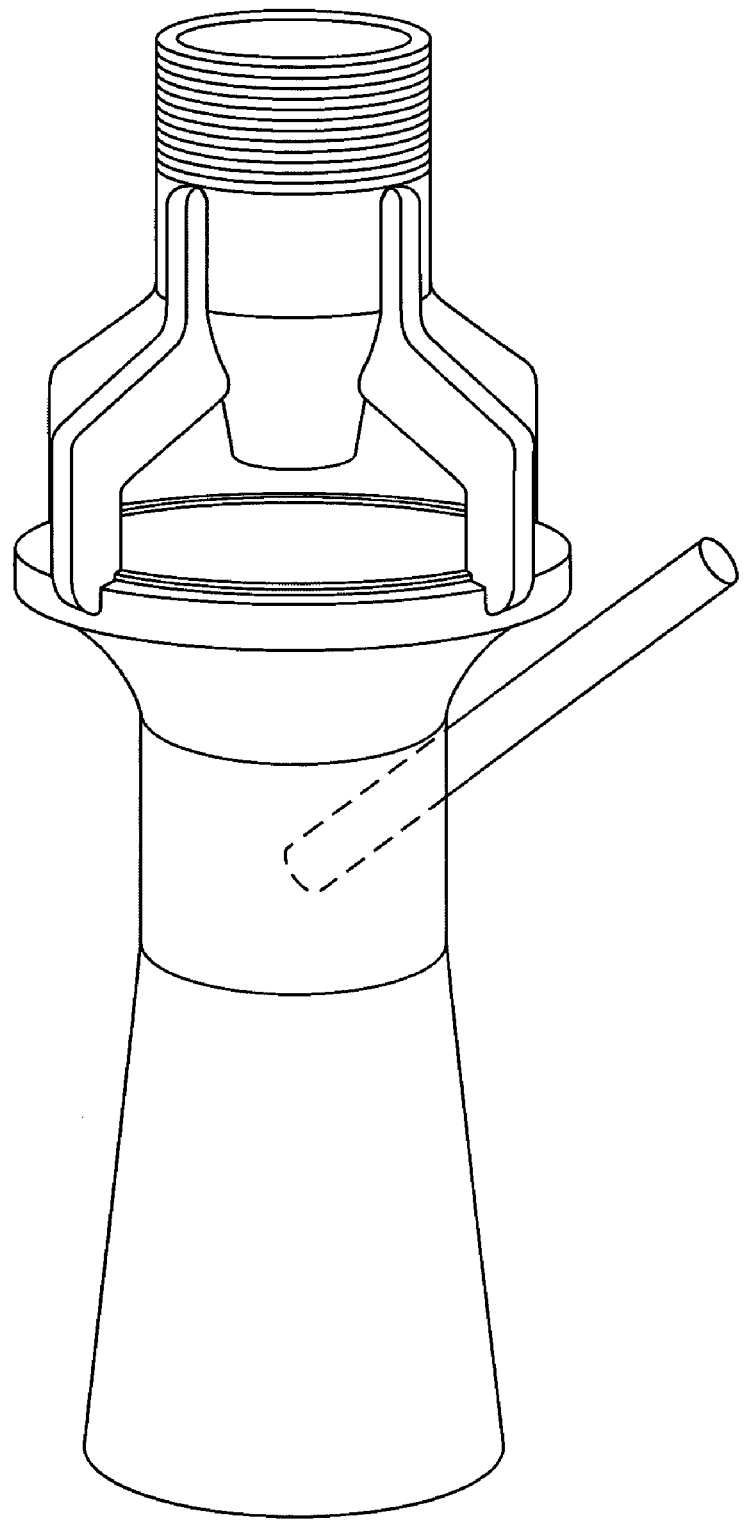

The mixing eductor, including the nozzle, mixing chamber and tubing may be made of various materials, such as plastic or metal. Specific examples of such materials include PVC, polyethylene, polypropylene, methacrylic or acrylic plastic, fiber glass reinforced plastic (FRP), or stainless steel. Any other materials, known in the art for making eductors, may also be used. The mixing eductor is contemplated for use in other applications. For example, rather than a gas, a liquid may be flowed through tubing 653*c*, so that multiple liquids may be mixed together. Additionally, more than one tube 653*c* may be positioned in the mixing channel. For example, mixing eductors having two, three, four or more tubes positioned in the mixing channel in a manner similar to tube 653*c* are contemplated. A 3-dimensional view of an embodiment of the eductor is illustrated by FIG. 21*c*.

Figure 20B:
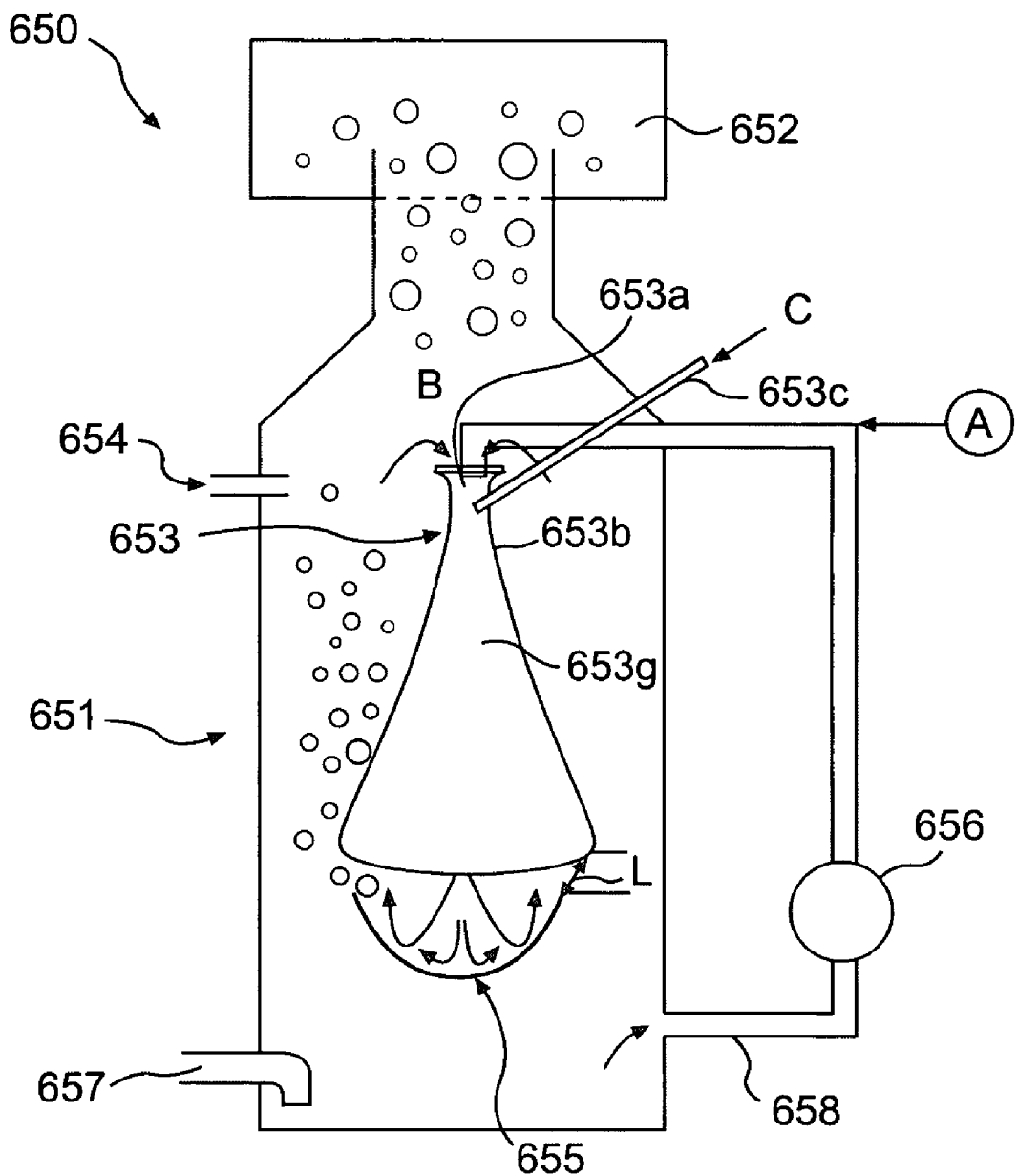

Another embodiment, which is preferably used for fresh water applications, is shown in FIG. 20*b*. This embodiment is similar to the embodiment of FIG. 20*a*, as described above, except for the dimensions of the eductor, and the concaved surface 655. As shown in FIG. 20*b*, the length of the outlet cone 653*g* is longer than the eductor used in the embodiment of FIG. 20*a*, and may range, for example, from about 1 inch to about 80 inches long, and may more preferably be from about 20 to about 60 inches long. In addition, the angle, $\theta_f$, of the outlet cone may be adjusted so that the cone encompasses a relatively large volume of water in the chamber. For example, the angle, $\theta_f$, may be range from about 1° to about 60°, and may more preferably be from about 30° to about 45°. The larger cone acts to trap gas bubbles, which are forced upward by the concave surface 655, so that the bubbles are not allowed to rise to the surface, but remain trapped between the cone and the surface 655, where the water is well mixed and the bubbles will be forced to circulate through the water. This increases the contact time of the bubbles with the water before they finally escape from underneath the cone, thereby increasing the amount of organic matter trapped by the bubbles. If necessary, the size and shape of the concave surface 655 may also be adjusted to reduce the space "L" between the surface 655 and the end of cone 653*g*, in order to more effectively trap the bubbles underneath the cone. For example, L may range from about ¼ inch to about 60 feet, and may more preferably be from about 8 inches to about 10 feet.

The longer contact time is especially important for fresh water, as the bubbles formed in fresh water are naturally smaller than the bubbles formed by the eductor in salt water, which effectively decreases the total surface area of the bubbles formed in fresh water, thus decreasing the efficiency of the skimmer. This difference in bubble size is thought to be caused by the different specific gravities of salt and fresh water. In any case, the increased contact time of the bubbles in the FIG. 20*b* application helps to compensate for the decrease in total surface area of the bubbles in fresh water. However, the embodiment of FIG. 20*b* is not limited to fresh water, but may be used any time increased contact time between the bubbles and the water is desired.

Figure 22A:
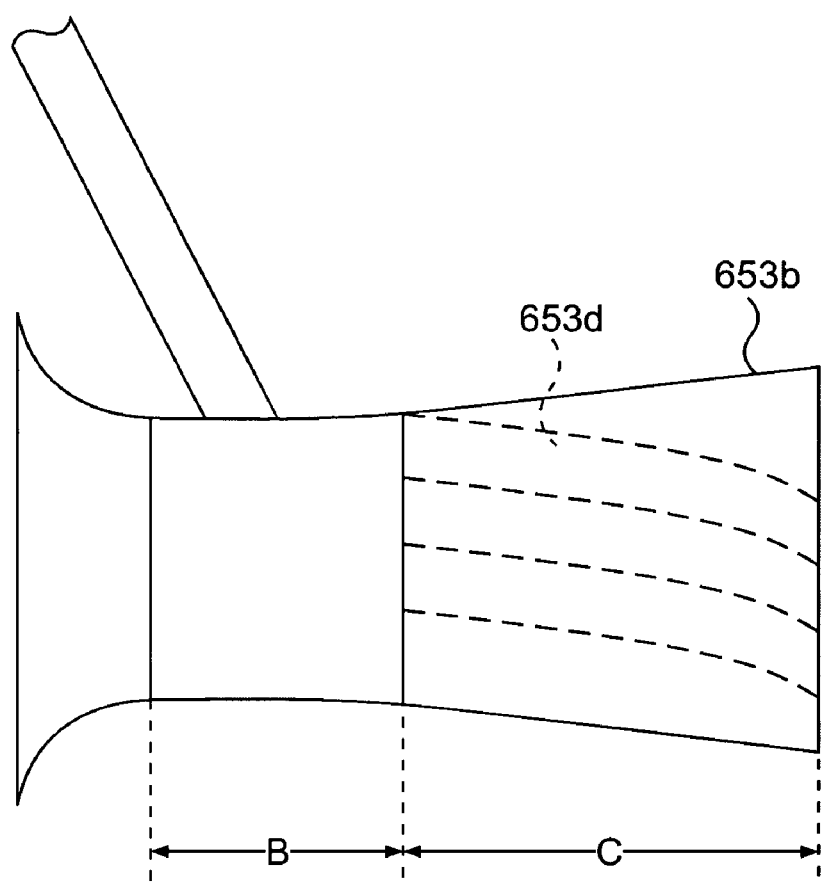
FIGS. 22a and 22b are diagrammatic representations illustrating another embodiment of an eductor for mixing fluids, according to the present invention.
Figure 22B:
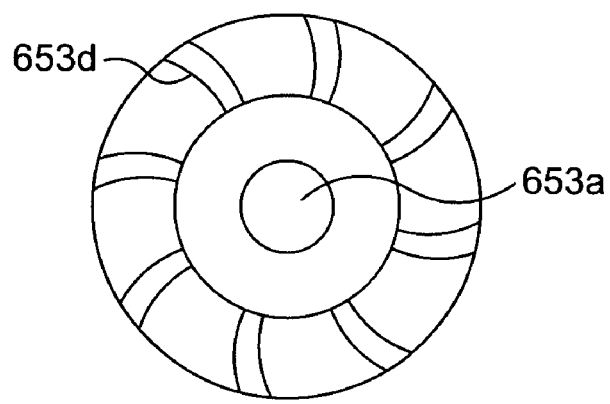

In yet another embodiment, illustrated in FIGS. 22*a* and 22*b*, the outlet cone 653*b* of the eductor may be modified by adding wings, or foils, 653*d* to the inner surface of the outlet cone. The foils rotate around the inside surface of the outlet cone in a manner which act to direct the motion of the water through the cone in a helical path, thus creating a vortex. Such a circular motion may act to increase the contact time of the bubbles with the water, and thereby increase the efficiency of removal of organic matter in the water. The dimensions of the foils may be modified to be any size or shape which will create the desired circular motion. For example, the foils may extend from about ¹⁄₁₆ to about 1 inch from the inner surface of the cone for the entire length, or only a portion of the length, of the outlet cone 653*d*, and may have and a width of from about ¹⁄₃₂ to about ⅛ inches.

Figure 20C:
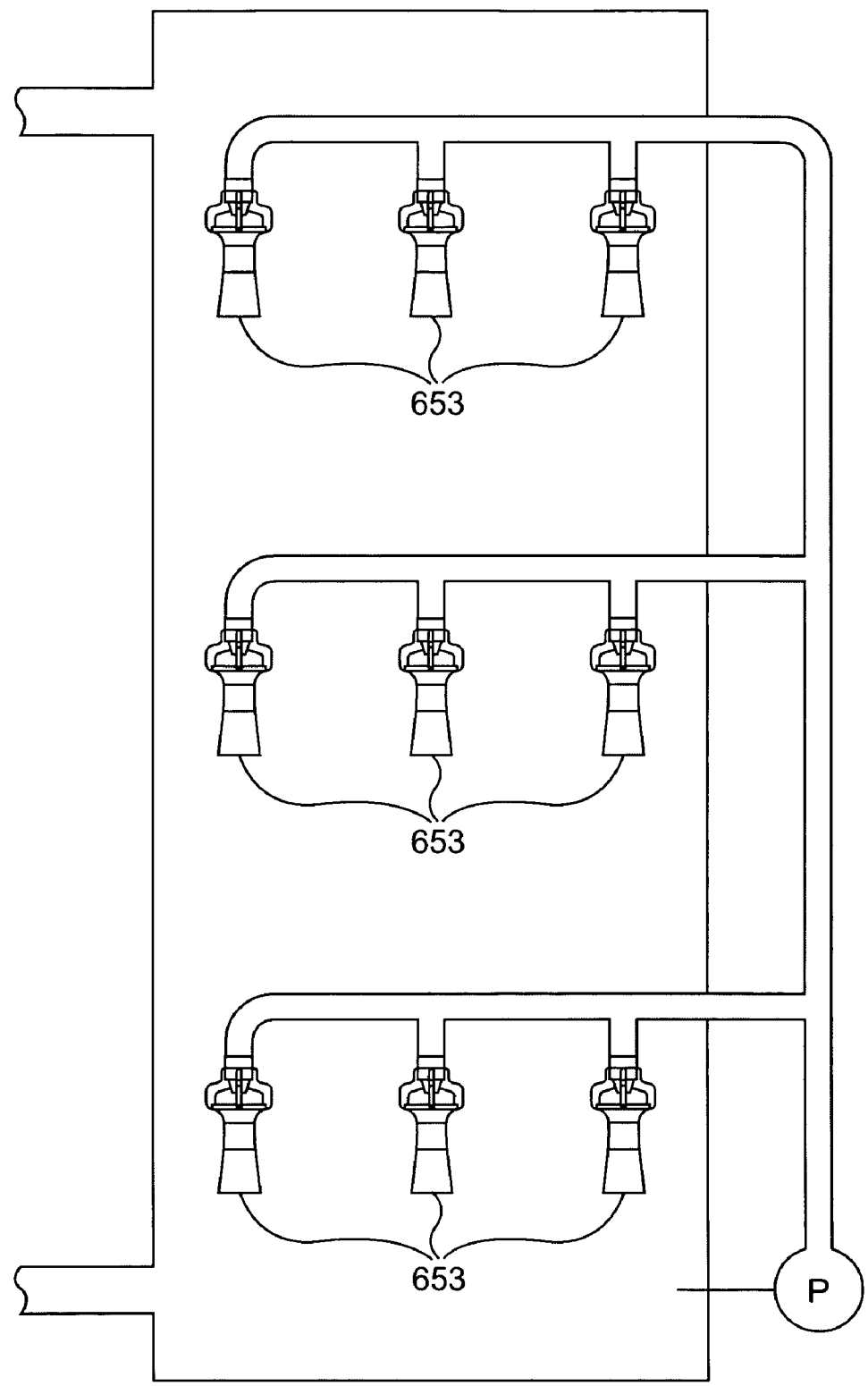

Embodiments using multiple eductors in a single tank are also contemplated, as shown in FIG. 20*c*. The eductors may be arranged both vertically and/or horizontally within a tank in order to provide the desired circulation of bubbles for any given shape or size of tank, to maximize removal of organic matter.

While the novel protein skimmer's described above for use in the system for large aquariums, as illustrated by FIG. 17, the protein skimmer's of the present invention may be used in any system where a protein skimmer is desired. For example, the protein skimmer's of the present invention may be used in combination with any of the other nitrafix systems disclosed herein. The flow through the protein skimmer may be optimized to achieve the desired water quality. For example, the flow rate through the skimmer may be from 1 to 3 times the aquarium volume per hour.

The eductor of the present invention is contemplated for use in other applications besides a protein skimmer where up to three different fluids are to be mixed.

Referring back to FIG. 17, another alternative embodiment provides for flowing water from the anaerobic chambers to a conventional degassing tower 660 which puts oxygen into the water and raises the pH. In a degassing tower, water cascades down through plastic balls or over a screen, breaking up the water and increasing the surface contact of the water with air, thereby entraining air into the water. Such degassing towers are well known in the art.

Figure 18A:
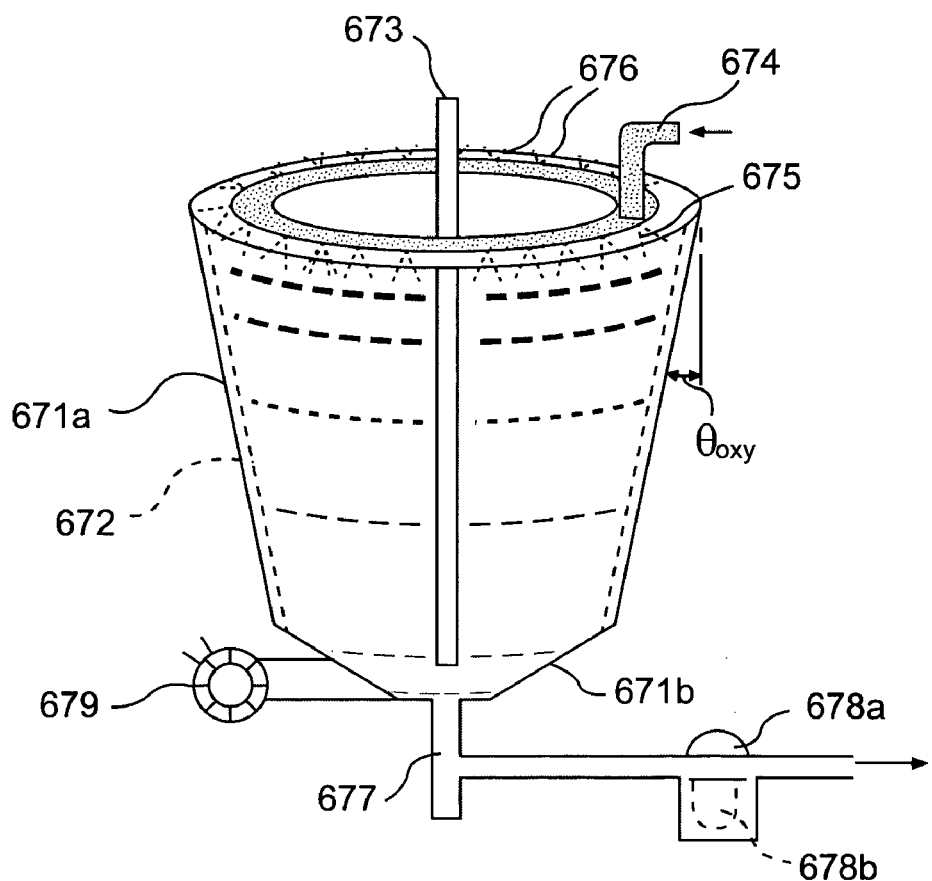
FIGS. 18a and 18b are diagrammatic representations of side and top views, respectively, of a chamber which utilizes algae to remove contaminants from water, according to an embodiment of the present invention.
Figure 18B:
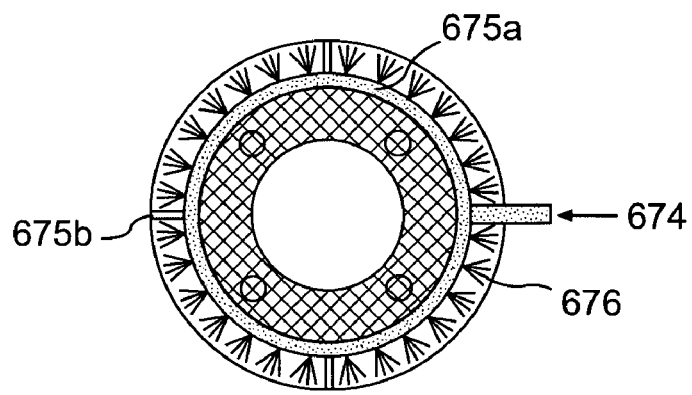

In yet another embodiment, water from the anaerobic chambers is supplied to an oxytower 670 of the present invention, which is illustrated in FIGS. 18*a* and 18*b*. The oxytower removes nitrates, nitrites, phosphates, carbon dioxide and heavy metals from the water, as well as adds oxygen to the water. By oxygenating the water, the pH will remain more stable than water that is oxygen deficient. Further, the oxytower will also help to cool the water by evaporation.

The oxytower of the present invention is in the shape of an inverted truncated cone, having side walls 671*a* that slope inward at an angle $\theta_{oxy}$ of, for example, 5 to 45 degrees, and more preferably 10 to 20 degrees, as shown in FIG. 18*a*. A medium, such as a screen 672, is placed on the inner surface of the cone and serves as support for the growth of algae in the oxytower. A pipe 675*a* or other means, such as a gutter, for channeling water is located along the top inner circumference of the oxytower chamber. The pipe 675*a* has a plurality of outlets 676, such as holes or jets, located along its outer circumference through which water may be dripped or sprayed along the top surface of the screen. The pipe 675*a* is connected onto the wall of the oxytower by supports 675*b*, as shown in FIG. 18*b*. An artificial light 673 is applied to support photosynthesis by the algae growing on the screens. Alternatively, the oxytower may be placed so it is subjected to sunlight during the day.

During operation of the oxytower, water flows into pipe 675*a* through inlet 674, and is dripped or sprayed from outlets 676 onto the top of the screens 672. The water then drips down the screens by force of gravity. As the water drips down the screen surface, the screen will break up the water and cause an increase in surface area, which will allow for the water to be effectively degassed. Additionally, algae growing on the screens will remove unwanted contaminants in the water, such as phosphates, nitrates, nitrites and heavy metals, which the algae uses for nutrients as it grows. The water then flows out of the tower through outlet 677. Water from the outlet may be passed through strainer or mechanical filter 678a for removing debris from the water. As shown in FIG. 18a, a trap basket 678b may be used for holding the removed debris.

The flow of water through the tower may vary. For the oxytower to be effective, it is preferable that the volume of water being treated pass through the oxytower 2.5 times per day. It is more preferable that the volume of water being treated pass through the oxytower once per hour.

While the walls of the oxytower are preferably inclined, as shown in FIG. 18a, the walls, as well as the screens supported by the walls, may be vertical, so that the oxytower has a cylindrical shape. The walls of the oxytower can be made of any neutral plastic (i.e., a plastic that is minimally reactive, or non-reactive, with the water being treated) that is safe for aquatic life. Examples of suitable materials include PVC, polyethylene, polypropylene, methacrylic or acrylic plastic, fiber glass reinforced plastic (FRP), or stainless steel. The oxytower may have a diameter of up to 8 feet or more, and may have any practical height.

The screen 672 may be made from any material which is safe for aquatic life and which is resilient and will not corrode in saltwater. For example, the screen may be made of soft nylon or fiberglass material. The screen may be one continuous piece, but is preferably in multiple pieces for easy cleaning. For example, the screen may have 4, 6, or 8 sections. The screen may have various shapes, sizes and hatching patterns. The preferred screen would have a diamond shape cross hatching that is 3/16 inch to 1/4 inch in length for each leg of the diamond. The screen, or screen sections may be attached to a pre-formed plastic support. The plastic support can then be attached to the inside of the tower. Alternatively, a medium other than screens may be used which will accomplish a similar function as the screens. For example, carpet may be used in place of the screens.

During operation of the oxytower, the screens should periodically be cleaned in order to promote the optimal growth of algae for removing contaminants from the water. It is preferable that the entire surface area of the screen not be cleaned at one time. For example, in an embodiment where there are 4 sections of screen, it is preferable that more than 2 sections not be cleaned at one time. For best results, the screens are cleaned periodically on a rotating bases, where one screen is cleaned, and then after the algae begins to grow on the cleaned screen, another screen is then cleaned. The cleaning of the screens should be done carefully so as not to remove the roots of the algae. If the roots are removed, the algae will grow more poorly and slowly. Preferably, the screens should not be bleached, pressure cleaned or cleaned with chemicals, so as not to harm the algae.

The light source 673 may be any light source which will provide the necessary light for photosynthesis and algae growth. The light source may be natural or artificial light and may be provided either directly or indirectly to the algae. For example, where the surface of the screen is 2 square inches per gallon of water to be treated, and the flow of water is 0 to 0.02 gal/min/square inch of screen surface, the light source preferably provides at least 0.75 watts per 10 $in^2$ of screen surface, such as, for example 1 watt per 10 $in^2$ of screen surface. Examples of light sources which may be used include natural sunlight, a power compact tube, a high output (HO) or very high output (VHO) fluorescent bulb with a spectrum of 4000 K to 10,000 K. A metal halide bulb may also be used. Bulbs may be mounted vertically and continuously along the height of the oxytower. The light source 673 should be placed a distance from the screens which will be effective for promoting photosynthesis and growth of the algae. For example, where the above HO or VHO fluorescent bulbs are used in the embodiment of FIG. 18a, the tower preferably has a maximum diameter of from 4 to 8 feet, in order to optimize the distance from the screens to the light. For larger units, metal halide bulbs may be used with or without reflectors. It is preferable that the light remains on 24 hours per day continuously for optimal algae growth.

Figure 19A:
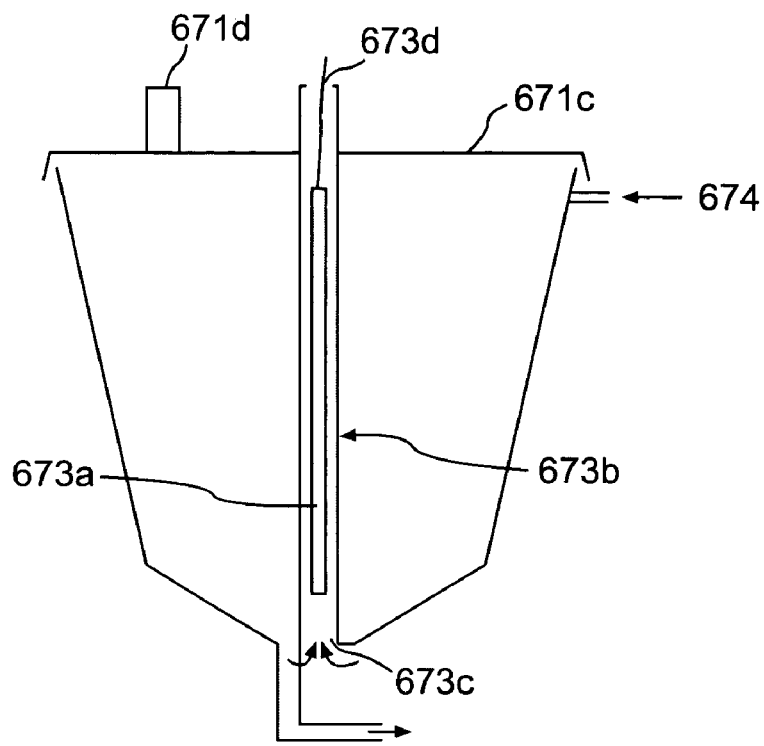
FIG. 19a is a diagrammatic representation illustrating the placement of a light source within a chamber which utilizes algae to remove contaminants from water, according to a further embodiment of the present invention.

The bulbs can be covered with a translucent acrylic or glass covering to protect them from water. In larger units the protective covering 673b will preferably extend all the way through the unit and will have openings 673c and 673d to allow for improved ventilation, as shown in FIG. 19a. The heat produced from the light will rise, which will cause an elevated air current to suck in cool air from the bottom opening 673c of the protective covering 673b and cool the light bulb 673a. An apparatus for moving air, such as a fan (not shown), can be added to further ventilate the light to make cooling more efficient.

Figure 19B:
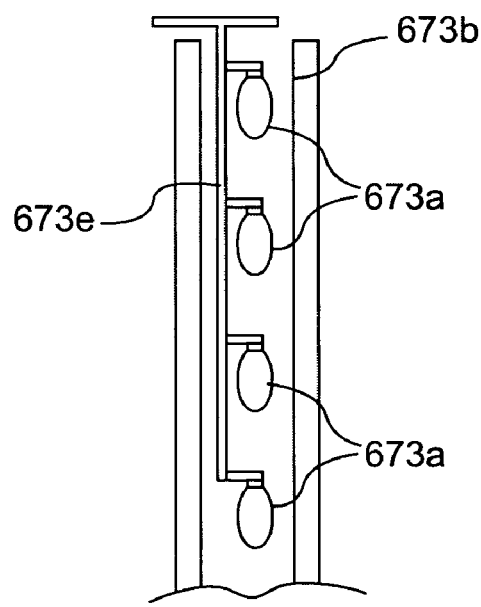
FIG. 19b is a diagrammatic representation of a light source which may be used in the chambers illustrated in FIGS. 18 and 19a, according to an embodiment of the present invention.

In another embodiment, illustrated in FIG. 19b, a stainless steel bar 673e can be used for support for multiple bulbs 673a. In this embodiment, the number of lights may be chosen to optimize the amount of light for improved algae growth and contaminant removal from the water.

The oxytower may have a top cover 671c, to prevent unwanted debris from getting inside. The cover may be transparent to allow light, such as natural sunlight, into the chamber. The cover may have a chimney 671d through which gas emissions from the oxytower may be collected and/or vented. For example, the chimney may be filled with activated carbon, which may be used to adsorb hydrogen sulfide gas.

The bottom of the chamber 671b may be flat, or it may be conically shaped as shown in FIG. 18a. The conical shaped bottom 671b is better for collecting detritus.

An optional blower 679 may be used to blow air into the oxytower, which will increase evaporation in the tower and cool the water, as well as help to degas the water. If a blower is to be used to cool the water, it is preferable that the tower be insulated for improved cooling efficiency. Additionally, carbon dioxide may also be blown into the oxytower to raise oxygen levels in the water through increased respiration and production of oxygen by the algae.

The oxytower of the present invention is particularly suited for use in combination with at least aerobic and anaerobic chambers of the present invention, to treat and condition water in aquariums of 500 gallons or more. However, the oxytower may be employed for smaller aquariums and may be used in combination with any of the systems described herein. In addition, the oxytower of the present invention can be applied to other applications where water is to be treated, even in the absence of the denitration methods and systems of the present invention. For example, the oxytower can be used in place of protein skimmers in standard commercial applications.

Additionally, the oxytower is contemplated for use in a broad range of other applications, such as for use in waste water treatment, drinking water purification, and other applications where it would be helpful to remove contaminants using algae.

A further process step, which may be added to any of the Nitrafix systems described herein, can be used to reduce sulfate concentrations. As described above, the denitration process of the systems of the present invention results in increased levels of sulfates in the water. Additionally, there is the possibility that undesirable amounts of hydrogen sulfide may also be produced at certain times, such as at startup, after the denitration chamber has been shut down for a period of time. Consequently, it may be desirable in some aquarium systems to reduce the level of sulfates and/or hydrogen sulfide.

Accordingly, a novel method and desulfator apparatus for reducing sulfate and hydrogen sulfide concentrations in aquarium water will now be described with reference to FIGS. 23a to 23c. The method and apparatus are not limited to use with the systems of the present invention, but could be used in any system where it is desirable to reduce sulfate concentrations.

The desulfator of the present invention utilizes anaerobic photosynthetic bacteria to reduce sulfate levels in both fresh and saltwater systems. Any type of anaerobic photosynthetic bacteria which will reduce sulfate levels may be used. Examples of such bacteria may include, purple bacteria, purple nonsulfur bacteria, and/or green sulfur bacteria, such as *Chromatium vinossum, Thiospirillum jenense, Rhodospirillum rubrum, Rhodobacter sphaeroides, Chlorobium limicola, Prosthecochloris aestuarii*. In the presence of light, these bacteria will use photosynthesis to break down sulfates and/or other sulfur compounds in the water.

Figure 23A:
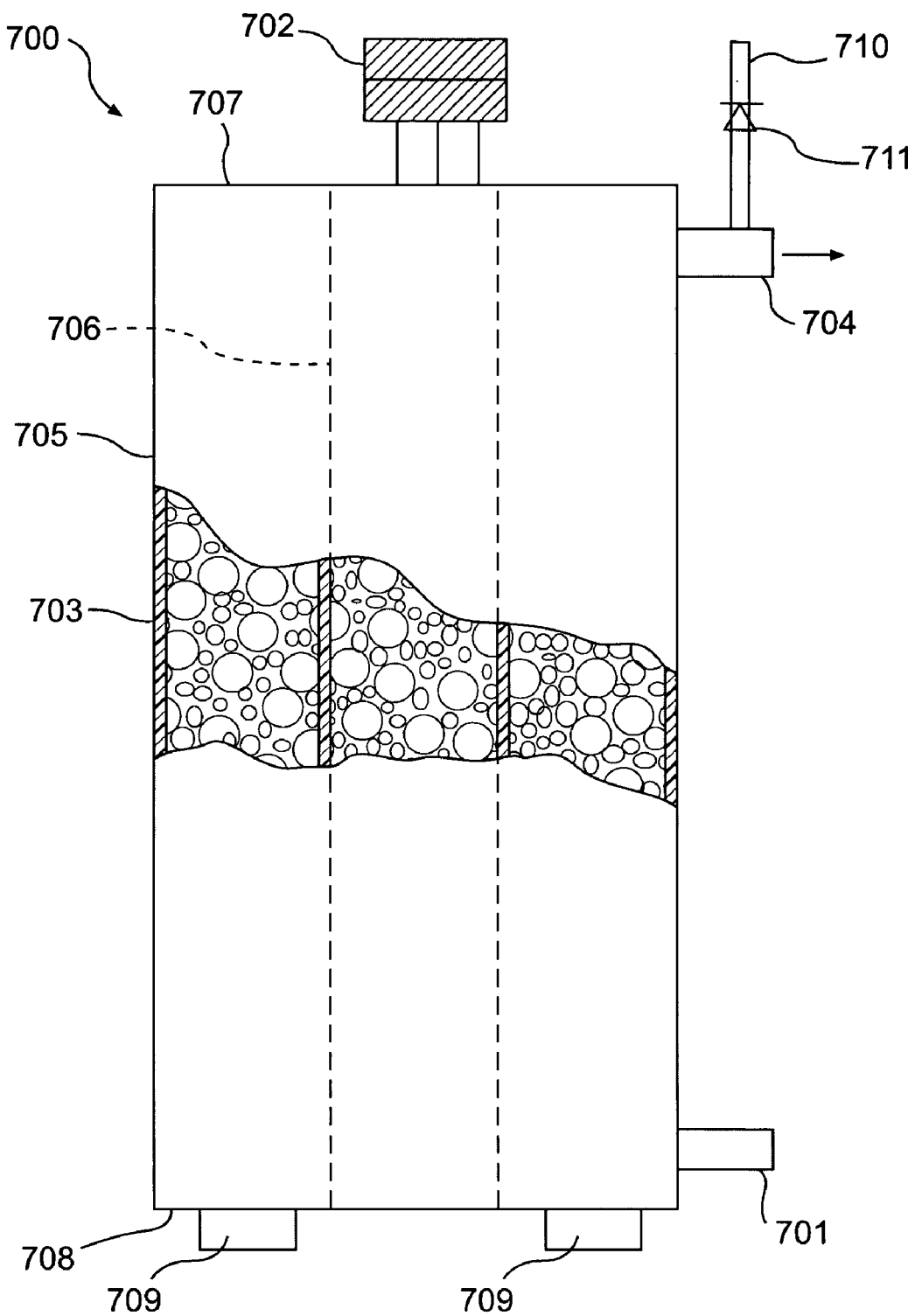
FIGS. 23a to 23f are diagrammatic representations illustrating a chamber for removing sulfates, according to an embodiment of the present invention.
Figure 23B:
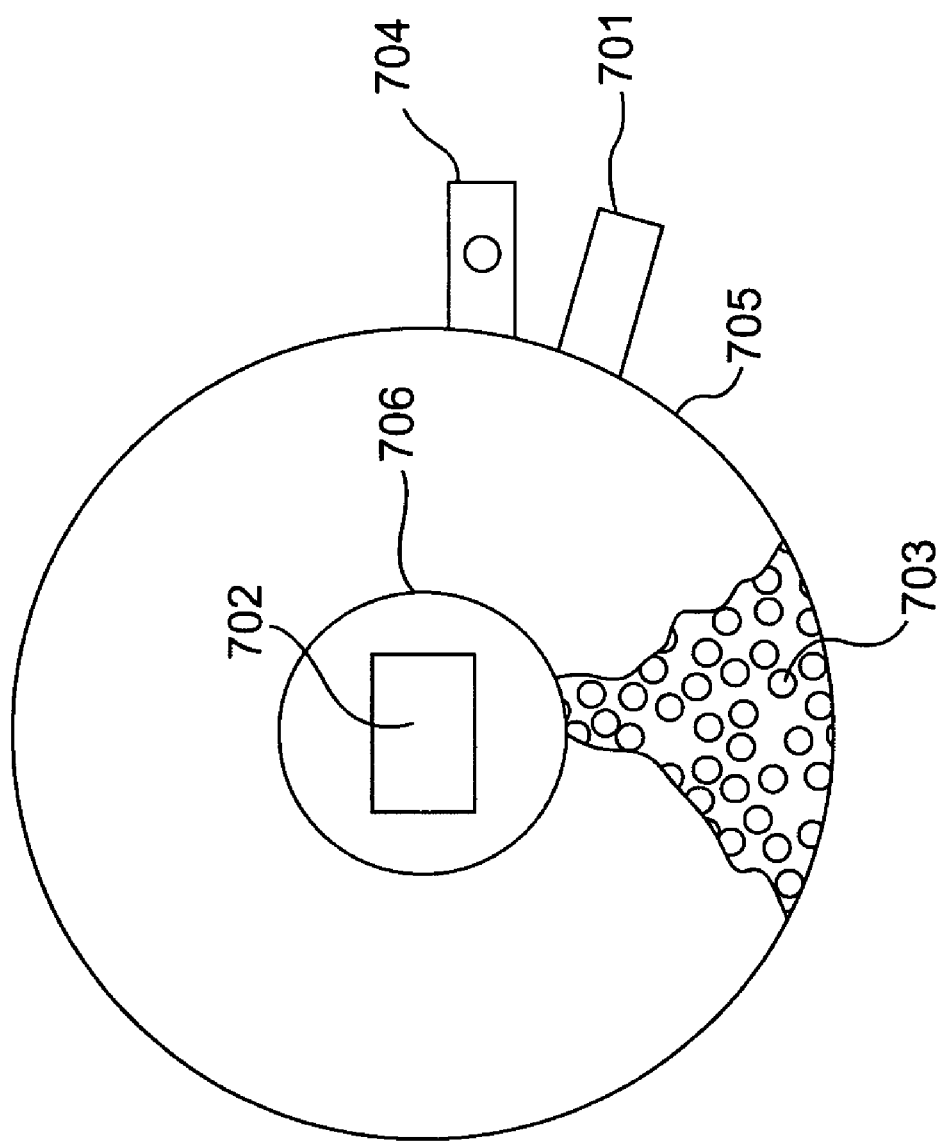
Figure 23C:
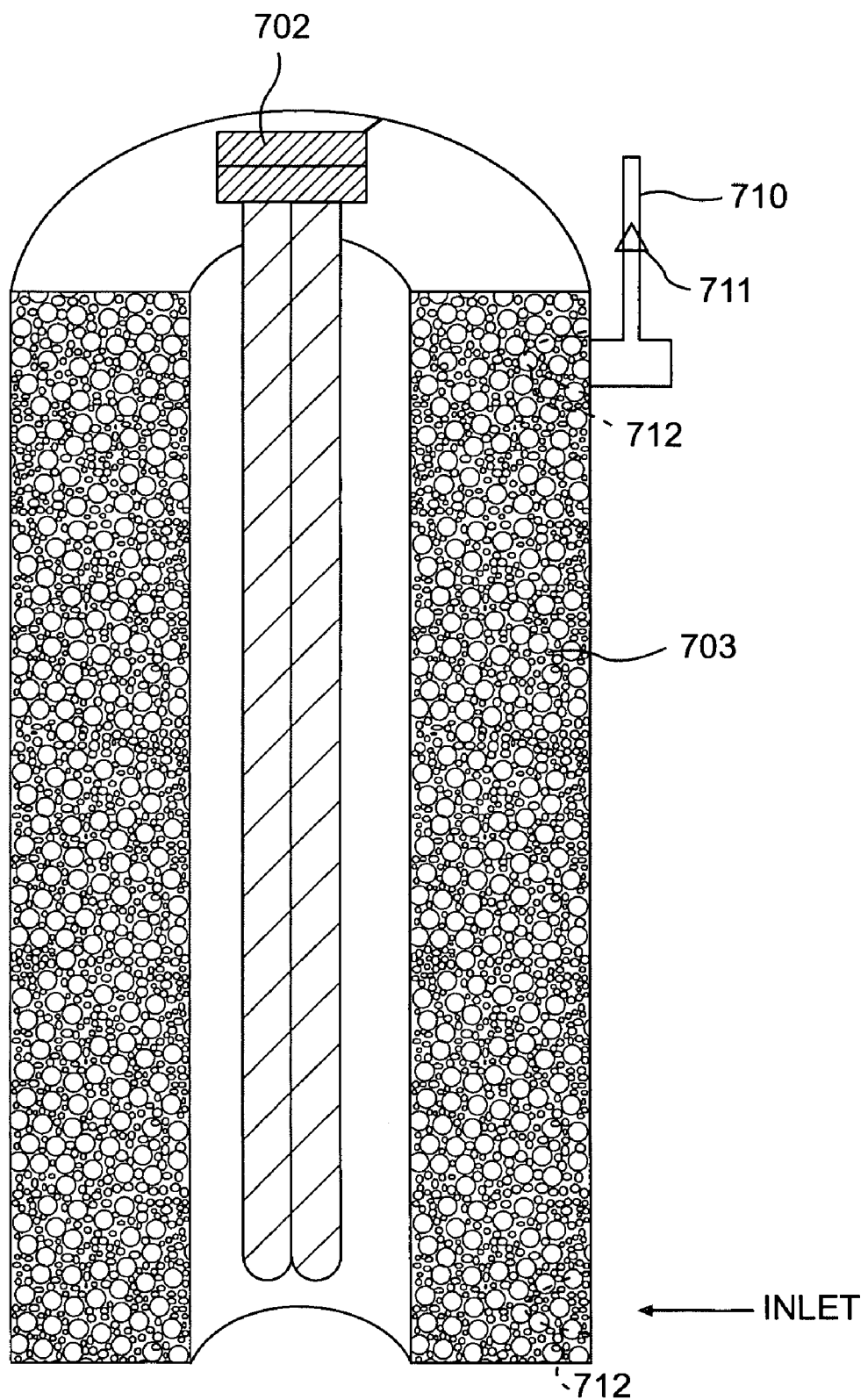

One preferred embodiment of a desulfator apparatus 680 is illustrated in FIG. 23a. The desulfator apparatus of this embodiment preferably comprises a chamber 700, which contains media 703 for supporting the sulfur bacteria, a light source 702, as well as inlet 701 and outlet 704, for allowing water to flow in and out of the chamber.

The chamber 700 can be any shape, but is preferably a cylindrical shaped chamber having an outer cylinder 705 and an inner cylinder 706 concentrically arranged inside the outer cylinder. The walls of the chamber are preferably transparent to light, and may be made of, for example, a clear acrylic plastic. The media 703 for supporting the bacteria is contained between walls 705 and 706, as illustrated in FIG. 23b. The portion of the chamber containing the media should be air tight, so as to not allow the introduction of oxygen into the chamber. A vent 710 having a valve 711 may be used to allow exhaust gasses produced within the chamber to escape. Valve 711 is a one way flow valve, allowing the flow of gases out of, but not into, the chamber.

The support media 703 is preferably transparent to light. For example, the media may be a clear biofilm, such as, Kaldnes, which is made by WMT. Other media like Bio-Chem stars from RENA may also be used. The surface area provide by the media is preferably relatively large. For example, the media may have an average surface area of 500 square meters per cubic meter or greater, and more preferably an average surface area of 850 square meters per cubic meter or greater.

The ratio of the height of the chamber to the diameter of the chamber is preferably from 3 to 5, in order to allow for sufficient contact time between the water and the bacteria supporting media.

Figure 23D:
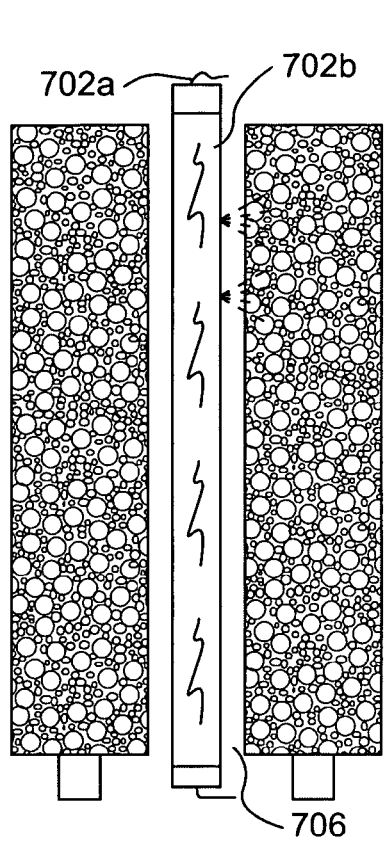
Figure 23E:
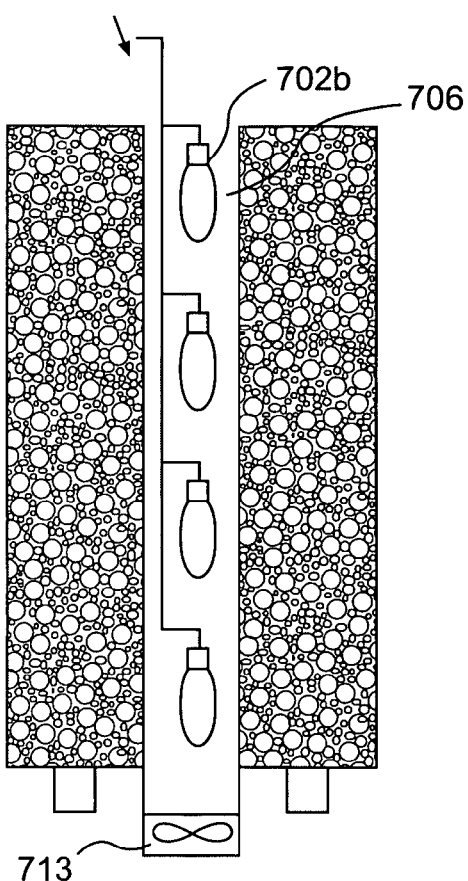
Figure 23F:
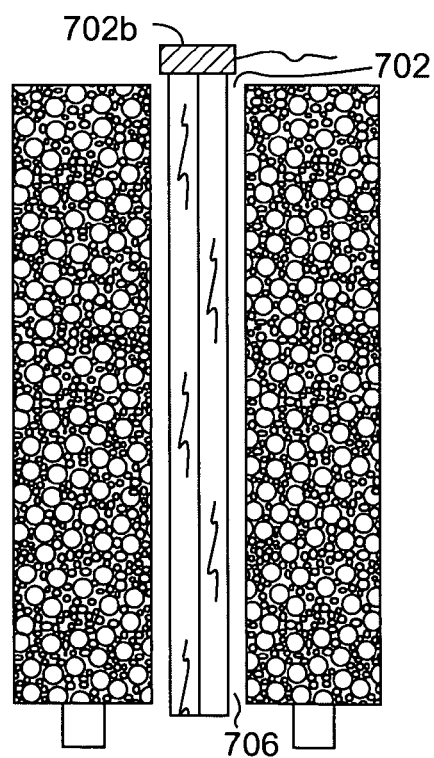

The light used in the chamber can be either natural sunlight or artificial light, or both. For example, a light source 702a may extend down through the inside of cylinder 706, as shown in FIGS. 23d, 23e and 23f, in order to provide light throughout the chamber. FIG. 23d illustrates the use of an HO or VHO tube, which must be connected to a power source at both ends 702b and 702c. FIG. 23e illustrates the use of metal halide or incandescence bulbs 702b, which may be arranged vertically down the center of the chamber as shown, in order to provide the desired amount of light to the bacteria. FIG. 23f illustrates thus use of a power compact tube 702b, which has the advantage of being connected to the power source at only one end. The cylinder 706 may be open at its ends in order to allow for ventilation to the light source, as shown for example in FIG. 23d. An apparatus for moving air, such as a fan 713, as illustrated in FIG. 23e, may be used with any of the disclosed light sources to increase the amount of ventilation through the cylinder 706.

Because the walls 705 and 706 and the media 703 are transparent to the light from the light source, a maximum amount of the volume of the chamber housing the bacteria is exposed to the light, thus increasing the efficiency of the chamber. The spectrum of light used is preferably a day spectrum light from 4000° K. to 25000° K. The light may be left on continually for increased efficiency.

The flow of water through chamber 700 is preferably from bottom to top, in order to avoid clogging. Additionally, as shown in FIG. 23c, screens 712 may be placed in front of the inlet 701 and outlet 704 to prevent clogging and to contain the media in the chamber. The flow rate of water through the chamber may be adjusted to allow for the desired amount of sulfate reduction. Because the bacteria used in the desulfator apparatus are anoxygenic, it is preferable that the water entering the chamber have a low oxygen content. If necessary, a system for reducing oxygen content of the water may be utilized to reduce the oxygen concentration before the water enters the chamber.

Yet another preferred embodiment of a system for filtering and conditioning water will now be described with reference to FIG. 26. While the system is designed for use with larger aquariums, it may be used for any size aquarium. The system may also be used for maintaining the water of aqua tanks, where fish are raised in aqua culture applications.

Water flows from aquarium or aqua tank 116 to a filter 101. This filter is preferably a mechanical filtration device which allows the water to pass through the filter without pressurization from a filter pump, thus saving power. However, any filter known in the art may be used, including filters requiring a filter pump. The filter removes particulates from about 30 microns to about 200 microns from the water. Examples of filters which are known in the art include a drum filter, a disk filter, and a sock filter.

Water next flows from filter 101 to a sump 102. Sump 102 preferably has a volume which is large enough to prevent overflow of water from the system when the system is stopped. Both mechanical filter 101 and sump 102 may be placed at elevations which are lower than aquarium or aqua tank 116 in order to allow water to run from the aquarium or aqua tank 116 to the mechanical filtration device and sump by force of gravity, which will save energy and lower the cost of operation. If filter 101 and sump 102 are not placed at elevations lower than aquarium 100, then a pump may be used to pump water from aquarium 100 to filter 101 and sump 102.

From sump 102, water flows to a number of other processing apparatus which further purify and condition the water. These apparatus include a bio-filter 107; a protein skimmer 109; an oxytower 110; a denitration system 112, a desulfator 111; an optional heater or chiller 114, for adjusting the temperature of the water; and a UV sterilizer 113, for sterilizing the water before it returns to aquarium or aqua tank 116.

As shown in FIG. 1, a portion of the water flows from the sump to bio-filter 107, then to protein skimmer 109, and then to oxytower 110. The remaining water flowing from the sump flows to denitration system 112 and desulfator 111, and then to oxytower 110. The percentages of water flowing from the sump to bio-filter 107 and from the sump to denitration system 112 may be adjusted to achieve the desired water conditions. For example, about 90% to about 99% of the water may flow from the sump to bio-filter 107, while about 1% to 10% may flow from the sump to denitration system 112. More preferably about 97% to about 99% of the water may flow from the sump to bio-filter 107, while about 1% to about 3% may flow from the sump to denitration system 112.

From oxytower 110, the water may flow through an optional heater or chiller, in order to maintain the water in aquarium or aqua tank 116 at an acceptable temperature for the fish. Heaters and chillers are well known in the aqua culture art. The water then flows through UV sterilizer 113, which kills any microorganisms in the water, such as bacteria, which may be harmful to the fish, before flowing back to the aquarium. Such UV sterilizers are also well known in the art.

Bio-filter 107 uses aerobic bacteria processing to treat the water to reduce ammonia to nitrite and nitrite to nitrate. The water to be treated is flowed through a chamber which contains a support media on which the aerobic bacteria may colonize. A gas comprising oxygen is introduced into the chamber to improve the efficiency of the aerobic bacteria process.

Figure 27:
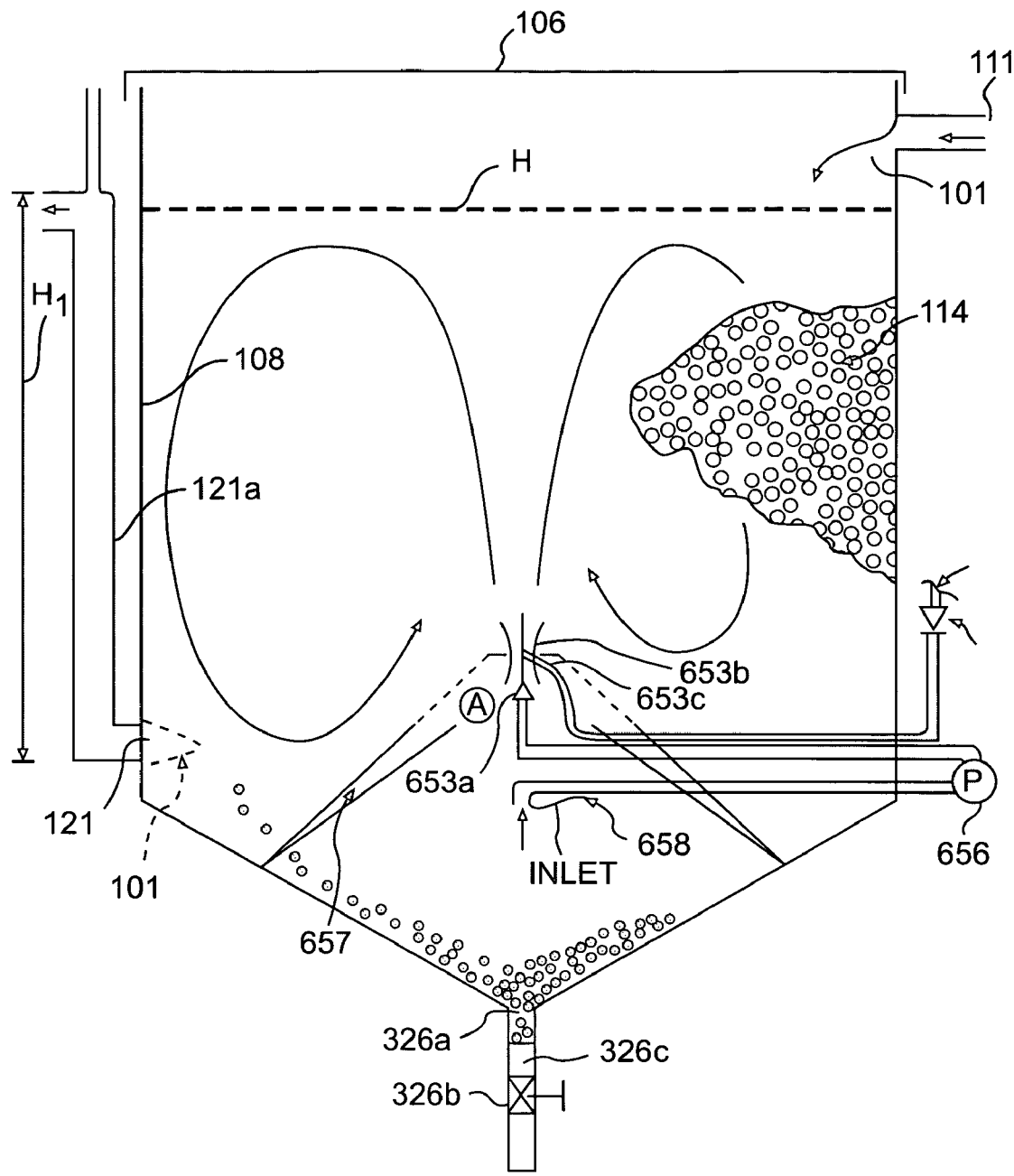
FIG. 27 illustrates a bio-filter chamber, according to an embodiment of the present invention.

One embodiment of a bio-filter which may be used is illustrated in FIG. 27. In this embodiment, bio-filter 107 comprises a tank 108. Preferably the lower portion of which has a tapered shape to collect sediment which settles to the bottom, although it may have a flat bottom. For example, tank 108 may be in the shape of cylinder with a cone shaped bottom. A drain 326a and valve 326b can be included in the bottom of tank 108, to allow sediment to be periodically removed. If desired, a clear section of pipe 326c may be employed to allow visual inspection of the drain so that sediment buildup may be monitored. A lid 106 may be used to cover the tank 108.

The chamber has an inlet 111 and an outlet 121 through which water can enter and exit the chamber. A screen 101 may be placed over the outlet and inlet to avoid clogging and contain the media within the chamber. The height H1 of the outlet pipe 121a will control the level of water in the bio-filter 107.

Bio-filter 107 may be partially or completely filled with support media 112, which acts as a substrate for the aerobic bacteria. The aerobic bacteria already exist in the water of the aquarium and will readily colonize on the media. The media 112 may be any type of media that can support colonization of aerobic bacteria. While a media having any practical size and shape may be used, media having a high surface area is preferred. For example, sand, crushed coral and other media having relatively high surface areas may be used. One preferred form of support media is plastic, which may be in the form of small spheres or tubes, although any shape known in the art may be used. The plastic media is lightweight and may float in the aquarium water. It does not clog easily, and provides a large surface area for bacterial colonization. One example of such a plastic media is known as biofilm. Examples of biofilm which may be used include Kaldnes and Bee-Cell, which are manufactured by Water Management Technologies, Inc. Other media like Bio-Chem stars from RENA may also be used.

A mixing eductor 653, is used to eject a gas comprising oxygen into the tank. The bubbles are well mixed with the water in the tank by mixing eductor 653, which comprising an inlet channel 653a, a mixing chamber 653b, and a tubing 653c. A pump 656 circulates water from bio-filter 107 through pipe 658 to the inlet channel 653a, where the water is forced through the mixing chamber 653b and mixed with the gas from tubing 653c and additional water entrained by the mixing eductor from the bio-filter. Alternatively, the water going to eductor inlet channel 653a could be supplied from a source outside the bio-filter chamber, such as from the sump or the aquarium itself. Mixing eductor 653 and its operation are described above in more detail with reference to FIGS. 21a to 22b.

Figure 28A:
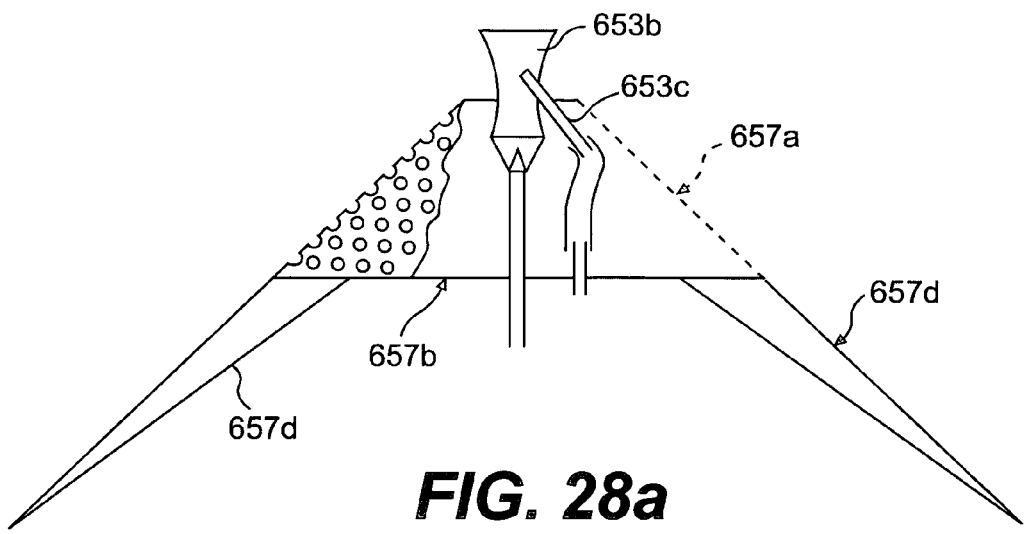
FIGS. 28a and 28b illustrate a support for a mixing eductor used in the bio-filter chamber of FIG. 27, according to an embodiment of the present invention.
Figure 28B:
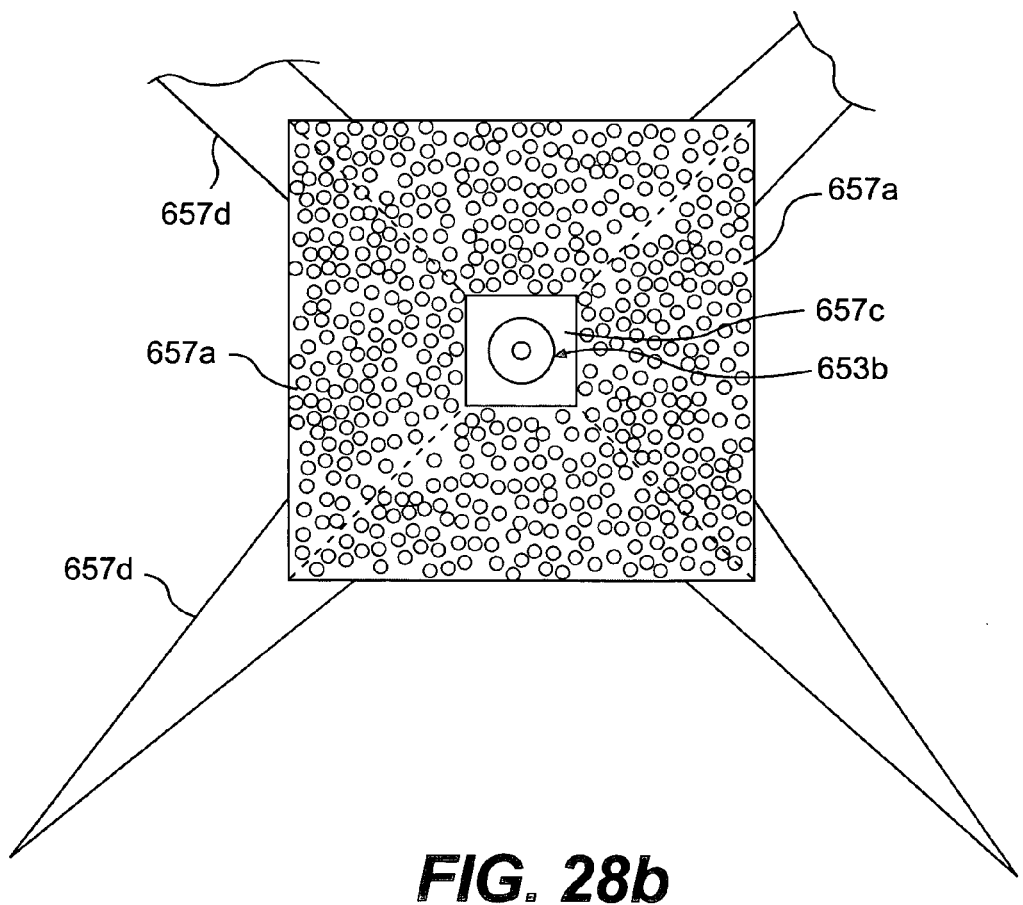

In one embodiment, mixing eductor 653 may be supported inside bio-filter 107 by a support 657, in the manner illustrated in FIGS. 28a and 28b. As shown in FIG. 28b, the mixing chamber 653b is supported by a plate 657c, so that the inlet cone of the mixing eductor is contained inside a small chamber composed of perforated plates, or screens, 657a, the top plate 657c and a bottom plate 657b. Water flowing through the perforated plates or screens 657a is entrained into the inlet cone of mixing chamber 653c.

The aerobic bacteria exist and thrive in the water and will colonize on the media within the bio-filter chamber as the system is operated. The type of aerobic bacteria utilized in bio-filter 107 may include, for example, *nitrosomonas* and *nitrobacter* bacteria. These naturally occurring bacteria break down ammonia and nitrites in the water and form nitrates.

The flow rate through the bio-filter may be optimized to achieve the desired water quality. For example, the flow rate through the bio-filter may range from 1 to 30 times the volume of the aquarium per hour, and more preferably from 3 to 10 times per hour.

The water from bio-filter 107 flows to protein skimmer 109. The purpose of the protein skimmer is to remove contaminants, such as undesirable organic matter, otherwise known as dissolved organic compounds (DOC), from the water, as well as to increase the oxygen level of the water. Any protein skimmer known in the art may be used for this application.

One preferred embodiment employs a novel protein skimmer which utilizes a mixing eductor to introduce bubbles into the water. This novel protein skimmer is described above in connection with FIGS. 20a to 20c.

The flow rate through the protein skimmer may be optimized to achieve the desired water quality. For example, the flow rate through the bio-filter may range from 1 to 30 times the volume of the aquarium per hour, and more preferably from 3 to 10 times per hour.

Water from protein skimmer 109 flows to oxytower 110, which utilized algae to remove phosphates, sulfates and nitrates from the water. The oxytower may also add oxygen to the water. By oxygenating the water, the pH will remain more stable than water that is oxygen deficient. Further, the oxytower will also help to cool the water by evaporation. A detailed discussion of the oxytower is provided above in connection with FIGS. 18a to 19b.

As discussed above, a portion of the water flowing from the sump is flowed to a denitration system 112, which is used to reduce nitrate concentrations in the water. In order to manage nitrate levels in the water, any denitration system known in the art may be employed.

In a preferred embodiment, the denitration system 112 is a Nitrafix system, as described herein above. Any of the Nitrafix systems described above could potentially be used. Preferably, the Nitrafix system used would comprise an optional filtration step 1, in which the water to be treated passes through a filter (not shown); an optional aerobic bacteria processing step 2 occurs; an anaerobic bacteria processing step 3; and an optional step 4, wherein one or more calcium reactors are employed for maintaining pH and adding calcium.

For large commercial applications, the denitration system 112 may preferably employ the systems described in connection with FIG. 17 above. For example, as an aerobic chamber 610, one or more denitration chambers 620 and optionally one or more calcium chambers 630, could be used. For example, in one preferred embodiment, the aerobic chamber could be the chamber described in connection with FIG. 24; the denitration chamber could be chosen from one of the chambers described in connection with FIGS. 9 and 11; and either no calcium chamber, or one or more calcium chambers, as described in connection with FIG. 25 may be employed. In yet another embodiment, only one or more denitration chambers 620 are employed, with no aerobic chamber, and with either no calcium chamber, or one or more calcium chambers.

Alternatively, the denitration system 112 may preferably employ the Nitrafix system described in connection with FIGS. 2 to 6 above. For example, an aerobic chamber 110, a denitration chamber 120 could be employed, either with no calcium chamber or with one or more calcium chambers. In yet another embodiment, a denitration chamber 120 could be employed, either with no calcium chamber or with one or more calcium chambers. If calcium is used, a single source of calcium may be employed, or multiple sources.

The chambers of the Nitrafix system may be arranged in a single container, as described in FIGS. 8a to 8c or FIG. 15.

A further process step, which may be added after the denitration system 112 described herein, can be used to reduce sulfate concentrations. As described above, the denitration process of the systems of the present invention results in increased levels of sulfates in the water. Additionally, there is the possibility that undesirable amounts of hydrogen sulfide may also be produced at certain times, such as at startup, after the denitration chamber has been shut down for a period of time. Consequently, it may be desirable in some aqua culture systems to reduce the level of sulfates and/or hydrogen sulfide. Accordingly, the novel method and desulfator apparatus, described above with reference to FIGS. 23a to 23f, may be employed for reducing sulfate and hydrogen sulfide concentrations in the water. Alternatively, any system known in the art for reducing sulfate in the water may be employed.

Referring back to FIG. 26, a monitoring system 115 may be used to monitor the properties of the aqua tank water, such as temperature, pH, salinity, dissolved oxygen, ORP, flow, pressure, levels and power failure of the water. The parameters of the water treating system of FIG. 1 may then be controlled based on the feed back from monitoring system 115. For example, the ORP, which is a measure of water conductivity, may be used to control ozone levels in the protein skimmer, since ozone cleans the water and thus affects the water conductivity.

Figure 26:
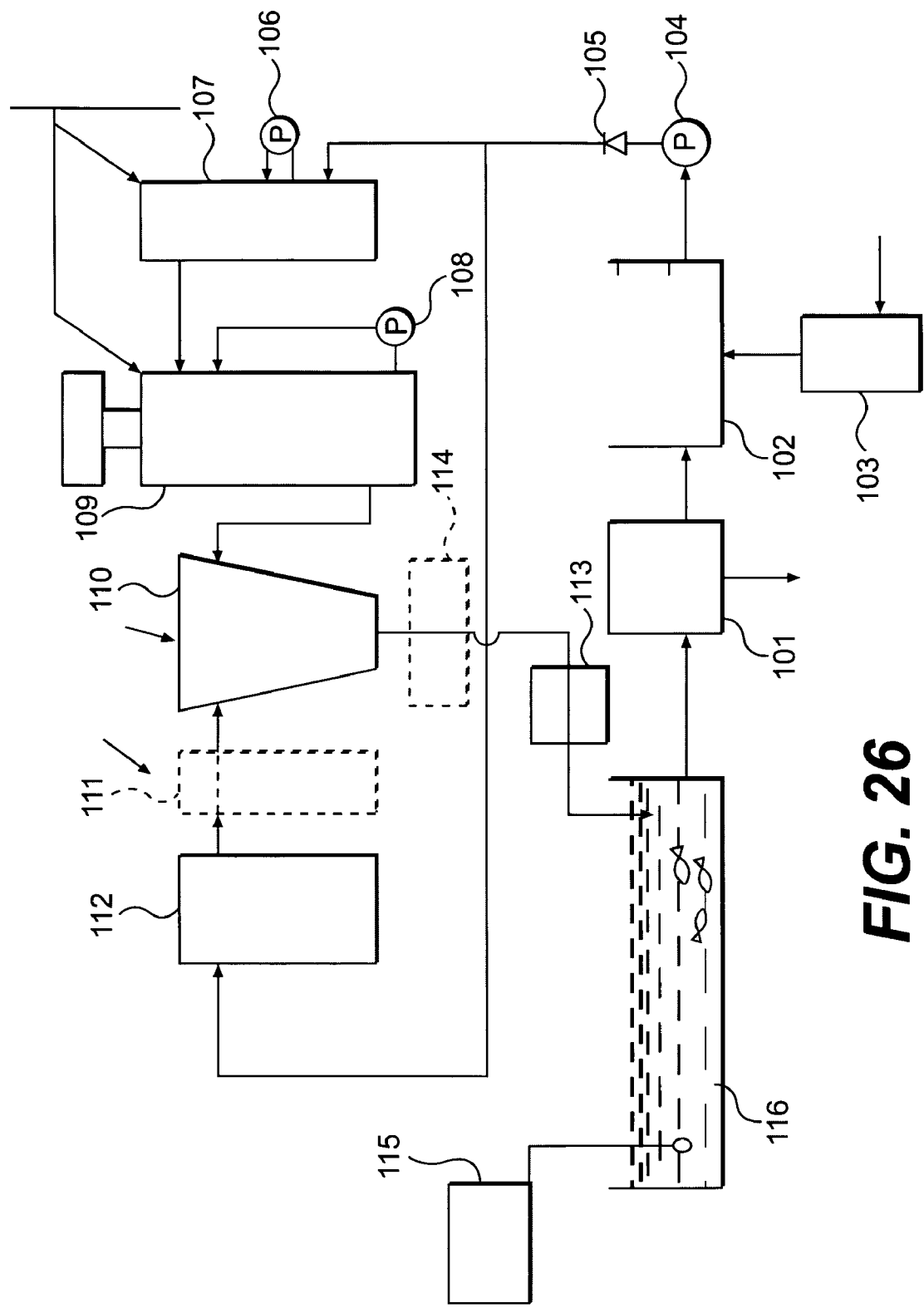
FIG. 26 illustrates a system for filtering water in aquariums or aqua culture applications, according to an embodiment of the present invention.

Additional water may occasionally need to be added to the system of FIG. 26. If so, the water may be supplied, for example, by a reverse osmosis unit 103, which may be used to filter city water and make it safe for the fish.

Water may be pumped to bio-filter 107 and the denitration chamber 112 using a pump 104, as shown in FIG. 27. The bio-filter 107 and denitration chamber 112 may be placed at higher elevations then the other chambers in the system, including the protein skimmer, the oxytower and the desulfator, so that the water may then run by force of gravity through these chambers and back to aquarium 100, thus saving power. Alternatively, a separate pump may be used to pump water to the other chambers, such as the protein skimmer, the oxytower and the desulfater. Pump 104 is preferably a type of pump which consumes relatively low energy, such as a flow pump. Pumps 106 and 108, as shown in FIG. 26, may be, for example, pressure pumps. Other types of pumps known in the art may also be used for pumps 104, 106 and 108.

The system of FIG. 26 may be modified according to the desired water quality to be obtained and the cost of the system. For example, in one embodiment, desulfator 111 is not employed in the system of FIG. 26, so that the water flows directly from denitration chamber 112 to oxytower 110. In yet another embodiment, protein skimmer 109 is not employed, so that the water from bio-filter 107 flows directly to oxytower 110. In yet another embodiment, oxytower 110 is omitted, so that water flows from bio-filter 107 and either the desulfator 111, or the denitration chamber 112 (if the desulfator is not employed), to the protein skimmer 109, and then from the protein skimmer 109 to aquarium or aqua tank 116, via the optional chiller/heater and UV sterilizer. In still another embodiment, the order of the protein skimmer and oxytower are reversed, so that water flows from the bio-filter 107 to the oxytower 110 and then to the protein skimmer 109, and then down to the aquarium via the optional chiller/heater and UV sterilizer. In this last embodiment, water may flow from either the desulfator 111, or the denitration chamber 112 (if the desulfator is not used) to either the protein skimmer 109 or the oxytower 110. In yet another embodiment, the protein skimmer, oxytower and desulfator are all omitted, so that water flows from the denitration chamber 112 to the bio-filter 107, and from the bio-filter 107 to the aquarium, via the optional chiller/heater and UV sterilizer. In yet another embodiment, the flow through the oxytower and skimmer may be in parallel so that water flows from the bio-filter 107 to the skimmer and the oxytower at the same time and then down to the aquarium via the optional chiller/heater and UV sterilizer.

In yet another embodiment, the flow of water from the bio-filter outlet may be split, so that only a portion of the water from the outlet of bio-filter 107 flows to the skimmer 109, while the remaining portion flows to either the chiller/heater and UV sterilizer or directly to the aquarium. For example, ⅓ of the water from the bio-filter may flow to the protein skimmer, while ⅔ of the flow goes to the aquarium via the optional chiller/heater and UV sterilizer.

In all the embodiments listed herein, both the UV sterilizer 113 and the chiller or heater 114 may be omitted. Additionally, a sump need not be employed, but instead the water may be pumped and returned directly to the aquarium tank.

Other flow arrangements are also contemplated. For example, each of the chambers, including denitration chamber 112, desulfator 111, oxytower 110, protein skimmer 109 and bio-filter 107, may be used separately, so that the water from either the sump or the aquarium may be flowed directly to each chamber, and then returned directly back to either the sump or the aquarium. Still other flow arrangements and configurations are possible, as may be appreciated by one of ordinary skill in the art.

The system of FIG. 26 may be assembled in a compact manner on a single support, known as a "skid." This would allow the system to be manufactured and assembled off-site and then shipped to the aqua tank location ready to be used. Such an integrated system would also likely cost less than a system built on site.

With respect to the flow rate of water through the system of the present invention, flow rates within the range of 5 to 7 gph were found to be workable for a denitration chamber made according to the embodiment shown in FIG. 14, for aquariums ranging in size from 250 to 500. Flow rates in the range of 3 to 5 gph were found to be acceptable for denitration chambers of that type where the aquariums being serviced are within the range of 50 to 500 gallons. When the system is originally placed on-line, a flow can be adjusted through the valve system. One way of adjusting the flow is to place a glass of a given volume at the outlet so that the flow can be measured and adjusted, until the desired flow rate is achieved. In addition, if the nitrate level is greater than desired, such as 5 ppm after the system has operated for 30–90 days, the flow rate can be adjusted at a higher level, to achieve the desired nitrate level.

The biological systems disclosed in this application can be used for both salt and fresh water aquariums, as well as brackish water aquariums. The systems may be used for both cold water and heated aquariums. Heating the aquarium water to a temperature range which allows the bacteria to be efficient before it enters the biological systems of the present invention may provide improved results. For example, if *Thiobacillus denitrificans* are employed, the water in the chamber should preferably have a temperature ranging from 25 to 30 degrees Celsius.

While the methods, devices, and systems of the present invention have been disclosed for use in treating water for aquariums, all or aspects of the disclosed inventions can also be used in other applications where water must be treated. For example, the denitration methods and systems can be used, along with other apparati and methods, in fish farms, hog farms, and other applications where high levels of nitrates are produced and need to be removed and/or treated.

While certain materials may have been disclosed for construction of the various chambers, piping and other parts of the systems disclosed herein, it will readily be recognized that other materials known in the art may also be used.

While the invention has been disclosed herein in connection with certain embodiments and detailed descriptions, it will be clear to one skilled in the art that modifications or variations of such details can be made without deviating from the general concept of the invention. Thus the invention is to be limited by the claims, and not by the embodiments and detailed description provided above.

EXAMPLE

A biological system according to the present invention which was similar to the embodiment illustrated in FIG. 8 was used to filter a 500 gallon aquarium containing relatively large numbers of fish. The tank initially had a nitrate concentration of approximately 50 ppm. After three weeks of conditioning the water with the above mentioned biological system, the nitrate content of the aquarium was reduced to a safe level, under 5 ppm $NO_3^-$, and was maintained at about that level for several months.

What is claimed is:

1. A process for conditioning water in a contained environment for aquatic life, the process comprising the steps of:
  flowing an amount of the water from the contained environment to a first apparatus comprising a first chamber for substantially reducing the oxygen concentration of the water in the flow;
  flowing the water from the first apparatus to a second apparatus containing anaerobic bacteria for substantially reducing the level of nitrates in the water, wherein the second apparatus comprises a second chamber containing a media comprising a sufficient amount of sulfur to sustain said anaerobic bacteria for an extended period of time and in a sufficient amount to substantially reduce the nitrate content in the water, as the water flows through the second chamber; and
  flowing the water from the second apparatus to the contained environment.

2. The process of claim 1 further comprising the additional step of adding calcium to the water by flowing the water having reduced levels of nitrates to a third apparatus containing one or more sources of calcium before the water flows to the contained environment.

3. The process of claim 2 wherein the water flowing as it leaves the third apparatus has a pH within the range of from about 6 to about 8.

4. The process of claim 2 further comprising the step of degassing the flow of water before the water flows back to the contained environment.

5. The process of claim 1 wherein the anaerobic bacteria comprise *Thiobacilus denitrificans* bacteria.

6. The process of claim 5 further comprising aerobic bacteria within the first apparatus, wherein the aerobic bacteria comprise at least one bacteria chosen from *nitrosomonas* and *nitrobacter* bacteria.

7. The process of claim 1 further comprising the additional step of flowing the water from the second chamber to a protein skimmer before the water flows to the contained environment.

8. The process of claim 7 wherein the protein skimmer both raises the pH and adds oxygen to the water.

9. The process of claim 7 wherein the protein skimmer mixes a gas including oxygen with water in the chamber using a mixing eductor.

10. The process of claim 1 wherein the second chamber reduces the nitrate content of the water to a level ranging from 0 to 20 ppm.

11. The process of claim 1 wherein the anaerobic bacteria comprise at least one bacteria chosen from *Thiobacilus denitrificans, Thiobacillus versutus, Thiobacillus thyasiris, Thiosphaera pantotropha, Paracoccus denitrificans*, and *Thiomicrospira denitrificans*.

12. The process of claim 1 further comprising the steps of flowing the water through at least two sources of calcium after the water leaves the second chamber and before the water flows back to the contained environment.

13. The process of claim 1 wherein the water is kept within a temperature range of 25 to 30 degrees Celsius as it flows through the second chamber.

14. The process of claim 1 wherein the structure of the second chamber is opaque and designed to minimize the application of any light to the anaerobic bacteria in the second chamber.

15. The process of claim 1 further comprising the step of adding oxygen to the water after the water flows from the second chamber and before the water flows back to the contained environment.

16. The process of claim 1 further comprising the step of flowing the water through a degassing chamber of activated carbon after it leaves the second chamber and before the water flows back to the contained environment.

17. The process of claim 1 further comprising the step of reducing sulfate concentrations in the water after it leaves the second chamber and before the water flows back to the contained environment.

18. The process of claim 1, wherein the second apparatus comprises a plurality of chambers for reducing the level of nitrates in the water.

19. The process of claim 1 wherein the media is comprised of at least 50% sulfur by weight.

20. The process of claim 1 wherein the media is comprised of at least 75% sulfur by weight.

21. The process of claim 1 wherein the media is comprised of at least 90% sulfur by weight.

22. The process of claim 1 wherein the media is comprised of between about 99% to about 100% sulfur by weight.

23. The process of claim 1 wherein the first chamber reduces the oxygen content of the water to a level of less than 1.64 ppm.

24. The process of claim 1 wherein the extended period of time is at least 1 year.

25. The process of claim 1 wherein the extended period of time is at least 5 years.

26. The process of claim 1 wherein the extended period of time is at least 10 years.

27. A process for conditioning water in a contained environment for aquatic life, the process comprising the steps of:
flowing an amount of the water from the contained environment to a first apparatus for substantially reducing the oxygen concentration of the water in the flow;
flowing the water from the first apparatus to a second apparatus containing anaerobic bacteria for substantially reducing the level of nitrates in the water;
flowing the water through a degassing chamber of activated carbon after it leaves the second apparatus, wherein the degassing chamber contains wet activated carbon immersed in the flow of water and dry activated carbon above the flow of water; and
flowing the water from the degassing chamber to the contained environment.

28. A process for conditioning water in a contained environment for aquatic life, the process comprising the steps of:
flowing an amount of the water from the contained environment to a first apparatus for substantially reducing the oxygen concentration of the water in the flow;
flowing the water from the first apparatus to a second apparatus containing anaerobic bacteria for substantially reducing the level of nitrates in the water;
flowing the water having reduced levels of nitrates to an oxytower before the water is returned to the environment for holding aquatic life, wherein the oxytower includes an enclosure for accepting a flow of water, the enclosure having side walls that slope inward at an angle $\theta_{oxy}$ from vertical; a medium is placed on the inner surface of the sidewalls and serves as support for the growth of algae in the oxytower, and the water flows down the side walls while contacting the algae in a manner which allows the algae to effectively remove contaminants from the water and raise the pH of the water; and
flowing the water from the oxytower to the contained environment.

29. A process for conditioning water in a contained environment for aquatic life, the process comprising the steps of:
flowing an amount of the water from the contained environment to a first apparatus for substantially reducing the oxygen concentration of the water in the flow;
flowing the water from the first apparatus to a second apparatus containing anaerobic bacteria for substantially reducing the level of nitrates in the water;
reducing sulfate concentrations in the water after it leaves the second apparatus and before the water flows back to the contained environment, wherein the step of reducing the sulfate concentrations is achieved by introducing the water to a desulfator, wherein the desulfator includes an enclosure for accepting a flow of water, wherein the enclosure contains a media on which anaerobic photosynthetic bacteria are supported, and the water flows through the enclosure while contacting the media in a manner which effectively reduces sulfate levels; and
flowing the water to the contained environment.

30. The process of claim 29, wherein the anaerobic photosynthetic bacteria comprise at least one bacteria chosen from *Chromatium vinossum*, *Thiospirillum jenense*, *Rhodospirillum rubrum*, *Rhodobacter sphaeroides*, *Chlorobium limicola*, and *Prosthecochloris aestuarii*.

31. A process for conditioning water in a contained environment for holding aquatic life, the process comprising:
providing a first stream of water from the contained environment to a bio-filter at a first flow rate, wherein the bio-filter reduces ammonia to nitrite and nitrite to nitrate;
providing a second stream of water from the contained environment to a denitration system at a second flow rate, wherein the denitration system includes one or more chambers containing anaerobic bacteria and further containing a media comprising a sufficient amount of sulfur to sustain said anaerobic bacteria for an extended period of time and in a sufficient amount to substantially reduce the nitrate content in the water; and;
returning the first and second streams to the environment for holding aquatic life.

32. The process of claim 31, wherein the denitration system employs a chamber containing aerobic bacteria which reduces the oxygen concentration of the water in the second stream before the water is introduced to the one or more chambers containing anaerobic bacteria.

33. The process of claim 31, wherein the denitration system employs one or more chambers containing calcium for adjusting the pH of the second stream of water after the second stream exits the chamber containing anaerobic bacteria.

34. The process of claim 31, further comprising the step of filtering the second stream of water before it is provided to the denitration system.

35. The process of claim 31, further comprising monitoring the properties of the water in the environment for holding aquatic life and controlling the process for conditioning water based on feedback received from the monitoring.

36. The process of claim 31, wherein the first and second streams are returned from the bio-filter and denitration system to the environment for holding aquatic life by force of gravity.

37. The process of claim 31 wherein the media is comprised of at least 50% sulfur by weight.

38. The process of claim 31 wherein the media is comprised of at least 75% sulfur by weight.

39. The process of claim 31 wherein the media is comprised of at least 90% sulfur by weight.

40. The process of claim 31 wherein the media is comprised of between about 99% to about 100% sulfur by weight.

41. The process of claim 31 wherein the extended period of time is at least 1 year.

42. The process of claim 31 wherein the extended period of time is at least 5 years.

43. The process of claim 31 wherein the extended period of time is at least 10 years.

44. A process for conditioning water in a contained environment for holding aquatic life, the process comprising:
providing a first stream of water from the contained environment to a bio-filter at a first flow rate, wherein the bio-filter reduces ammonia to nitrite and nitrite to nitrate;
providing a second stream of water from the contained environment to a denitration system at a second flow rate, wherein the denitration system includes one or more chambers containing anaerobic bacteria for substantially reducing the level of nitrates in the water;
providing the second stream of water to the bio-filter after the water exits the denitration system; and
returning the first and second streams to the environment for holding aquatic life.

45. A process for conditioning water in a contained environment for holding aquatic life, the process comprising:
providing a first stream of water from the contained environment to a bio-filter at a first flow rate, wherein the bio-filter reduces ammonia to nitrite and nitrite to nitrate;
providing a second stream of water from the contained environment to a denitration system at a second flow rate, wherein the denitration system includes one or more chambers containing anaerobic bacteria for substantially reducing the level of nitrates in the water;
providing both the first stream of water from the bio-filter and the second stream of water from the denitration system to an oxytower, wherein the first and second streams are combined together; and
returning the combined first and second streams to the environment for holding aquatic life.

46. The process of claim 45, further comprising the step of providing the first stream of water to a protein skimmer after the first stream leaves the bio-filter chamber and before the first stream is provided to the oxytower.

47. The process of claim 46 wherein the protein skimmer includes an enclosure for accepting a flow of water, a mixing eductor within the enclosure, and a pump for introducing a forced flow of water to the mixing eductor, the mixing eductor including a first flow path for accepting the forced flow of water from the pump, a second flow path for entraining water from the enclosure of the protein skimmer, and a third flow path for accepting a flow of gas including oxygen from outside the enclosure, the mixing eductor in operation mixing the forced flow of water, the entrained water and the gas within the enclosure.

48. The process of claim 45, further comprising the step of reducing the sulfate concentrations in the second stream of water after the second stream leaves the denitration chamber and before the second stream flows to the oxytower.

49. The process of claim 48, wherein the step of reducing the sulfate concentrations is achieved by introducing the water to a desulfator, the desulfator including an enclosure for accepting a flow of water, wherein the enclosure contains a media on which anaerobic photosynthetic bacteria are supported, and further wherein the water flows through the enclosure while contacting the media in a manner which effectively reduces sulfate levels.

50. The process of claim 49, wherein the anaerobic photosynthetic bacteria comprise at least one bacteria chosen from *Chromatium vinossum, Thiospirillum jenense, Rhodospirillum rubrum, Rhodobacter sphaeroides, Chlorobium limicola*, and *Prosthecochloris aestuarii*.

51. The process of claim 45, wherein the oxytower comprises an enclosure for accepting a flow of water, the enclosure having side walls that slope inward at an angle $\theta_{oxy}$ from vertical; and wherein a medium is placed on the inner surface of the sidewalls and serves as support for the growth of algae in the oxytower, and further wherein the flow of water flows down the side walls while contacting the algae in a manner which allows the algae to effectively remove contaminants from the water and raise the pH of the water.

52. The process of claim 45, further comprising the step of adjusting the temperature of the combined first and second streams from the oxytower.

53. The process of claim 45, further comprising the step of sterilizing the water of the combined first and second streams from the oxytower to kill microorganisms.

54. The process of claim 45, further comprising the steps of
flowing water from the environment for holding aquatic life to a filter to remove particulates from the water; and then
flowing the water from the filter to a sump, where the water may be held until it is pumped to the bio-filter and the denitration system.

55. The process of claim 45, further comprising the step of providing the combined first and second streams of water from the oxytower to a protein skimmer before returning the first and second streams to the environment for holding aquatic life.

56. A process for conditioning water in a contained environment for holding aquatic life, the process comprising:
providing a first stream of water from the contained environment to a bio-filter at a first flow rate, wherein the bio-filter reduces ammonia to nitrite and nitrite to nitrate;
providing a second stream of water from the contained environment to a denitration system at a second flow rate, wherein the denitration system includes one or more chambers containing anaerobic bacteria for substantially reducing the level of nitrates in the water;
providing the first stream of water from the bio-filter and the second stream of water from the denitration system to a protein skimmer, wherein the first and second streams are combined together; and
returning the combined first and second streams to the environment for holding aquatic life.

57. The process of claim 56, further comprising the step of reducing sulfate concentrations in the second stream of water after the second stream leaves the denitration chamber and before the second stream is provided to the protein skimmer.

58. The process of claim 56, further comprising the step of providing the first stream of water from the bio-filter to an oxytower before the first stream of water is provided to the protein skimmer.

59. A process for conditioning water in a contained environment for holding aquatic life, the process comprising:
- providing a first stream of water from the contained environment to a bio-filter at a first flow rate, wherein the bio-filter reduces ammonia to nitrite and nitrite to nitrate;
- providing a portion of the first stream of water from the bio-filter to a protein skimmer;
- providing a second stream of water from the contained environment to a denitration system at a second flow rate, wherein the denitration system includes one or more chambers containing anaerobic bacteria for substantially reducing the level of nitrates in the water; and
- returning said first and second streams to the environment for holding aquatic life.

60. The process of claim 59 further comprising providing the remaining portion of the first stream of water from the bio-filter to an oxytower, the protein skimmer and oxytower being arranged in parallel.

* * * * *